(12) United States Patent
Zhou et al.

(10) Patent No.: US 11,681,161 B2
(45) Date of Patent: *Jun. 20, 2023

(54) ANTI-MYOPIA-PROGRESSION SPECTACLES AND ASSOCIATED METHODS

(71) Applicant: Reopia Optics, Inc., Danville, CA (US)

(72) Inventors: Yan Zhou, Pleasanton, CA (US); Barry Jonathan Linder, Danville, CA (US)

(73) Assignee: REOPIA OPTICS, INC., Danville, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 17/513,862

(22) Filed: Oct. 28, 2021

(65) Prior Publication Data
US 2022/0107508 A1    Apr. 7, 2022

Related U.S. Application Data

(63) Continuation of application No. 16/583,093, filed on Sep. 25, 2019, now Pat. No. 11,187,921, which is a continuation of application No. 16/366,972, filed on Mar. 27, 2019, now Pat. No. 10,921,612.

(60) Provisional application No. 62/737,111, filed on Sep. 27, 2018, provisional application No. 62/649,669, filed on Mar. 29, 2018.

(51) Int. Cl.
*G02C 7/06*    (2006.01)

(52) U.S. Cl.
CPC ........... *G02C 7/06* (2013.01); *G02C 2202/24* (2013.01)

(58) Field of Classification Search
CPC .............................. G02C 7/06; G02C 2202/24
See application file for complete search history.

(56) References Cited

U.S. PATENT DOCUMENTS

| 5,483,381 A | 1/1996 | Baba |
| 5,691,797 A | 11/1997 | Seidner et al. |

(Continued)

FOREIGN PATENT DOCUMENTS

| WO | WO 2017/178430 | 10/2017 |
| WO | WO 2017/222421 | 12/2017 |

(Continued)

OTHER PUBLICATIONS

USPTO, ISA/US, "Notification of Transmittal of the ISR and the Written Opinion of the International Searching Authority, or the Declaration," in PCT Application No. PCT/US2019/024705, dated Jul. 29, 2019, 10 pages.

(Continued)

*Primary Examiner* — Wen Huang
(74) *Attorney, Agent, or Firm* — Kang S. Lim

(57) ABSTRACT

Spectacles that control myopia progression have a central zone that achieves foveal vision correction and distributed micro-reticle(s) and corresponding micro-lens(es) around the paracentral and/or peripheral zone of the spectacle. Each micro-lens is disposed between its corresponding micro-reticle and the pupil of a wearer's eye. The micro-reticle(s) and micro-lens(es) are integrated with the structure of the spectacle to partially block some of the paracentral and/or peripheral objects from surrounding optical environment. The rest of the paracentral and/or peripheral retinal areas are still available for a wearer's eye to sense the presence and movement of surrounding objects.

10 Claims, 51 Drawing Sheets

(56) References Cited

U.S. PATENT DOCUMENTS

| | | |
|---|---|---|
| 6,325,508 B1 | 12/2001 | Decreton et al. |
| 6,343,861 B1 | 2/2002 | Kris et al. |
| 6,752,499 B2 | 6/2004 | Aller |
| 7,025,460 B2 | 4/2006 | Smitth et al. |
| 7,401,922 B2 | 7/2008 | Legerton |
| 7,503,655 B2 | 3/2009 | Smith, III et al. |
| 7,637,612 B2 | 12/2009 | Menezes |
| 7,665,842 B2 | 2/2010 | Ho et al. |
| 7,766,478 B2 | 8/2010 | Phillips |
| 7,766,482 B2 | 8/2010 | Smith, III et al. |
| 7,832,859 B2 | 11/2010 | Phillips |
| 7,862,171 B2 | 1/2011 | Varnas et al. |
| 7,992,997 B2 | 8/2011 | Varnas |
| 7,997,725 B2 | 8/2011 | Phillips |
| 7,997,727 B2 | 8/2011 | Ho et al. |
| 8,057,034 B2 | 11/2011 | Ho et al. |
| 8,201,941 B2 | 6/2012 | Choo et al. |
| 8,240,847 B2 | 8/2012 | Holden et al. |
| 8,342,684 B2 | 1/2013 | Ho et al. |
| 8,672,472 B2 | 3/2014 | Holden et al. |
| 8,684,520 B2 | 4/2014 | Lindacher et al. |
| 8,690,319 B2 | 4/2014 | Menezes |
| 8,833,936 B2 | 9/2014 | Varnas |
| 8,876,287 B2 | 11/2014 | Back et al. |
| 8,899,746 B2 | 12/2014 | Back |
| 8,931,897 B2 | 1/2015 | Holden et al. |
| 8,950,859 B2 | 2/2015 | Tung |
| 8,950,860 B2 | 2/2015 | Tse et al. |
| 8,998,408 B2 | 4/2015 | Wei et al. |
| 9,195,074 B2 | 11/2015 | Bakaraju et al. |
| 9,201,250 B2 | 12/2015 | Bakaraju et al. |
| 9,274,351 B2 | 3/2016 | Drobe |
| 9,360,683 B2 | 6/2016 | Buehren |
| 9,477,097 B2 | 10/2016 | Holden et al. |
| 9,500,881 B2 | 11/2016 | Holden et al. |
| 9,535,263 B2 | 1/2017 | Bakaraju et al. |
| 9,541,773 B2 | 1/2017 | Bakaraju et al. |
| 9,547,182 B2 | 1/2017 | Collins et al. |
| 9,575,334 B2 | 2/2017 | Bakaraju et al. |
| 9,594,257 B2 | 3/2017 | Martinez et al. |
| 9,594,258 B2 | 3/2017 | Fujikado et al. |
| 9,594,259 B2 | 3/2017 | Brennan et al. |
| 9,625,739 B2 | 4/2017 | Brennan et al. |
| 9,638,936 B2 | 5/2017 | Brennan et al. |
| 9,733,494 B2 | 8/2017 | Brennan et al. |
| 9,759,930 B2 | 9/2017 | Bakaraju et al. |
| 9,791,718 B2 | 10/2017 | Drobe et al. |
| 9,829,722 B2 | 11/2017 | Tse et al. |
| 2010/0073629 A1 | 3/2010 | Menezes |
| 2010/0259717 A1 | 10/2010 | Fermigier et al. |
| 2010/0296058 A1 | 11/2010 | Ho et al. |
| 2013/0182215 A1 | 7/2013 | Tung |
| 2014/0111763 A1 | 4/2014 | Griffin |
| 2016/0377884 A1 | 12/2016 | Lau et al. |
| 2017/0115509 A1 | 4/2017 | Brennan et al. |
| 2017/0184875 A1 | 6/2017 | Newman |
| 2017/0192252 A1 | 7/2017 | Brennan et al. |
| 2017/0227788 A1 | 8/2017 | Griffin et al. |
| 2017/0276961 A1 | 9/2017 | Wooley et al. |
| 2017/0336653 A1 | 11/2017 | Bakaraju |
| 2018/0017810 A1 | 1/2018 | Wu |
| 2020/0073147 A1 | 3/2020 | Bakaraju |

FOREIGN PATENT DOCUMENTS

| | | |
|---|---|---|
| WO | WO 2018/026697 | 2/2018 |
| WO | WO 2018/076057 | 5/2018 |

OTHER PUBLICATIONS

USPTO, ISA/US, "Notification of Transmittal of the ISR and the Written Opinion of the International Searching Authority, or the Declaration," in PCT Application No. PCT/US2019/053316, dated Dec. 30, 2019, 7 pages.

ANTI-MYOPIA-PROGRESSION SPECTACLES AND ASSOCIATED METHODS

CROSS REFERENCE TO RELATED APPLICATIONS

This U.S. application claims the benefit of and is a Continuation of U.S. application Ser. No. 16/583,093, filed Sep. 25 2019, of the same title, recently allowed, which application claims the benefit of and is a non-provisional application of U.S. Provisional Application No. 62/737,111, filed Sep. 27, 2018. Additionally, U.S. application Ser. No. 16/583,093 claims priority and is a Continuation of U.S. application Ser. No. 16/366,972, filed Mar. 27, 2019, now U.S. Pat. No. 10,921,612, issued Feb. 16, 2021, which claims priority to U.S. Provisional Application No. 62/649,669, filed Mar. 29, 2018, which applications and patents are incorporated herein in their entirety by this reference

FIELD OF THE INVENTION

One or more embodiments of the present invention relate generally to myopia progression control or myopia prevention. In particular, the embodiments are related to various designs of anti-myopia progression spectacles.

BACKGROUND

With the popular use of personal computers and mobile cell phones by young children, the percentage of school children developing myopia has increased substantially in the past couple of decades. The onset of myopia also occurs at younger ages as compared to the time before personal computers and mobile cell phones were popular. Although the cause and treatment of myopia have been debated for decades, the exact mechanism of myopia development remains unclear. However, recent clinical studies have shown that myopia progression can be slowed and controlled. In addition to treatment using pharmaceutical substances like atropine and pirenzepine, another clinically proven approach is to optically extend the depth of focus (or field) by making both distant and nearby objects in focus such that demand for sufficient accommodation is substantially reduced. Still another clinically proven approach is to optically induce paracentral and/or peripheral myopic defocus on the retina, i.e. with sharply focused image of a distant object formed on the fovea or macula, and with paracentral and/or peripheral image shell of a distant off axis object formed in front of the retina.

Myopic defocusing in front of peripheral retina and/or extension of depth-of-focus (or field) can be accomplished using several techniques. In addition to reshaping the cornea using, for example, orthokeratology (Ortho-K) to achieve at least one of the two optical effects, many lens designs that produce at least one of the two optical effects have been disclosed to the public. They include different types of progressive addition lenses (PALs), bi-focal lenses, multi-focal lenses, progressive multifocal lenses, and extended depth-of-focus lenses.

Most of these lenses are contact lenses comprising one optical element with various modifications of the optical path length from the center to the periphery. An issue with the use of a contact lens is that when children are relatively young (for example, from about 4 years to about 10 years old), they may not be mature enough to be trained to safely put contact lenses on their eyes by themselves. For this group of children, to both correct their refractive error(s) and also slow or stop their myopia progression, it is more desirable to offer them an anti-myopia spectacle.

A few sub-optimal inferior anti-myopia-progression spectacles that have been either commercialized or disclosed to the public as news release, to offer myopia progression control. They include the MyoVision spectacle from Zeiss, the Myopilux spectacle from Essilor International and the MyoSmart spectacle with D.I.M.S. Technology (Defocus Incorporated Multiple Segments Technology) from Hoya Corp. These spectacles have been found to offer limited efficacy in terms of myopia progression control. For example, the Zeiss MyoVision spectacle lens has been clinically found to be effective for children who have myopic parents and the average reduction to myopia progression is about 30% as compared to a control group. The Myopilux Max spectacles claim to have slowed down myopia progression by up to 62%, but only for exophoric children with properly measured and prescribed prismatic bifocal correction. In the case of Essilor International's Myopilux Pro, a progressive addition lens specially designed for esophoric kids, the claimed percentage in myopia progression reduction is about 38%. The MyoSmart spectacles' clinical trials have shown that children wearing defocus lenses had 60 percent less myopia progression and in 21.5% of the children, the myopia progression halted completely. However, these results are still not good enough to completely halt myopia progression in a majority of children to solve the problem of the unprecedented global epidemic of myopia.

Therefore, a need exists for an improved design of an anti-myopia-progression spectacle that will not only reduce the demand for large accommodation but also at the same time consistently ensure that there are always dominating paracentral and/or peripheral retinal images sensed by a wearer's eye as either within focus or as somewhat myopically defocused on paracentral and/or peripheral retina to substantially improve clinical efficacy of myopia progression control for all myopic children or for children with high likelihood of myopia development but before the onset of myopia.

SUMMARY

In accordance with the present invention, micro-reticles and corresponding micro-lenses are distributed around the paracentral and/or peripheral region of a spectacle lens or lens combination with each micro-lens arranged in between its corresponding micro-reticle and the pupil of a wearer's eye. The micro-lens refracts the light rays from the micro-reticle such that when the micro-reticle is presented to the wearer's eye, at least along one direction, a sharply focused line of the reticle image is formed either substantially on the paracentral and/or peripheral retina (i.e. within focus as perceived by a wearer's eye) or in front of the paracentral and/or peripheral retina (i.e. myopically defocused within a desired range as perceived by the wearer's eye). Each micro-reticle and micro-lens pair is arranged such that the pair is lined up with the micro-reticle imaging light rays from the micro-reticle that pass through the micro-lens also pass through the pupil of a wearer's eye to land on the paracentral and/or peripheral retinal region of the wearer's eye.

In one embodiment, a single vision correction spectacle lens is designed with paracentral and/or peripheral micro-reticles made on the front surface of the lens or embedded within the front portion of the spectacle lens material, and with their corresponding micro-lenses either formed on the back surface of the single vision correction lens or embedded within the back portion of the spectacle lens material. The optical effect of the micro-lens is such that the micro-reticle is imaged by the combination of the micro-lens and all the other optical elements in the reticle imaging light path, including those of a wearer's eye, to form a micro-reticle image either substantially on the paracentral and/or peripheral retina (i.e. within focus as perceived by the eye), or in front of the paracentral and/or peripheral retina (i.e. myopically defocused within a desired range as perceived by the eye).

In another embodiment, a progressive addition or peripheral-add-power vision correction spectacle lens is designed with paracentral and/or peripheral micro-reticles made on the front surface of the lens or embedded within the front portion of the spectacle lens material, and with their corresponding micro-lenses either formed on the back surface of the spectacle lens or embedded within the back portion of the spectacle lens material. The optical effect of the micro-lens is such that the micro-reticle is imaged by the combination of the micro-lens and all other optical elements in the reticle imaging light path, including those of a wearer's eye, to form a micro-reticle image either substantially on the paracentral and/or peripheral retina (i.e. within focus as perceived by the eye), or in front of the paracentral and/or peripheral retina (i.e. myopically defocused within a desired range as perceived by the eye).

In still another embodiment, a bi-focal or multi-focal or extended-depth-of-focus vision correction spectacle lens is designed with paracentral and/or peripheral micro-reticles made on the front surface of the lens or embedded within the front portion of the spectacle lens material, and with their corresponding micro-lenses either formed on the back surface of the spectacle lens or embedded within the back portion of the spectacle lens material. The optical effect of the micro-lens is such that the micro-reticle is imaged by the combination of the micro-lens and all the other optical elements in the reticle imaging light path, including those of a wearer's eye, to form a micro-reticle image either substantially on the paracentral and/or peripheral retina (i.e. within focus as perceived by the eye), or in front of the paracentral and/or peripheral retina (i.e. myopically defocused within a desired range as perceived by the eye).

In still another embodiment, an Increased Resolvable Object Distance Range (IRODR) vision correction lens combination as disclosed in Applicants' U.S. patent application Ser. No. 16/366,972, which is incorporated herein by reference in its entirety, is designed to include micro-reticles and corresponding micro-lenses in the paracentral and/or peripheral zone of the IRODR lens combination, with each micro-lens arranged in between its corresponding micro-reticle and a wearer's eye such that the micro-reticle is imaged by the combination of the micro-lens and all the other optical elements in the reticle imaging light path, including those of a wearer's eye, to form a reticle image either substantially on the paracentral and/or peripheral retina (i.e. within focus as perceived by the eye), or in front of the paracentral and/or peripheral retina (i.e. myopically defocused within a desired range as perceived by the eye).

In the IRODR spectacle case where a combination of a first negative refractive lens and a second positive refractive lens form a spectacle lens combination, there are a number of ways to arrange each micro-reticle relative to its corresponding micro-lens because there are four optical interfaces and there is also a gap in between the two refractive lenses inside the lens combination.

One approach is to insert a glass or plastic or polymer layer in the gap with the layer having micro-reticles arranged around an annular region on its front surface and corresponding micro-lenses around an annular region on its back surface. Another approach is to arrange the micro-reticles on the back surface of the first negative refractive lens, and to arrange their corresponding micro-lenses on the front surface of the second positive refractive lens. In these two approaches, the micro-reticles and the micro-lenses are buried inside the spectacle lens combination and the gap space can be properly sealed, so they will not be easily damaged with their optical effects influenced, because dirt/smear collection and cleaning will happen only on the two outer surfaces of the lens combination.

Other approaches associated with the IRODR spectacle cases include arranging the micro-reticles on the front surface of the first negative lens and their corresponding micro-lenses either on the back surface of the first negative lens or on the front surface of the second positive lens or on the back surface of the second positive lens; arranging the micro-reticles on the back surface of the first negative lens and their corresponding micro-lenses on the back surface of the second positive lens; and arranging the micro-reticles on the front surface of the second positive lens and their corresponding micro-lenses on the back surface of the second positive lens.

The focusing power and/or optical surface profile and/or the refractive index distribution of the micro-lens, when combined with the optical powers of all the other optical elements in the micro-reticle imaging path, including those of a wearer's eye, will make the final micro-reticle image shell (i.e. the spherical equivalent image shell) to land either substantially on a corresponding paracentral and/or peripheral retina (i.e. within focus as perceived by the eye), or in front of a corresponding paracentral and/or peripheral retina (i.e. myopically defocused within a desired range as perceived by the eye).

In some embodiments, the orientation direction of the micro-reticle pattern lines is such that relative to the pupil of the eye or the center of the spectacle lens, some lines are in the radial direction while others are in the circumferential direction. The objective is to produce tangential and sagittal image shells as would be formed of a far off-axis or paracentral and/or peripheral object by an emmetropic eye in the paracentral and/or peripheral retina due to natural off-axis or oblique astigmatism of the eye.

In one embodiment of the present invention, the micro-lenses are designed with off-axis astigmatism correction capability such that the final micro-reticle images when formed on or in front of the paracentral and/or peripheral retina will have the off-axis-astigmatism neutralized so the paracentral and/or peripheral retinal images of the micro-reticles will be focused with its tangential and sagittal image shells substantially overlapping with each other.

In some embodiments, the design of the micro-reticles and micro-lenses are personalized in the sense that anatomical and/or visual and/or optical measurements are made first with the measurement results factored in to guide the design of the micro-reticles and micro-lenses. These measurements include optical biometry, and/or optical refraction/wavefront, and/or visual acuity, and/or visual contrast sensitivity in the central as well as paracentral and/or peripheral retina. Therefore, the micro-lenses can be a free-form one such that not only lower order aberrations can be corrected but also higher order aberrations can be corrected as well to produce sharply focused micro-reticle images on or somewhat in front of the paracentral and/or peripheral retina.

In some embodiments, the orientation direction of a first set of micro-reticle pattern lines is such that relative to the pupil of the eye or the center of the spectacle lens, the micro-reticle lines are in the radial direction and a corresponding first set of micro-lenses are designed with or without off-axis astigmatism correction capability to specifically form sharply focused radial line micro-images on or in front of the paracentral and/or peripheral retina; and the orientation direction of a second set of micro-reticle pattern lines is such that relative to the pupil of the eye or the center of the spectacle lens, the micro-reticle lines are in the circumferential direction and a corresponding second set of micro-lenses are designed with or without off-axis astigmatism correction capability to specifically form sharply focused circumferential line micro-images on or in front of the paracentral and/or peripheral retina. The objective is to separately produce tangential and sagittal images that are respectively sharply focused on, or in front of, the paracentral and/or peripheral retina.

As in some embodiments, the focusing power and/or optical surface profile and/or the refractive index distribution of the micro-lens, when combined with the optical powers of all the other optical elements in the reticle imaging path, including those of a wearer's eye, will make the final reticle image's tangential image shell to land either substantially on corresponding paracentral and/or peripheral retina (i.e. within focus as perceived by a wearer's eye) or in front of corresponding paracentral and/or peripheral retina (i.e. myopically defocused within a desired range as perceived by the eye). In one embodiment, the micro-reticle patterns are concentric or race-track rings or circumferential line segments and the corresponding micro-lenses are circumferential cylindrical ring lenses or circumferential cylindrical line segment lenses with their focusing power only in the radial direction such that they will focus the concentric or race-track ring or circumferential line segment micro-reticle patterns into sharply focused or myopically defocused line images on the paracentral and/or peripheral retina (i.e. within focus as perceived by the eye, or myopically defocused within a desired range as perceived by the eye).

In some embodiments, the focusing power and/or optical surface profile and/or the refractive index distribution of the micro-lens, when combined with the optical powers of all the other optical elements in the reticle imaging path, including those of the wearer's eye, will make the final micro-reticle image's sagittal image shell to land either substantially on, or in front of, a corresponding paracentral and/or peripheral retinal region of the wearer's eye. In one embodiment, the micro-reticle patterns are radial line segments and the corresponding micro-lenses are also radially segmented cylindrical lenses with their focusing only in the circumferential direction such that they will focus the radial line segment micro-reticle patterns into sharply focused or myopically defocused radial line-segment images on the paracentral and/or peripheral retina (i.e. within focus as perceived by a wearer's eye, or myopically defocused within a desired range as perceived by a wearer's eye).

In still another embodiment, the micro-reticle patterns are a combination of concentric or race-track rings (or circumferential line segment) and radial line-segment, and the corresponding micro-lenses are a combination of circumferential cylindrical ring (or line segment) lenses with their focusing only in the radial direction and radially segmented cylindrical lenses with their focusing only in the circumferential direction, such that each sets of the micro-lenses will respectively focus the concentric or race-track ring (or circumferential line segment) and the radial line-segment micro-reticle patterns into sharply focused or myopically defocused concentric or race-track ring and radial line images on the paracentral and/or peripheral retina (i.e. within focus as perceived by a wearer's eye, or myopically defocused within a desired range as perceived by a wearer's eye). The tangential and sagittal image shells can be non-overlapping or overlapping.

In some embodiments, the micro-reticle and micro-lens pairs are designed such that the micro-reticle images on the paracentral and/or peripheral retina are within focus along at least one direction when the eye's accommodation is in its relaxed state with its central or foveal region viewing a far distance object, and that these micro-reticle images on the paracentral and/or peripheral retina are myopically defocused along at least one direction when the eye is accommodated with its central or foveal region viewing a near distance object.

In some embodiments, two different sets of micro-reticle and micro-lens pairs are designed to cast different sets of micro-reticle images on the paracentral and/or peripheral retina. A first set of the micro-reticle and micro-lens pairs are designed to form sharply focused reticle images substantially on or slightly in front of the paracentral and/or peripheral retina of a wearer's eye along at least one direction when the eye's accommodation is in its relaxed state, and a second set of micro-reticle and micro-lens pairs are designed to form sharply focused reticle images substantially on or slightly in front of the paracentral and/or peripheral retina of the wearer's eye along at least one direction when the eye is accommodated to focus on near object.

In some embodiments, the micro-lenses are designed with bifocal or multi-focal or extended-depth-of-focus properties such that the micro-reticles are imaged to the paracentral and/or peripheral retina with extended depth of focus to always ensure that the micro-reticle images are within focus along at least one direction regardless of the accommodation state of the eye. The micro-lens design can be that of concentric rings of different focusing powers such as a concentric Fresnel multi-focus lens or a progressive addition (or subtraction) lens or an axicon lens or a multi-focusing power toric lens or a multi-focusing power cylindrical lens or a combination of different lens types.

In one embodiment of the present invention, the micro-lenses are designed with their central portion functioning like a micro-lens to solely cause the micro-reticle image to land either substantially on or in front of the paracentral and/or peripheral retina (i.e. within focus as perceived by a wearer's eye, or myopically defocused within a desired range as perceived by a wearer's eye), and with their surrounding portion functioning like a mini-lens with substantially less optical focusing power than the central portion micro-lens does, and with the transition gradual to substantially reduce the effect of micro-lens-edge-induced defocused images on the paracentral and/or peripheral retina. Meanwhile the surrounding portion of the micro-lenses which functions as mini-lenses will have enough add power relative to the central refractive power of the spectacle lens to render or project paracentral and/or peripheral off-axis objects in the surrounding optical environment of the wearer's eye to be myopically defocused on the paracentral and/or peripheral retina.

In still another embodiment of the present invention, different groups of either micro-lenses and mini-lenses are designed with only the micro-lenses having corresponding micro-reticles to purely serve the function of imaging the micro-reticle to land either substantially on or in front of the paracentral and/or peripheral retina (i.e. within focus as perceived by a wearer's eye, or myopically defocused within a desired range as perceived by a wearer's eye), and with the other mini-lenses not having corresponding micro-reticles but purely to render paracentral and/or peripheral objects in the surrounding optical environment of the wearer's eye to be myopically defocused on the paracentral and/or peripheral retina.

In some embodiments, the mechanical frame's eye wire/rim that holds the spectacle lens or lens combination is made transparent. This is to substantially reduce the strongly hyperopic defocus optical signal of the frame's eye wire/rim image that lands on the peripheral retina.

In one embodiment, the spectacle lens is designed in a similar manner as a conventional single vision correction lens for myopia correction or as an Increased Resolvable Object Distance Range (IRODR) vision correction lens combination, and the frame's eye wire/rim is made of a relatively wide transparent optical media with micro-reticles on its outer side and corresponding micro-lenses on its inner side such that the micro-reticle images are projected by the micro-lenses together with other optical elements including those of the eye to land substantially on the peripheral retina (i.e. within focus as perceived by the wearer's eye) or in front of the peripheral retina (i.e. myopically defocused within a desired range as perceived by a wearer's eye).

In another embodiment, the spectacle lens is designed in a similar manner as a conventional single vision correction lens for myopia correction or as a IRODR vision correction lens combination but with micro-reticles and micro-lenses already made around the paracentral and/or peripheral of the spectacle lens, and meanwhile, the frame's eye wire/rim is made of a relatively wide transparent optical media with micro-reticles deposited on the outer side and corresponding micro-lenses made on the inner side. The micro-reticle images are relayed by the micro-lenses together with other optical elements including those of the eye to land substantially on the paracentral and peripheral retina (i.e. within focus as perceived by a wearer's eye) or in front of the paracentral and peripheral retina (i.e. myopically defocused within a desired range as perceived by a wearer's eye).

In some embodiments, the micro-reticle includes a pattern such as a line segment, a ring, a cross and/or hash, with the line direction in the radial (or meridional) direction and/or in the circumferential direction relative to the pupil of the eye or the center of the spectacle lens.

In another embodiment, the line width and line length of the micro-reticle pattern, and the spacing of the micro-reticle patterns, when imaged on or in front of the paracentral and/or peripheral retina, are correlated to enable the eye's paracentral and/or peripheral retinal detection and/or resolving acuity (i.e. the micro-reticle image in the paracentral and/or peripheral retinal region can still be resolved by the paracentral and/or peripheral retina per a wearer's paracentral and/or peripheral visual acuity).

In some embodiments, the line width of the micro-reticle pattern, when optically relayed to the paracentral and/or peripheral retina is equal to or greater than the size of paracentral and/or peripheral retinal cone cells.

In some embodiments, the line length of the micro-reticle pattern, when optically relayed to the paracentral and/or peripheral retina, is equal to or greater than the spacing/distance between two neighboring paracentral and/or peripheral retinal ganglion cells.

In some embodiments, the spacing/distance between two neighboring micro-reticle patterns, when optically relayed to the paracentral and/or peripheral retina is equal to or greater than the spacing/distance between two neighboring paracentral and/or peripheral retinal ganglion cells.

The objective of such a distribution is to ensure that micro-reticle images on the paracentral and/or peripheral region of the retina are resolvable by the wearer's eye per the distribution of the retinal cone and ganglion cells in these regions.

In one embodiment, the distribution of the micro-reticle and micro-lens pairs is such that while a certain percentage of the paracentral and/or peripheral retina is reserved for perceiving the presence and/or movement of paracentral and/or peripheral objects, the remaining percentage of the paracentral and/or peripheral retina is intercepted or covered by the micro-reticle images formed either substantially on the retina (i.e. within focus as perceived by a wearer's eye) or in front of the retina (i.e. myopically defocused within a desired range as perceived by a wearer's eye), with the micro-reticle images producing an overall stronger optical signal to stop eye growth than the optical signal that can potentially be produced by the paracentral and/or peripheral object images to stimulate eye elongation.

In some embodiments, the micro-reticles can be either completely opaque or semi-transparent. In one embodiment, the opaqueness or semi- or variable transparency of the micro-reticles is designed such that under normal indoor and/or outdoor lighting conditions, the micro-reticle images casted on the paracentral and/or peripheral retina always have high enough contrast such that these images are dominating over real optical environmental paracentral and/or peripheral object images produced by the surrounding environment the wearer's eye actually sees regardless of whether the eye is accommodated for near distance viewing or relaxed for far distance viewing.

In one embodiment, the semi- or variable transparency or opaqueness of the micro-reticles is designed such that under normal outdoor and/or indoor surrounding lighting conditions, when the eye's accommodation is relaxed to view far distance object, a first set of micro-reticle images that are substantially focused along at least one direction on the paracentral and/or peripheral retina have enough contrast to produce dominating perceived-within-focus signals for the paracentral and/or peripheral retina, while a second set of micro-reticle images not focused on the paracentral and/or peripheral retina (thus is blurred to some extent) do not have enough contrast to produce perceivable signals for the paracentral and/or peripheral retina; whereas when the eye's accommodation is changed to view near distance object, the second set of micro-reticle images that are now substantially focused along at least one direction on the paracentral and/or peripheral retina have enough contrast to produce dominating perceived-within-focus signals for the paracentral and/or peripheral retina, while the first set of micro-reticle images that are not focused on the paracentral and/or peripheral retina do not have enough contrast to produce perceivable signals for the paracentral and/or peripheral retina.

In another embodiment, the micro-reticles and/or the paracentral and/or peripheral region of the spectacle lens are colored to explore the most efficient color band or color contrast that will produce the strongest optical signals to slow down or stop eye elongation. The coloring can be the same or different among different micro-reticle images and the paracentral and/or peripheral region of the spectacle lens. Since there is more than one optical surfaces associated with the presently invented spectacle lens, any of the surfaces can be colored, including the surface(s) of the micro-lens as well as the surfaces of the spectacle lens(es). The color of the micro-reticles and/or the paracentral and/or peripheral region of the spectacle lens is designed such that under normal indoor and/or outdoor lighting conditions, the colored micro-reticle images of a wavelength range casted on the paracentral and/or peripheral retina always have high enough colored contrast such that these colored images are dominating in terms of producing optical signals to slow down or stop eye elongation over real paracentral and/or peripheral object images produced by the surrounding optical environment that the wearer's eye actually sees regardless of whether the eye is accommodated for near distance viewing or relaxed for far distance viewing.

As one embodiment of the present invention, micro-lenses and corresponding micro-reticles are made on the transparent eye wires/rims of a spectacle frame without or with a spectacle lens, with the micro-lenses configured to project micro-reticle images on or in front of the paracentral and/or peripheral retina. Another embodiment of the present invention is to use only a spectacle frame without a spectacle lens as anti-myopia means to treat myopia progression. In such a case, the spectacle frame's eye wires/rims are transparent and have micro-reticles and micro-lenses made on them to project micro-reticle images on the peripheral retina.

As another embodiment of the present invention, micro-lenses and corresponding micro-reticles are made on both the transparent eye wire/rim of the spectacle frame and also around the paracentral and/or peripheral zone of the spectacle lens. The micro-lenses are configured to project micro-reticle images on or in front of the paracentral and/or peripheral retina.

As still another embodiment of the present invention, micro-lenses and corresponding micro-reticles are made around the paracentral and/or peripheral region of a clip-on glass/layer that can be added to a spectacle lens in a similar way as a clip-on sun glass does.

One embodiment of the present invention is to embed solar cells or batteries (together with micro-electronic circuits) and light sensors on or in the spectacle frame or its eye wires/rims to enable sensing and/or activation of certain functions. In such a case, micro-reticles and micro-lenses are made on the eye wire/rim and/or the spectacle lens (or lens combination) and the micro-reticle pattern or its substrate can be transparent and light emitting. When the surrounding lighting is dim to result in below-threshold contrast of micro-reticles images, the micro-reticle pattern can be lit up to compensate the dim and to just increase the contrast of the micro-reticle images on the paracentral and/or peripheral retina to make the contrast of the micro-reticle images above threshold such that neurophysiological signals can always be created.

Still another embodiment of the present invention is to use a curved panoramic goggle glass/layer to treat myopia progression. In such a case, instead of using temples, elastic band(s) that circle(s) around the head is(are) used to mount the panoramic goggle relative to the eye. In such a case, the micro-reticle and micro-lens pairs are made on the paracentral and/or peripheral zone of the panoramic goggle glass/layer to project micro-reticle images on the paracentral and/or peripheral retina. This embodiment can be more suitable for relatively young children.

Note that the various features of the present invention described above may be practiced alone or in combination. These and other features of the present invention will be described in more detail below in the detailed description of the invention and in conjunction with the following figures.

BRIEF DESCRIPTION OF THE DRAWING

In order that the present invention may be more clearly ascertained, some embodiments will now be described, by way of example, with reference to the accompanying drawings, in which.

DETAILED DESCRIPTION

Figure 1A:
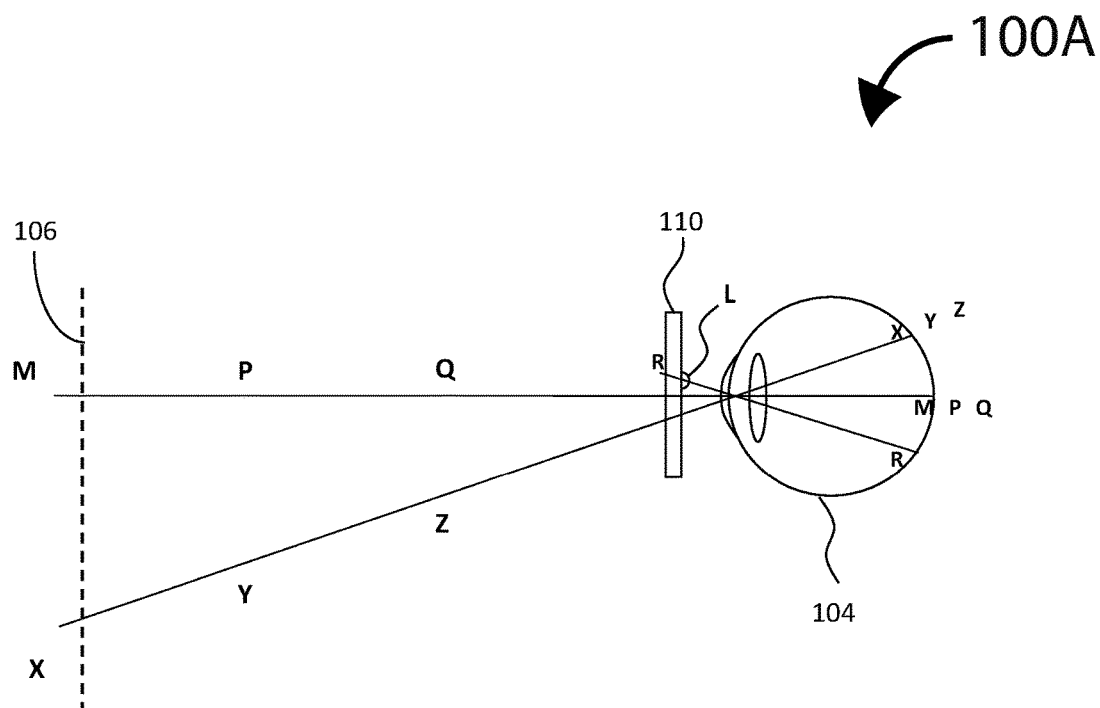
FIG. 1A shows the sharply focused image positions of various objects relative to the retina of a young emmetropic eye when such an eye is wearing a zero diopter spectacle lens that has the presently disclosed micro-reticle and its corresponding micro-lens and when the eye is fixating on a far way object.

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention. In the following description, numerous specific details are set forth in order to provide a thorough understanding of the various embodiments. However, the present invention may be practiced without some or all of these specific details. In other instances, well known process operations have not been described in detail in order not to unnecessarily obscure nor apply limitations to the present invention. Further, each appearance of the phrase "embodiment" at various places in the specification does not necessarily refer to the same example embodiment.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

There has been an unprecedented global epidemic of myopia (nearsightedness), caused by the increasing time that children spend on near visual tasks, including mobile devices and computers. The epidemic has a major impact on global health care costs and morbidity. Currently, 30% of the world population is myopic and by 2050, almost 50% will be myopic. The projected result is 5B myopes, and 1B high myopes by 2050.

The biological mechanisms that influence eye growth and hence refractive error development are not only dependent on fovea vision but also dependent on other portions of the retina. This means that the retina has a central as well as paracentral and/or peripheral retina role in optically regulating eye growth and that each area of retina processes the retinal image and influences the growth and/or biomechanics of the sclera. Therefore, optical intervention that can influence the image quality on the overall retina, and differentially on different retinal zones, can have an effect on refractive error development.

All children are at risk of developing myopia which emerges between the ages of 4 to 10 and continue to progress until up to 25 years of age. There are several approaches to prevent progression of myopia during this period, including pharmaceutical (i.e. low dose Atropine) and optical (i.e. specially designed contact lenses). However, in this vulnerable age group, chronic treatment with medicinal drops or contact lenses is particularly challenging. Therefore, spectacle based solution is advantageous.

However, traditional single vision correction spectacle has been found to foster instead of slow myopia progression. One possible reason for the relative increase in myopia progression is that such a single vision correction spectacle is prescribed to only fully correct central or fovea vision for a far distance object, when the wearer is indoor and looks at a near object, a limit in accommodation range (called accommodation lag) can cause the image of the near object to land behind the fovea, thus producing a neurophysiological signal that will trigger the eye to elongate.

An interesting discovery in terms of central foveal vision correction is that under-correction cannot slow down myopia progression; on the contrary, under-correction accelerates myopia progression. This discovery means that it is necessary to design anti-myopia-progression lenses with at least some degree of central foveal full correction within some extended accommodation range. Examples of such designs include bifocals (such as executive bifocals) and progressive addition lenses (PALs) based spectacles. However, these spectacles have been found to provide limited control in myopia progression, in part because compliance of the wearer to always look through the near addition portion for near work cannot be guaranteed.

Another possible reason for the progression of myopia when a single vision correction spectacle is worn is that for paracentral and/or peripheral off axis objects, the spectacle lens will optically relay the off-axis objects to form paracentral and/or peripheral off-axis images that are focused behind the paracentral and/or peripheral retina (i.e. hyperopically defocused on the paracentral and/or peripheral retina), thus producing a neurophysiological signal that will trigger the eye to elongate.

Still another possible reason for the progression of myopia when a single vision correction spectacle is worn is that the optical structure of the surrounding environment can produce dominating paracentral and/or peripheral retinal images across the visual field for different indoor environments that are behind the paracentral and/or peripheral retina (i.e. hyperopically defocused on the paracentral and/or peripheral retina). In regard to this situation, the position of paracentral and/or peripheral images relative to the paracentral and/or peripheral retina is dependent not only on the optical structure of the surrounding environment but also on the fixation point and the accommodation of the wearer's eye. This means that in the case of indoor near vision, while accommodation can increase the focusing power of the natural ocular lens to achieve sharp foveal vision, this accommodation can also cause the images of near distance paracentral and/or peripheral objects to land much more behind the paracentral and/or peripheral retina compared to outdoor cases. In other words, when a person wearing a single vision correction spectacle changes his/her fixation from far to near or moves his/her fixation in an indoor scene, although the fovea may experience very small change in the sharpness of the central image due to natural accommodation to refocus the central image on the fovea, the paracentral and/or peripheral objects can change relatively significantly depending on the surrounding optical environment and thus produce dominating hyperopically blurred paracentral and/or peripheral images on the paracentral and/or peripheral retina, leading to eye elongation.

Inferior attempts have been made to under correct peripheral vision (i.e. with add-on-power only around the peripheral zone of a spectacle lens to make peripheral retinal images in myopic defocus) include the use of peripheral add-on-power spectacles (see for example U.S. Pat. No. 7,025,460 ("Smitth '460") and U.S. Pat. No. 10,268,050 ("To '050"). However, these spectacles have also been found to provide limited control in myopia progression. One possible explanation on why they failed to produce high enough efficacy to halt the progression of myopia is that the surrounding optical structure of the environment, especially an indoor environment, is not in the control of the spectacle designer or the wearer, and can therefore make the peripheral retinal images of different peripheral objects either in sharp focus, or in myopic defocus, or in hyperopic defocus, on the peripheral retina as a result of the eye fixation and surrounding environmental changes.

In accordance with this invention, much improved control is provided to ensure that sufficient dominating paracentral and/or peripheral images are created on the paracentral and/or peripheral retina with desired focus status. These substantially dominating paracentral and/or peripheral images are created by reticle-focusers located on or in the spectacle lens and/or the spectacle eye wire/rim to focus reticles integrated with the spectacle lens and/or the spectacle eye wire/rim such that the integrated reticle is presented to a spectacle wearer's eye as a paracentral and/or peripheral object coming from well-defined paracentral and/or peripheral distances so the reticle image will be perceived by the wearer as either within focus or somewhat myopically defocused on the paracentral and/or peripheral retina. In other words, the each reticle-focuser in combination with the optical elements of a wearer's eye (including the cornea and the ocular lens) will optical relay an integrated reticle to sharply focus at least along one retina direction either on the paracentral and/or peripheral or somewhat in front of the paracentral and/or peripheral retina.

In some embodiments, micro-reticles are integrated as part of the spectacle lenses and/or as part of the eye wire/rim of a spectacle frame in combination with micro-lenses (with focusing power in at least one direction in the form of cylinder lens or in two directions in form of spherical or aspherical lens or toric lens or in the form of bifocal or multi-focal or extended-depth-of-focus lens or even in the form of an axicon or a free form lens) that are also made as part of the spectacle lenses and/or as part of the eye wire/rim of a spectacle frame. As a result, under-control micro-reticle images are deliberately projected onto the paracentral and/or peripheral retina. These eye wire/rim and/or paracentral and/or peripheral zone designs of a spectacle produce in-focus, and/or in-myopic-defocus, reticle images on the paracentral and/or peripheral retina with desired size, contrast and spatial distribution, thus resulting in overall dominating neurophysiological signals to halt eye elongation and hence myopic progression when compared to those generated by surrounding optical environment.

FIG. 1A shows the sharply focused image positions of various objects relative to the retina of a young emmetropic eye 104 when such an eye 104 is wearing a zero diopter spectacle lens 110 that has the presently disclosed micro-reticle R and its corresponding micro-lens L and when the eye is fixating on a far way object represented by the dashed line 106. In this case, the micro-reticle R is imaged by the micro-lens L and the eye 104 to land on or slightly in front of the paracentral and/or peripheral retina. Other objects (M, P, Q as central objects and X, Y, Z as paracentral or peripheral objects) from the surrounding optical environment are imaged by the zero diopter spectacle lens 110 and the eye 104 to land at different positions relative to the retina.

Figure 1B:
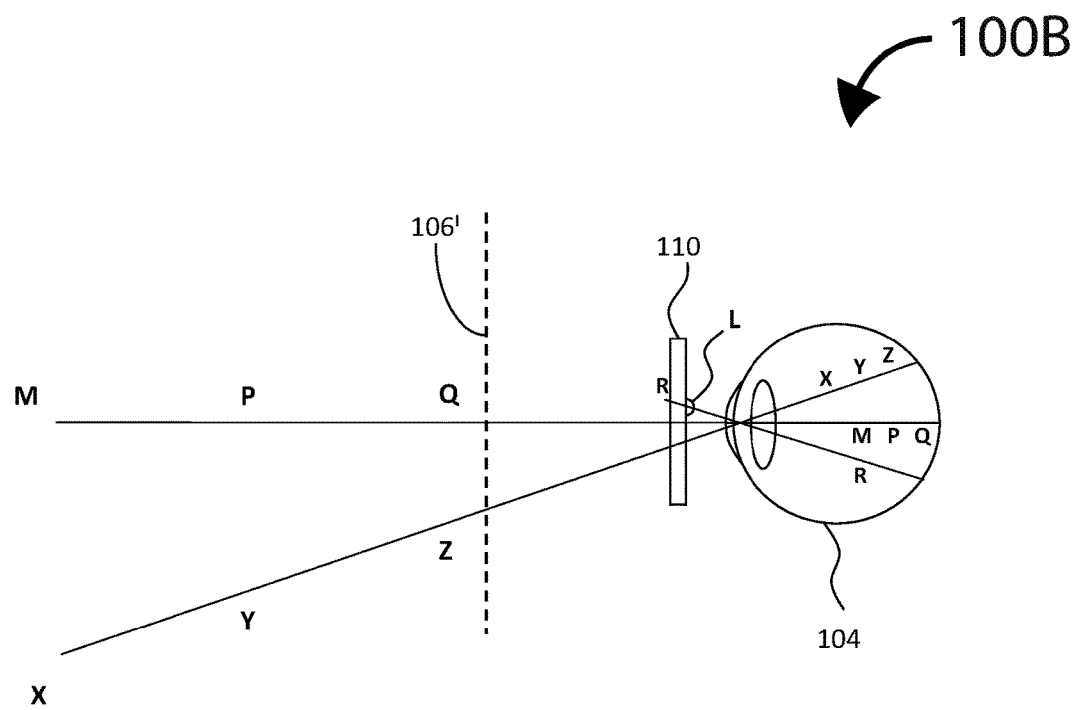
FIG. 1B shows the sharply focused image positions of various objects relative to the retina of a young emmetropic eye when such an eye is wearing a zero diopter spectacle lens that has the presently disclosed micro-reticle and its corresponding micro-lens and when the eye is fixating on a near object.

FIG. 1B shows the sharply focused image positions of various objects relative to the retina of a young emmetropic eye 104 when such an eye is wearing a zero diopter spectacle lens 110 that has the presently disclosed micro-reticle R and its corresponding micro-lens L and when the eye is fixating on a near object represented by the dashed line 106'. In this case, the focusing power of the ocular lens is increased compared to that in FIG. 1A and as a result, the micro-reticle R is imaged by the micro-lens L and the eye 104 with increased focusing power to land in front of the paracentral and/or peripheral retina. Other objects (M, P, Q as central objects and X, Y, Z as paracentral or peripheral objects) from the surrounding optical environment are imaged by the zero diopter spectacle lens 110 and the eye 104 to land at different positions relative to the retina.

Figure 2A:
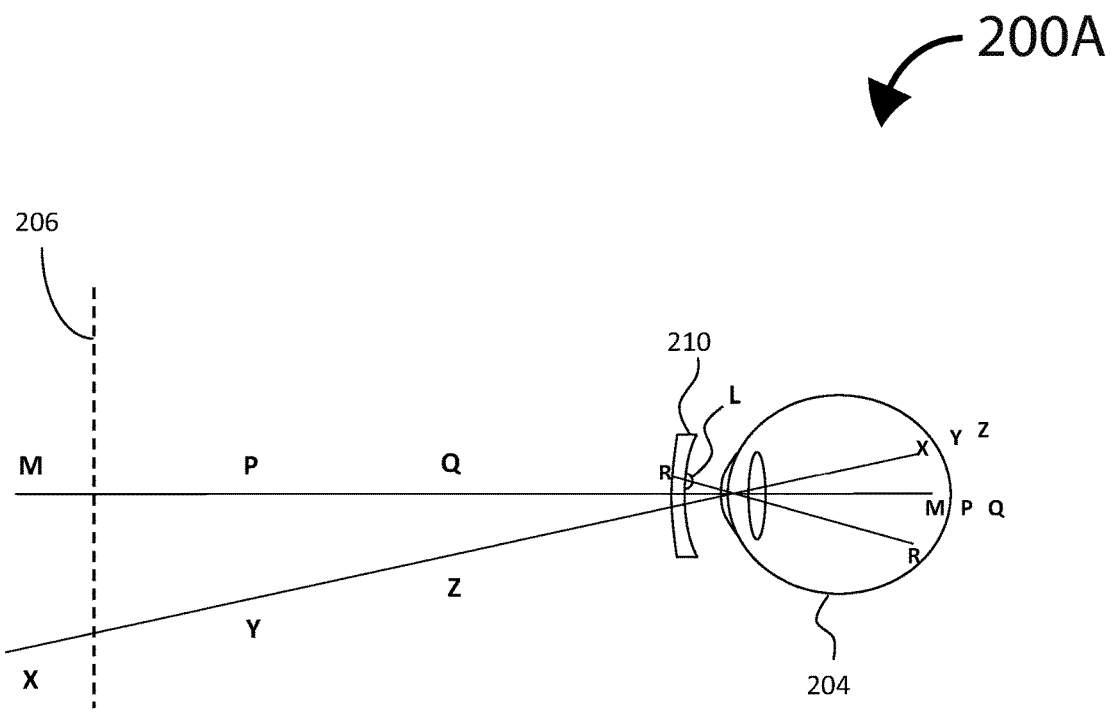
FIG. 2A shows the sharply focused image positions of various objects relative to the retina of a young myopic eye when such an eye is wearing a minus diopter value spectacle lens that has the presently disclosed micro-reticle and its corresponding micro-lens and when the eye is fixating on a far way object.

FIG. 2A shows the sharply focused image positions of various objects relative to the retina of a young myopic eye 204 when such an eye is wearing a minus diopter value spectacle lens 210 that has the presently disclosed micro-reticle R and its corresponding micro-lens L and when the eye is fixating on a far way object represented by the dashed line 206. In this case, the micro-reticle R is imaged by the micro-lens L and the eye 204 to land on or slightly in front of the paracentral and/or peripheral retina. Other objects (M, P, Q as central objects and X, Y, Z as paracentral or peripheral objects) from the surrounding optical environment are imaged by the minus diopter value spectacle lens 210 and the eye 204 to land at different positions relative to the retina.

Figure 2B:
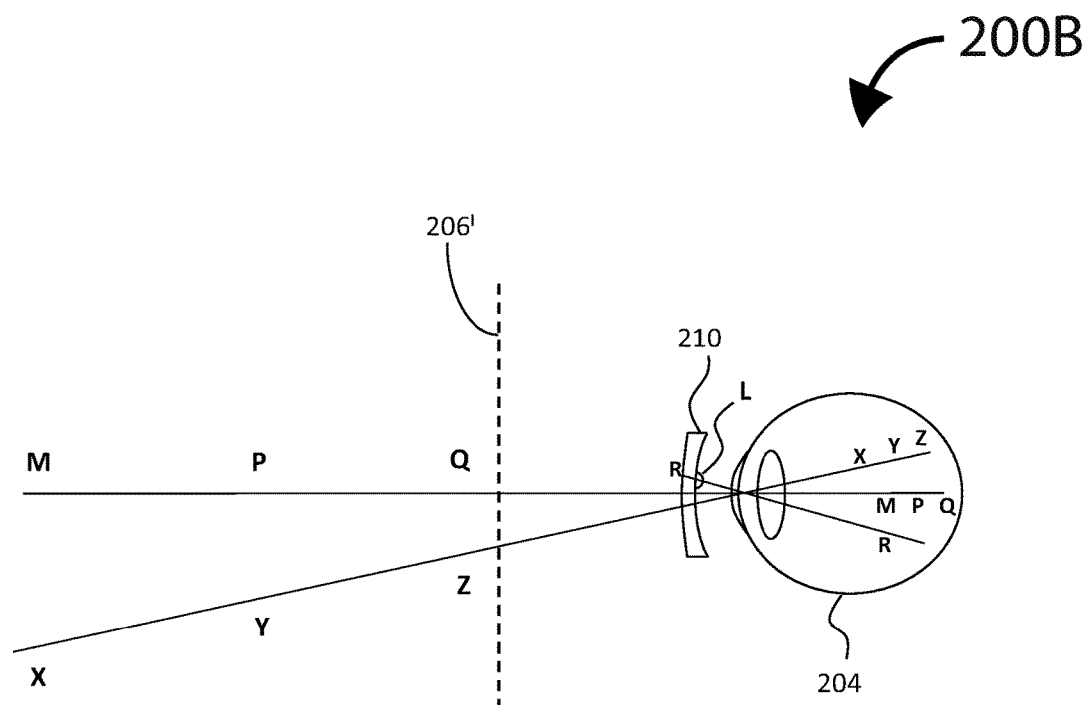
FIG. 2B shows the sharply focused image positions of various objects relative to the retina of a young myopic eye when such an eye is wearing a minus diopter value spectacle lens that has the presently disclosed micro-reticle and its corresponding micro-lens and when the eye is fixating on a near object.

FIG. 2B shows the sharply focused image positions of various objects relative to the retina of a young myopic eye 204 when such an eye is wearing a minus diopter value spectacle lens 210 that has the presently disclosed micro-reticle R and its corresponding micro-lens L and when the eye is fixating on a near object represented by the dashed line 206'. In this case, the focusing power of the ocular lens is increased compared to that in FIG. 2A and as a result, the micro-reticle R is imaged by the micro-lens L and the eye 204 with increased focusing power to land in front of the paracentral and/or peripheral retina. Other objects (M, P, Q as central objects and X, Y, Z as paracentral or peripheral objects) from the surrounding optical environment are imaged by the minus diopter value spectacle lens 210 and the eye 204 to land at different positions relative to the retina.

Figure 3A:
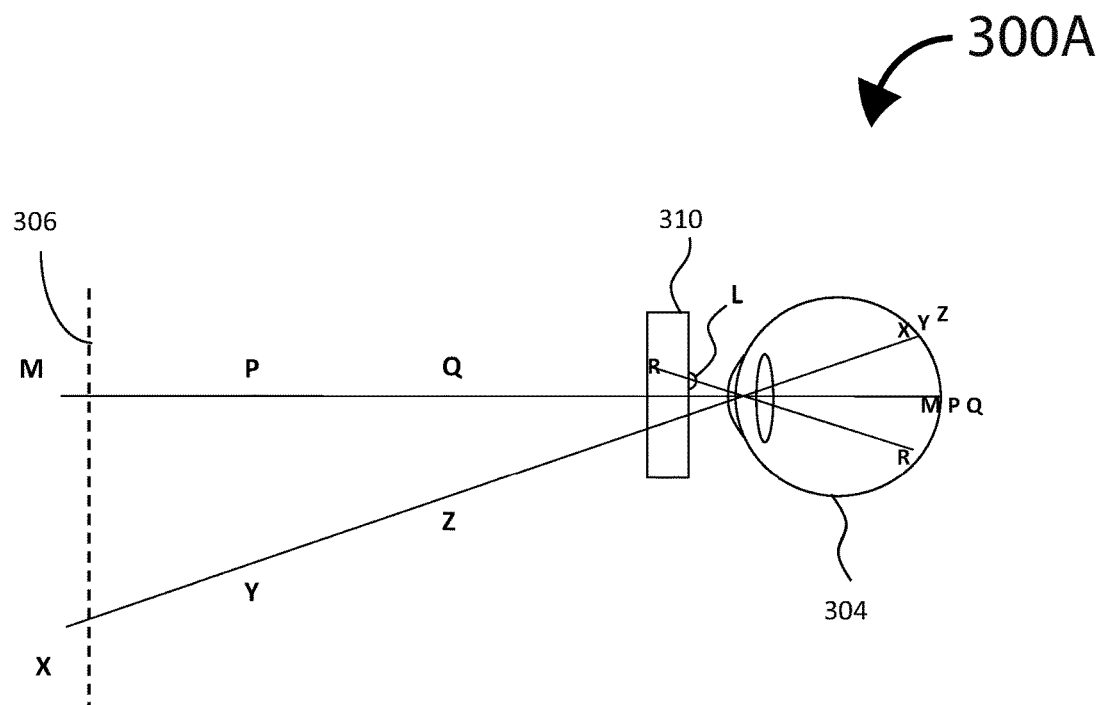
FIG. 3A shows the sharply focused image positions of various objects relative to the retina of a young emmetropic or myopic eye when such an eye is wearing an Increased Resolvable Object Distance Range (IRODR) central vision correction spectacle lens that has the presently disclosed micro-reticle and its corresponding micro-lens and when the eye is fixating on a far way object.

FIG. 3A shows the sharply focused image positions of various objects relative to the retina of a young emmetropic or myopic eye 304 when such an eye is wearing an Increased Resolvable Object Distance Range (IRODR) central vision correction spectacle lens 310 that has the presently disclosed micro-reticle R and its corresponding micro-lens L and when the eye is fixating on a far way object represented by the dashed line 306. In this case, the micro-reticle R is imaged by the micro-lens L and the eye 304 to land on or slightly in front of the paracentral and/or peripheral retina. Other objects (M, P, Q as central objects and X, Y, Z as paracentral or peripheral objects) from the surrounding optical environment are imaged by the IRODR central vision correction spectacle lens 310 and the eye 304 to land closer relative to each other at different positions relative to the retina.

Figure 3B:
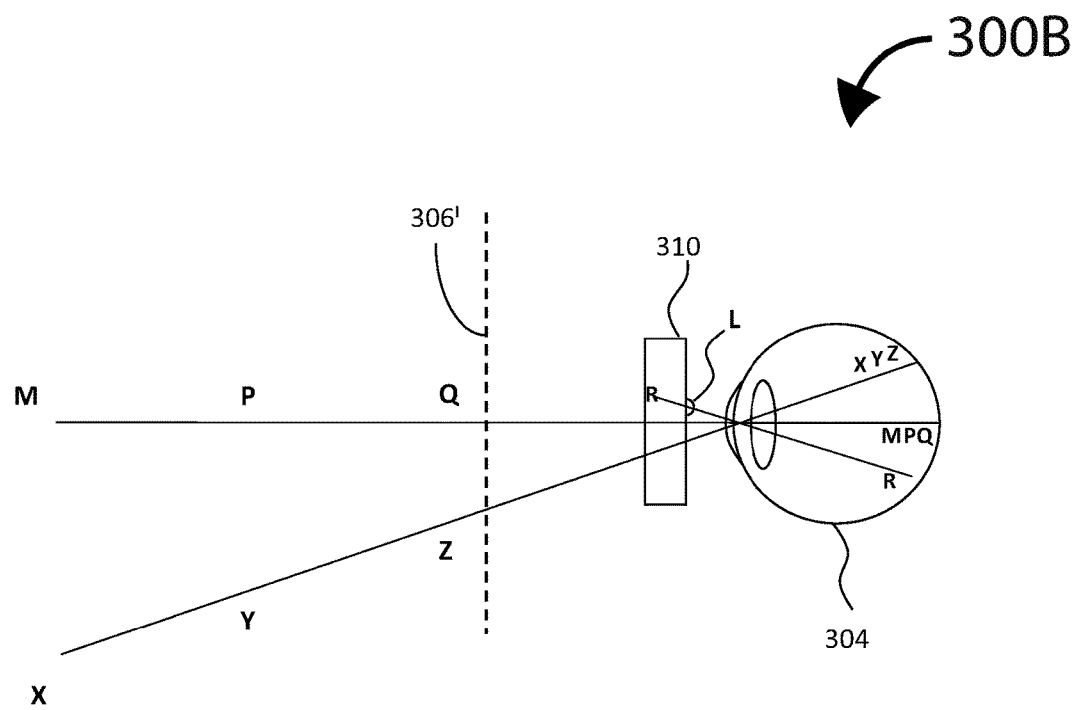
FIG. 3B shows the sharply focused image positions of various objects relative to the retina of a young emmetropic or myopic eye when such an eye is wearing an Increased Resolvable Object Distance Range (IRODR) central vision correction spectacle lens that has the presently disclosed micro-reticle and its corresponding micro-lens and when the eye is fixating on a near.

FIG. 3B shows the sharply focused image positions of various objects relative to the retina of a young emmetropic or myopic eye 304 when such an eye is wearing an Increased Resolvable Object Distance Range (IRODR) central vision correction spectacle lens 310 that has the presently disclosed micro-reticle R and its corresponding micro-lens L and when the eye 304 is fixating on a near object represented by the dashed line 306'. In this case, the focusing power of the ocular lens is slightly increased compared to that in FIG. 3A and as a result, the micro-reticle R is imaged by the micro-lens L and the eye 304 with increased focusing power to land slightly more in the front of the paracentral and/or peripheral retina. Other objects (M, P, Q as central objects and X, Y, Z as paracentral or peripheral objects) from the surrounding optical environment are imaged by the IRODR central vision correction spectacle lens 310 and the eye 304 to land closer relative to each other at different positions relative to the retina.

Figure 4A:
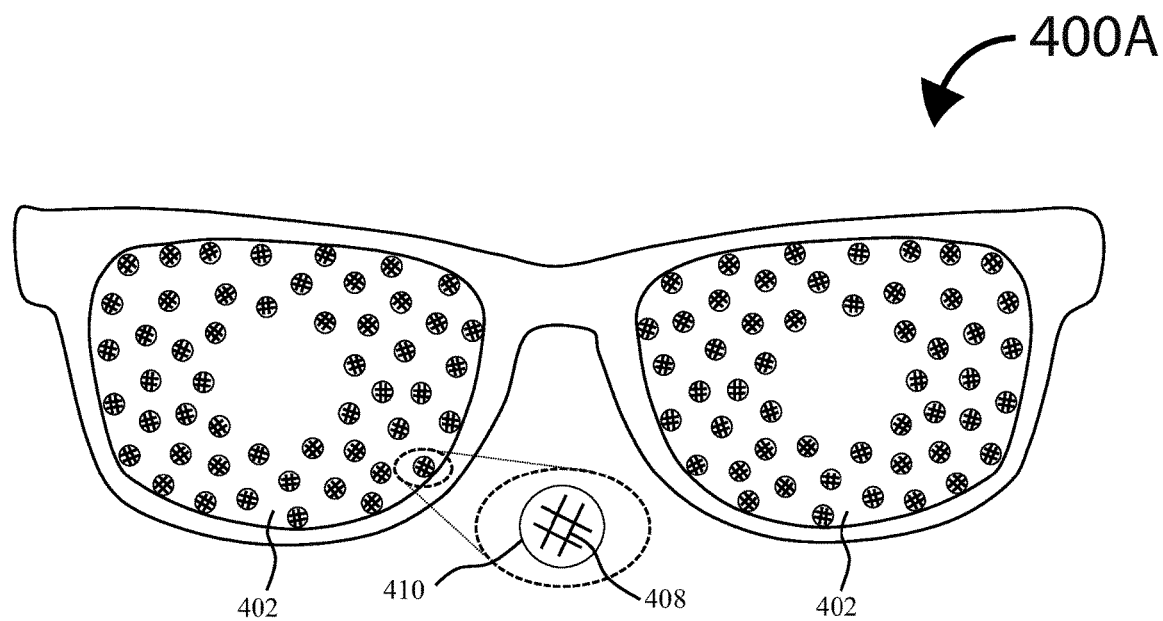
FIGS. 4A-B show an embodiment of the present invention when applied to a single vision correction spectacle lens where the front surface of the spectacle lens is deposited with micro-reticle patterns around the paracentral and/or peripheral zone and the back surface of the single vision correction spectacle lens has corresponding micro-lenses.
Figure 4B:
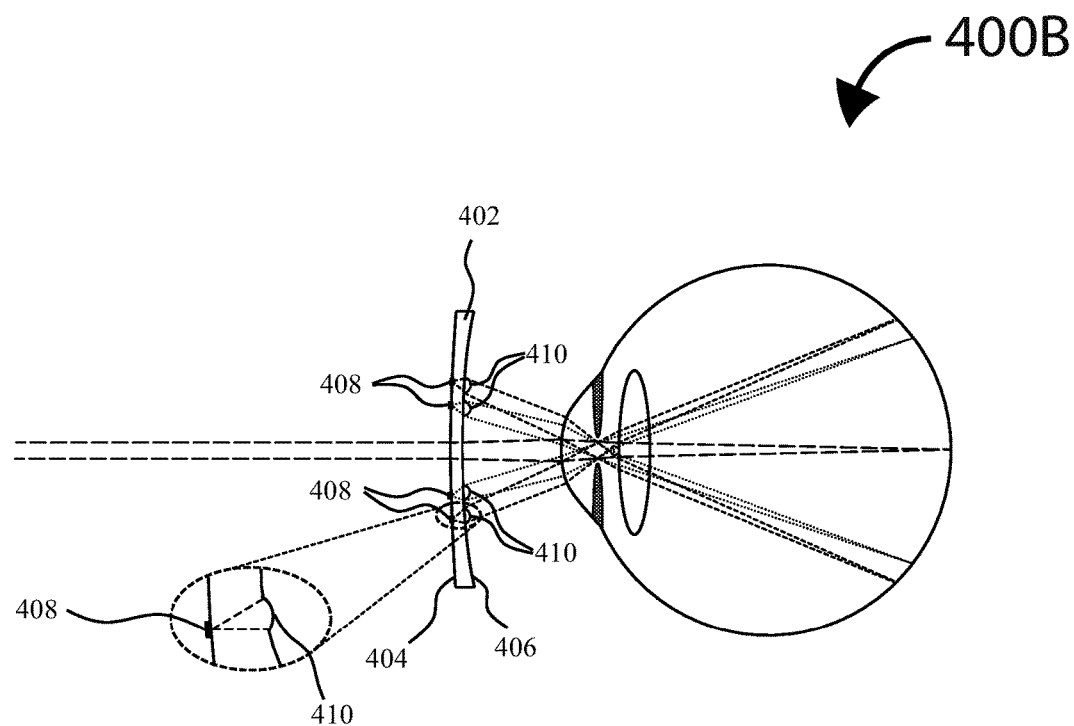

FIGS. 4A-4B show one embodiment of the present invention wherein the integrated recticle(s) include multiple micro-reticles, and wherein the reticle focuser include micro-lenses located on or as part of a single vision correction spectacle lens. In this embodiment, each single vision correction spectacle lens 402 has a front surface 404 and a back surface 406. On the front surface 404, micro-reticles 408 are positioned deposited or embedded, with optional protective over-coating around the paracentral and/or peripheral zone of the single vision correction spectacle lens 402. In this embodiment, micro-reticles 408 include a pattern such as a hash symbols (although other patterns such as a cross, a checker board pattern, or just a line segment can all be options). FIG. 4A is a front view of the single vision correction spectacle, and as short thicker line-width segments on the left side of the single vision correction spectacle lens in FIG. 4B as a cross-sectional view of the single vision correction spectacle lens positioned in front of a wearer's eye. On the back surface 406 of the single vision correction spectacle lens 402, there are corresponding micro-lenses 410 imprinted or molded or embedded there. These micro-lenses 410 are represented as thinner line-width circles in FIG. 4A and as bumps on the right side of the single vision correction spectacle lens 402 in FIG. 4B.

In this embodiment, each micro-reticle pattern has a corresponding micro-lens. The relative position of each micro-reticle and micro-lens pair is such that light rays from a micro-reticle will be focused by its corresponding micro-lens to create a virtual micro-reticle image in front of the wearer's eye at a desired object distance such that the eye can focus this virtual reticle image with the light rays from the micro-reticle that pass through the eye pupil to form a real reticle image that lands substantially on the paracentral and/or peripheral retina (as shown in FIG. 4B), or land in front of the paracentral and/or peripheral retina (not shown in FIG. 4B).

It should be noted that the present invention is very different from that of To '050 (that describes the principle of operation of the MyoSmart spectacle with D.I.M.S. Technology (Defocus Incorporated Multiple Segments Technology) from Hoya Corp) in several aspects. Firstly, the island-shaped lenses as disclosed in To '050 are designed to optically image objects from surrounding optical environment to somewhere in front the peripheral retina. The idea is to add power with a dioptric addition value of about 2 D to 5 D to that of the spectacle lens but in the form of distributed islands to make the wearer's eye see peripheral objects from surrounding optical environment as myopically defocused on the peripheral retina. In this invention, the micro-lenses made as part of the spectacle lens are designed to optically image corresponding micro-reticles which are objects not from the surrounding optical environment but from the spectacle lens front surface to land either on, or in front of, the paracentral and/or peripheral retina. Due to the very short distance of typically a few millimeters between the micro-reticle and the micro-lens, the focusing power of the micro-lens in dioptric value is of the order of 100 D to 1000 D and is thus much larger than that in To '050.

Unlike the present invention, the island-shaped mini-lenses as disclosed in To '050 can be made on the front or object side surface simply because they are meant to image objects from the surrounding optical environment. In contrast, Applicants' micro-lenses cannot be on the very front or first object side surface because there is a need for a practical distance between the micro-reticle on the spectacle lens and the micro-lens also on the spectacle lens to optically project the micro-reticle image to the eye.

Meanwhile, due to the very short distance between the micro-reticle and the corresponding micro-lens of the present invention, the focal length of the micro-lens is very short (of the order of millimeter) and the optical magnification associated with the micro-lens is very large, in a similar manner as that of a typical microscope. In contrast, the island-shaped mini-lens of To '050 has a much larger focal length (of the order of meter), so the associated optical magnification is much less.

In addition, the object distance of surrounding optical environment objects that are to be focused by the island-shaped mini-lenses as disclosed in To '050 are beyond control as surrounding environment can change a lot. In this invention, the micro-reticle object distance relative to the corresponding micro-lens is fixed so it is under much better control.

Unlike the present invention, the island-shaped mini-lenses as disclosed in To '050 are meant to transmit as much light from the surrounding optical environment such that sufficient visibility can be maintained. In this invention, there is intentional blocking (at least partial blocking) of light by the darker portion(s) of the micro-reticle arranged in front of its corresponding micro-lens so a micro-pattern image of certain contrast can be formed substantially on, or in front, of the paracentral and/or peripheral retina.

Still another difference is that the island-shaped mini-lenses as disclosed in To '050 are relatively closely packed (separated from each other by a distance almost equal to a value of a lens diameter center to center) and the dimension of each island-shaped mini-lens is of the order of millimeters (0.8 mm to 2.0 mm as stated in the patent specification). In this invention, the micro-lenses are more sparsely distributed and the size of each micro-lens in at least the light focusing direction is of the order of a few hundred micrometers.

Figure 5A:
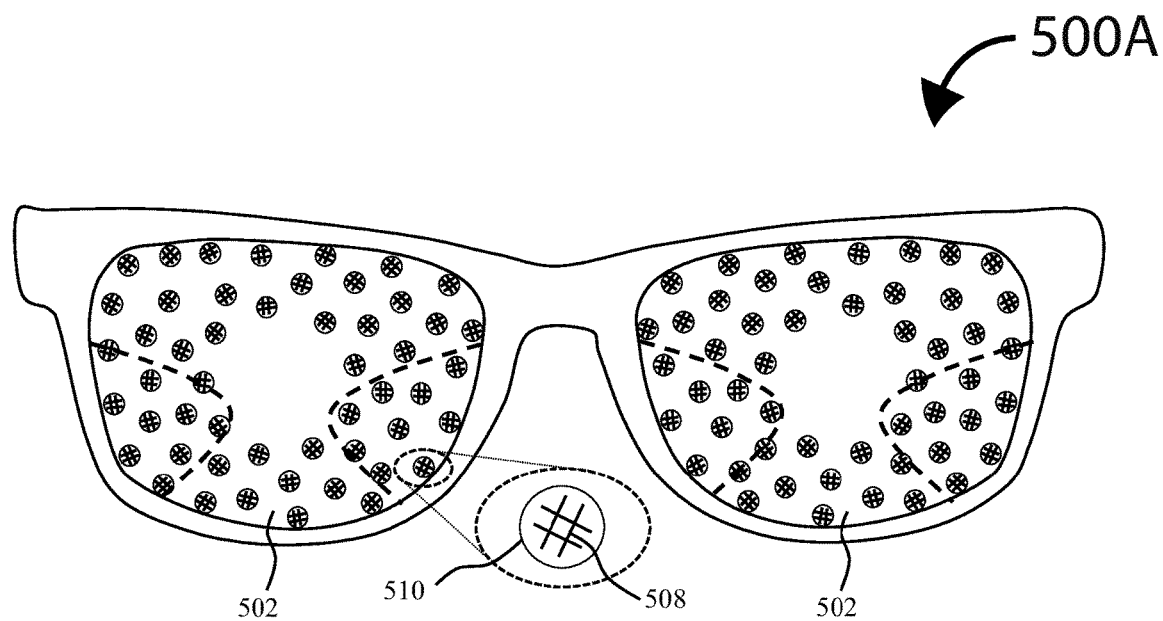
FIGS. 5A-B show an embodiment of the present invention when applied to a progression addition vision correction spectacle lens where the front surface of the spectacle lens is deposited with micro-reticle patterns around the paracentral and/or peripheral zone and the back surface of the single vision correction spectacle lens has corresponding micro-lenses.
Figure 5B:
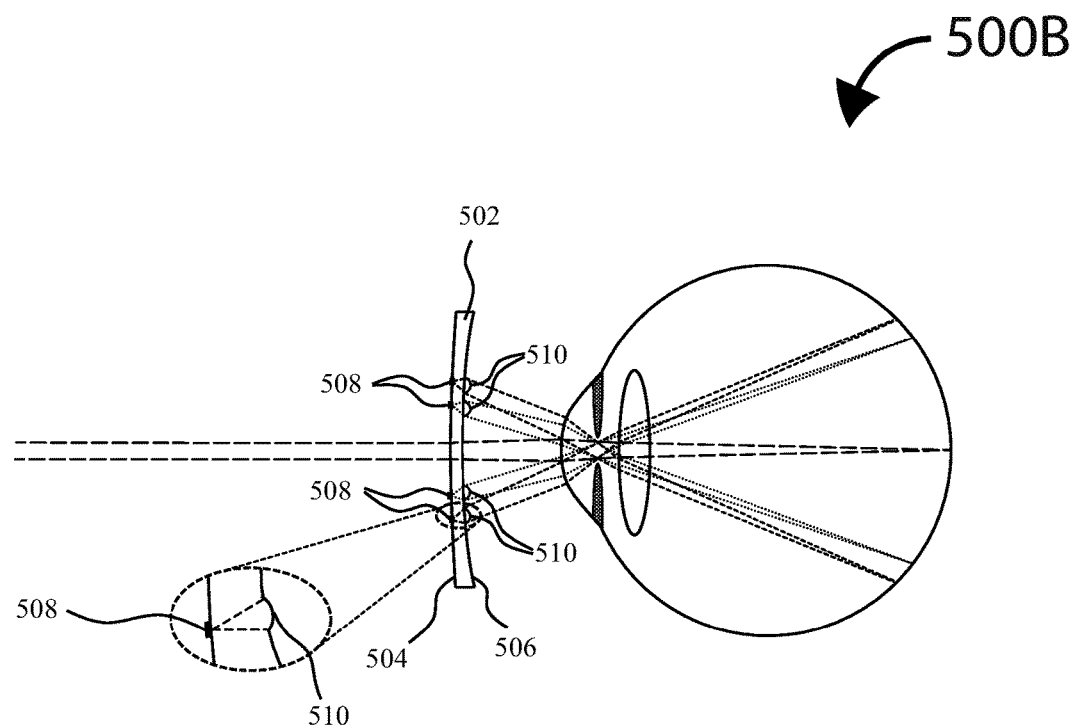

FIGS. 5A-B show an embodiment of the present invention with the micro-reticles and micro-lenses made on or as part of a conventional progressive addition spectacle lens. In such a case, the spectacle lens has two dashed-curve-defined blending zones on the left and right of each spectacle lens, an upper distance vision zone above the two blending zones, a progressive corridor in between the two blending zones acting as an intermediate vision zone, and a near vision zone below the two blending zones.

In this embodiment, each progressive addition spectacle lens 502 has a front surface 504 and a back surface 506. On the front surface 504 of the progressive addition spectacle lens 502, there are micro-reticle patterns 508 deposited or embedded with protective over-coating around the paracentral and/or peripheral zone of the progressive addition spectacle lens 502. These micro-reticles are represented as hash symbols in FIG. 5A as front view of the progressive addition lens spectacle, and as short thicker line-width segment on the left side of the progressive addition spectacle lens in FIG. 5B as cross-sectional view of the progressive addition lens positioned in front of a wearer's eye. On the back surface 506 of the progressive addition spectacle lens 502, there are corresponding micro-lenses 510 imprinted or molded or embedded there. These micro-lenses 510 are represented as thinner line-width circles in FIG. 5A and as bumps on the right side of the progressive addition spectacle lens 502 in FIG. 5B.

It should be noted that in addition to improving a progressive addition spectacle lens, the micro-reticles and micro-lenses of the present invention can also be used to improve any peripheral add-power spectacle lens (including the Myopilux Plus spectacle lens from Essilor International, the MyoVision lens from Zeiss as well as the MyoSmart spectacle from Hoya as disclosed in To '050) where the add-power is meant to either enable near vision with reduced accommodation demand or to enable off-axis objects of surrounding optical environment to be imaged in front of peripheral retina.

It should also be noted that all those features as discussed for the case of a single vision correction spectacle lens in terms of the relative positions and relationship between the micro-reticles and the micro-lenses and their spatial distribution and size etc. can all be applied to the progressive addition spectacle lens case and also the other peripheral add-power spectacle lens cases.

Figure 6A:
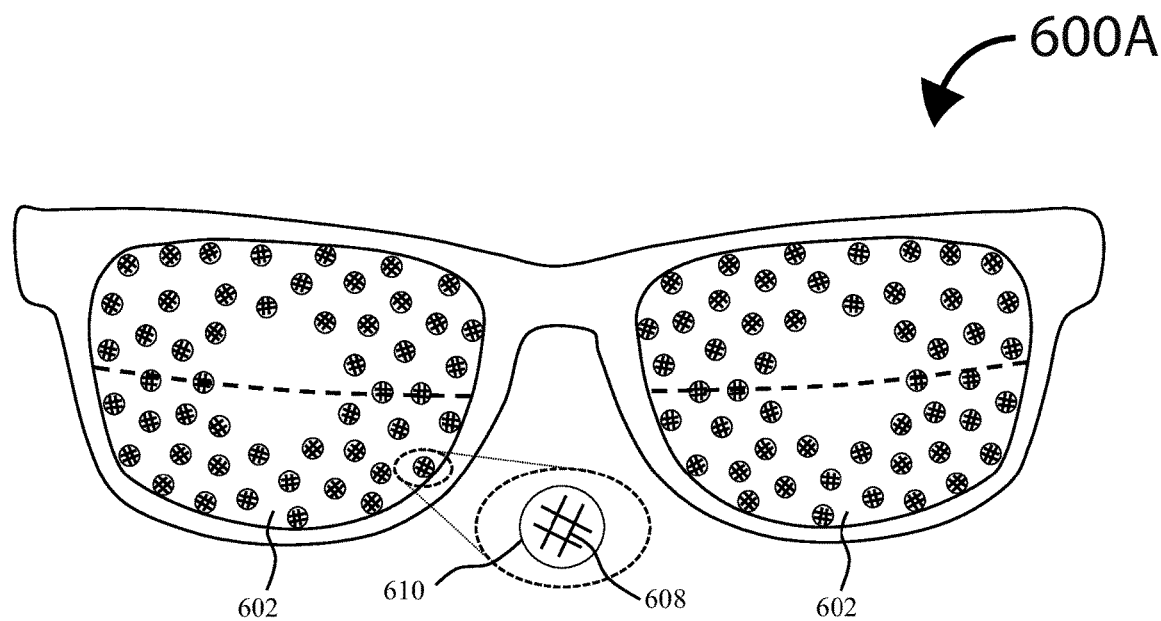
FIGS. 6A-B show an embodiment of the present invention when applied to an executive bi-focal vision correction spectacle lens where the front surface of the spectacle lens is deposited with micro-reticle patterns around the paracentral and/or peripheral zone and the back surface of the vision correction spectacle lens has corresponding micro-lenses.
Figure 6B:
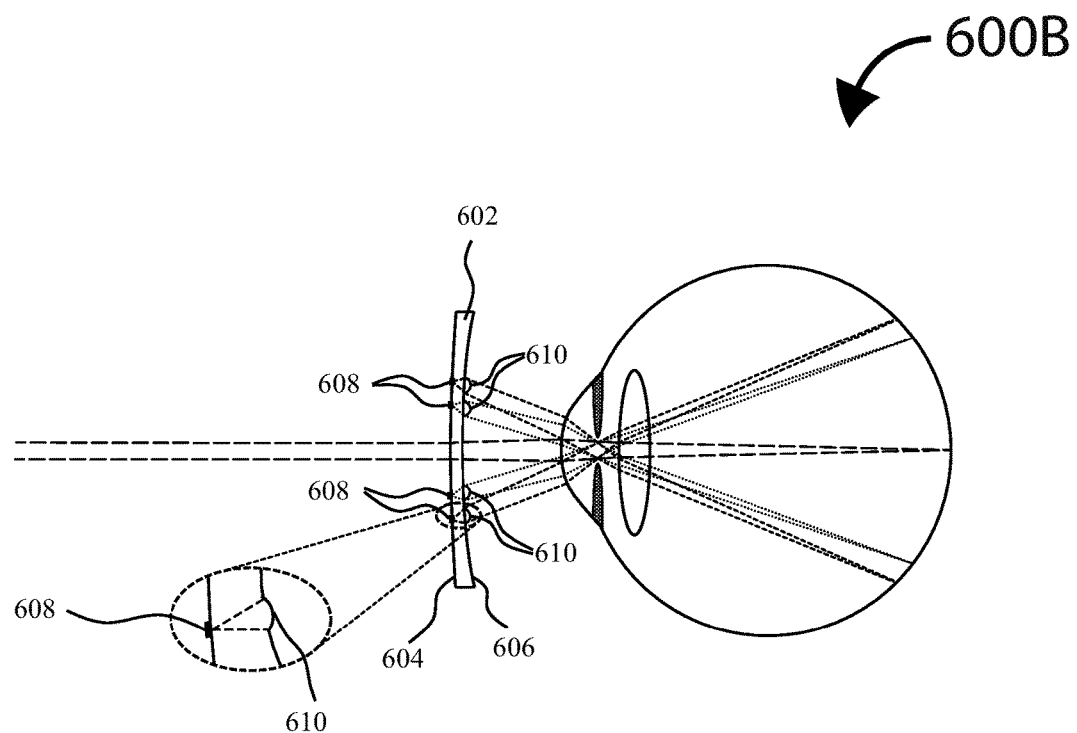

FIGS. 6A-B show an embodiment of the present invention wherein the exemplary micro-reticles and micro-lenses are additionally incorporated with an executive bifocal spectacle lens such as the Myopilux Max spectacle lens from Essilor International. In such a case, the spectacle lens has a dashed-line drawn horizontally across the center to divide the spectacle lens into an upper distance vision zone and a lower near vision zone.

In this embodiment, each executive bifocal spectacle lens 602 has a front surface 604 and a back surface 606. On the front surface 604 of the executive bifocal spectacle lens 602, there are micro-reticle patterns 608 deposited or embedded with protective over-coating around the paracentral and/or peripheral zone of the executive bifocal spectacle lens 602. These micro-reticles 608 are represented as hash symbols in FIG. 6A as front view of the executive bifocal lens spectacle, and as short thicker line-width segment on the left side of the executive bifocal spectacle lens in the FIG. 6B as cross-sectional view of the executive bifocal lens 602 positioned in front of a wearer's eye. On the back surface 606 of the executive bi-focal spectacle lens 602, there are corresponding micro-lenses 610 imprinted or molded or embedded there. These micro-lenses 610 are represented as thinner line-width circles in FIG. 6A and as bumps on the right side of the executive bifocal spectacle lens 602 in FIG. 6B.

It should be noted that in addition to an executive bifocal spectacle lens, the exemplary micro-reticles and micro-lenses of the present invention can also be additionally incorporated with a conventional bifocal (like the D-segment bifocal, the round segment bifocal and the blended bifocal) or trifocal (like the flat-top trifocal and the executive trifocal) or multi-focal or extended-depth-of-focus spectacle lens.

It should also be noted that all those features as discussed for the case of a single vision correction spectacle lens in terms of the relative positions and relationship between the micro-reticles and the micro-lenses and their spatial distribution and size etc. can all be applied to the executive bifocal spectacle lens case and also the other bifocal (like the D-segment bifocal, the round segment bifocal and the blended bifocal) or trifocal (like the flat-top trifocal and the Executive trifocal) or multi-focal (like those based on concentric Fresnel zones of different focal lengths) or extended-depth-of-focus (like those based on diffractive concentric rings) spectacle lens cases.

The following several figures show different embodiments of the present invention with the micro-reticles and micro-lenses made on, or as part of, or as an addition to, an Increased Resolvable Object Distance Range (IRODR) spectacle lens combination as disclosed in U.S. Provisional Patent Application No. 62/649,669. It should be pointed out that the reason why there are several ways to arrange the micro-lenses and the corresponding micro-reticles is the fact that the basic structure of an IRODR spectacle lens combination comprises a first negative lens and a second positive lens (or a negative and positive lens combination), and therefore there are possibly four optical interfaces and a gap in between the first negative lens and the second positive lens that one can use to arrange the micro-reticles and micro-lenses.

Figure 7A:
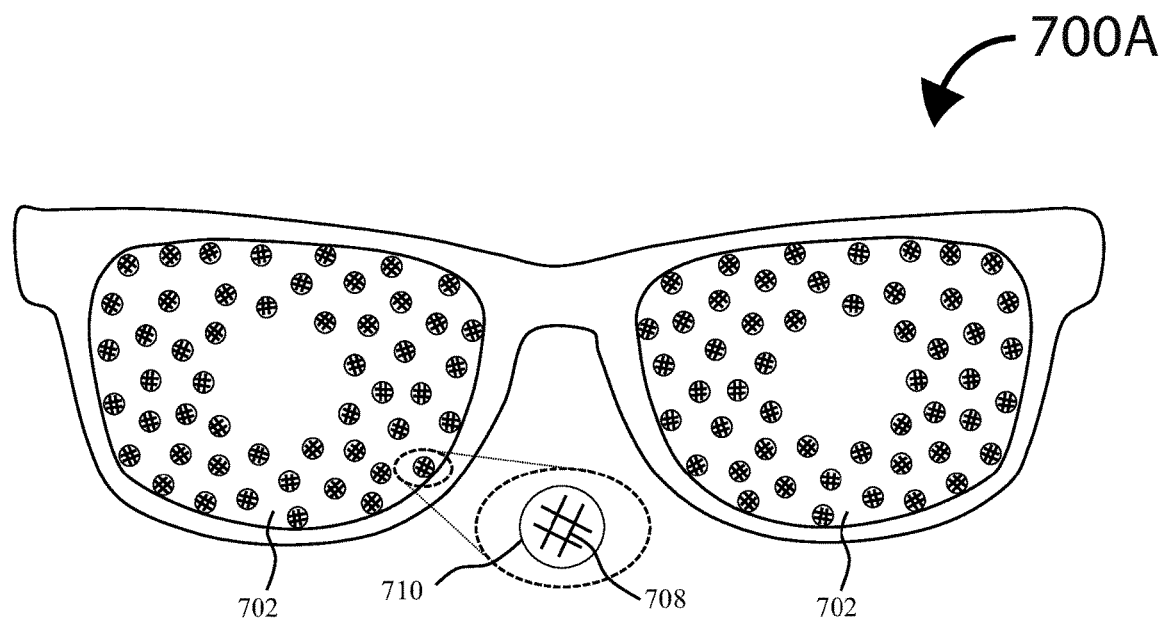
FIGS. 7A-B show an embodiment of the present invention when applied to an Increased Resolvable Object Distance Range (IRODR) spectacle lens combination with the micro-reticles made on the front surface of the first negative lens and with the micro-lenses made on the back surface of the first negative lens of the IRODR spectacle lens combination.
Figure 7B:
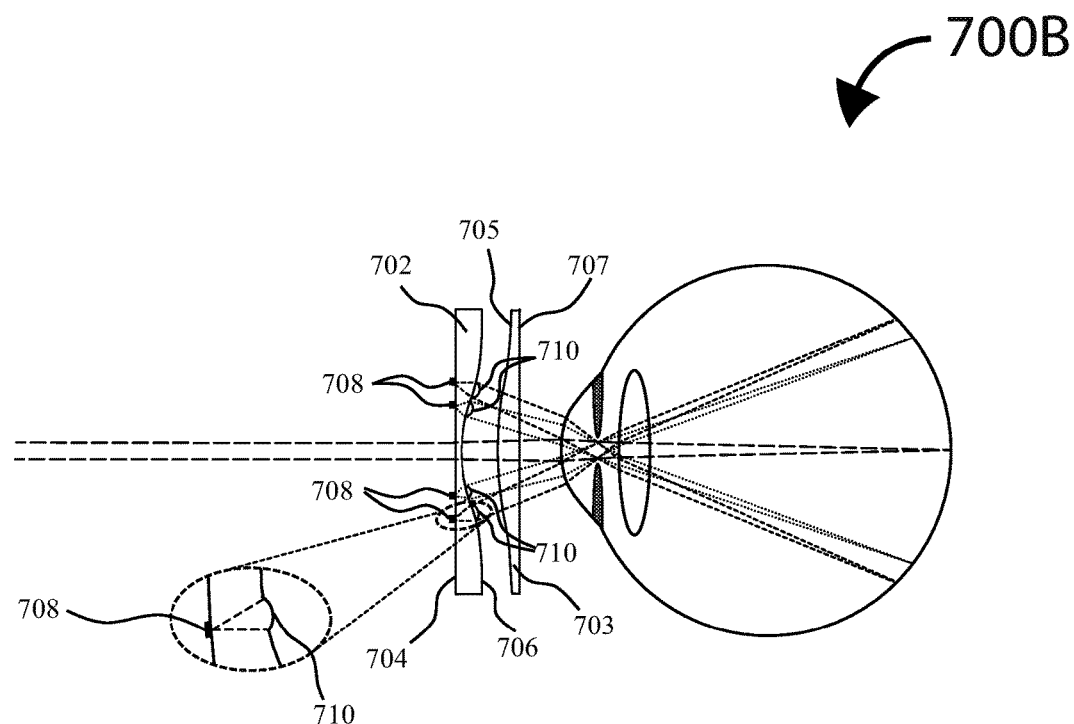

FIGS. 7A-B show an embodiment of the present invention with the micro-reticles 708 made on the front surface 704 of the first negative lens and with the micro-lenses 710 made on the back surface 706 of the first negative lens 702 of an IRODR spectacle lens combination.

In this embodiment, the first negative lens 702 has a front surface 704 and a back surface 706, and the second positive lens 703 has a front surface 705 and a back surface 707. On the front surface 704 of the first negative lens 702, there are micro-reticle patterns 708 deposited or embedded with protective over-coating around the paracentral and/or peripheral zone of the first negative lens 702. These micro-reticles 708 are represented as hash symbols in FIG. 7A as front view of the IRODR lens combination spectacle, and as short thicker line-width segment on the left side of the first negative lens 702 in FIG. 7B as cross-sectional view of the IRODR lens combination positioned in front of a wearer's eye. On the back surface 706 of the first negative lens 702, there are corresponding micro-lenses 710 imprinted or molded or embedded there. These micro-lenses 710 are represented as thinner line-width circles in FIG. 7A and as bumps on the right side of the first negative lens 702 in FIG. 7B.

Figure 8A:
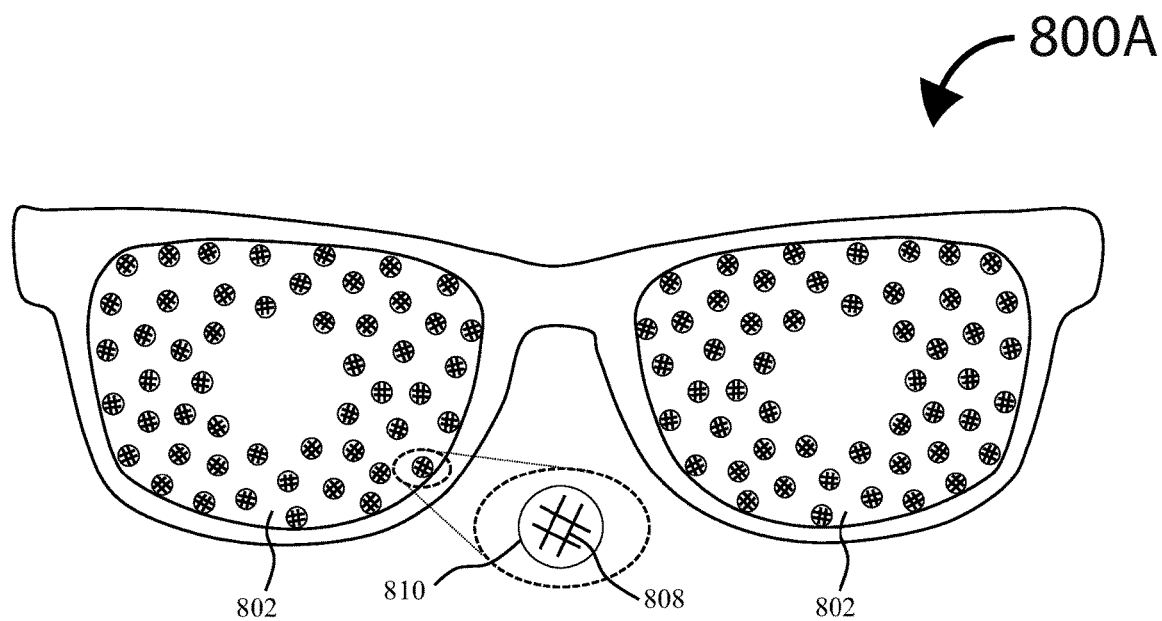
FIGS. 8A-B show an embodiment of the present invention when applied to an Increased Resolvable Object Distance Range (IRODR) spectacle lens combination with the micro-reticles made on the front surface of the first negative lens and with the micro-lenses made on the front surface of the second positive lens of the IRODR spectacle lens combination.
Figure 8B:
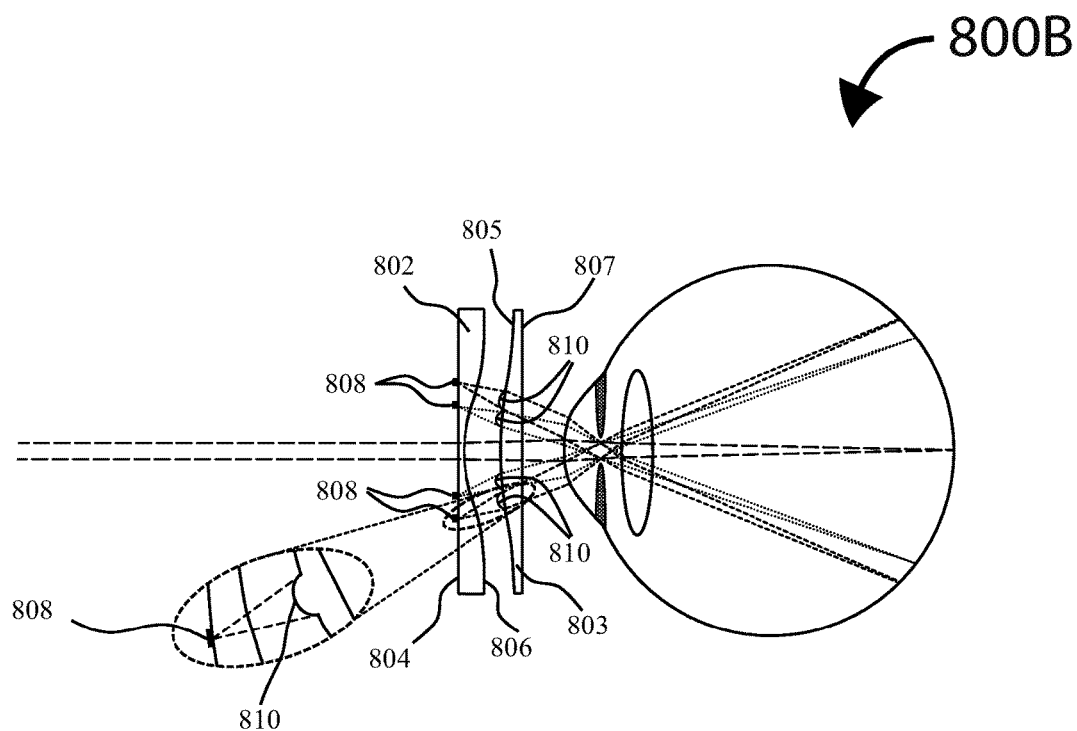

FIGS. 8A-B show an embodiment of the present invention with the micro-reticles 808 made on the front surface 804 of the first negative lens 802 and with the micro-lenses 810 made on the front surface 805 of the second positive lens 803 of an IRODR spectacle lens combination.

In this embodiment, the first negative lens 802 has a front surface 804 and a back surface 806, and the second positive lens 803 has a front surface 805 and a back surface 807. On the front surface 804 of the first negative lens 802, there are micro-reticle patterns 808 deposited or embedded with protective over-coating around the paracentral and/or peripheral zone of the first negative lens 802. These micro-reticles 808 are represented as hash symbols in FIG. 8A as front view of the IRODR lens combination spectacle, and as short thicker line-width segment on the left side of the first negative lens 802 in FIG. 8B as cross-sectional view of the IRODR lens combination positioned in front of a wearer's eye. On the front surface 805 of the second positive lens 803, there are corresponding micro-lenses 810 imprinted or molded or embedded there. These micro-lenses 810 are represented as thinner line-width circles in FIG. 8A and as bumps on the left side of the second positive lens 803 in FIG. 8B.

Figure 9A:
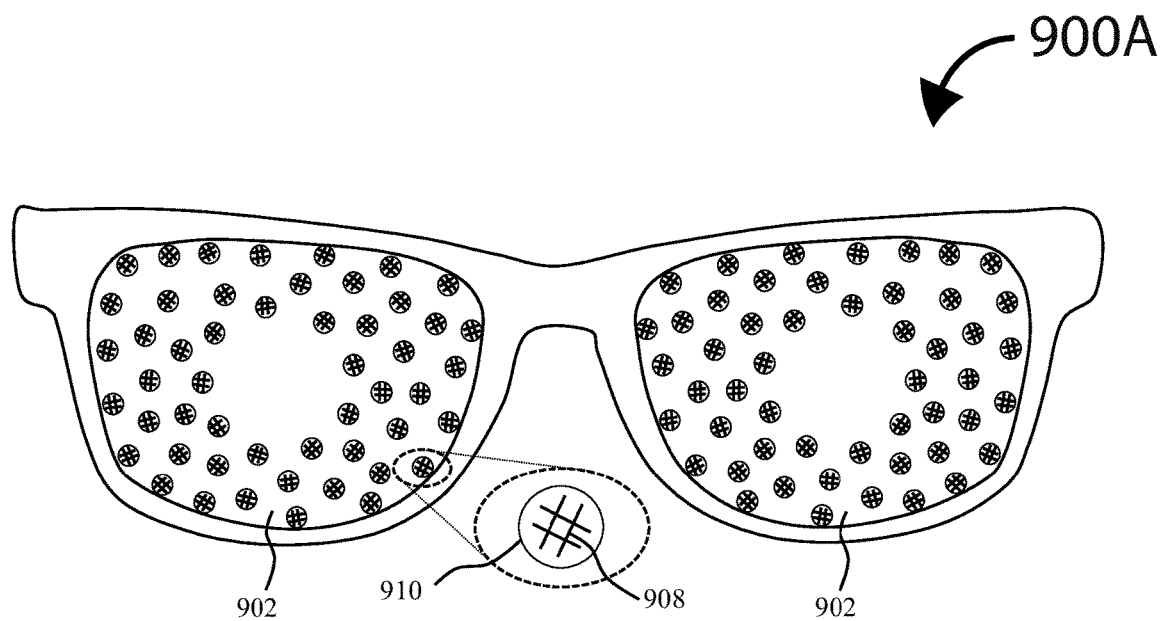
FIGS. 9A-B show an embodiment of the present invention when applied to an Increased Resolvable Object Distance Range (IRODR) spectacle lens combination with the micro-reticles made on the front surface of the first negative lens and with the micro-lenses made on the back surface of the second positive lens of a MRGT spectacle lens combination.
Figure 9B:
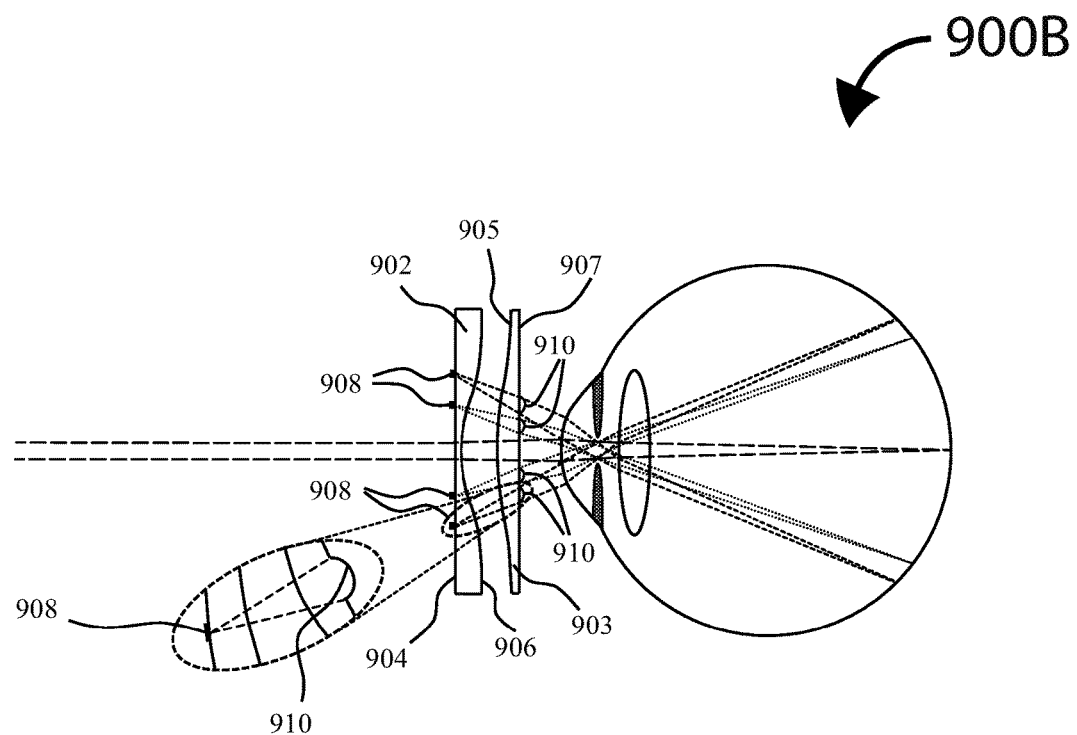

FIGS. 9A-B show an embodiment of the present invention with the micro-reticles 908 made on the front surface 904 of the first negative lens 902 and with the micro-lenses 910 made on the back surface 907 of the second positive lens 903 of an IRODR spectacle lens combination.

In this embodiment, the first negative lens 902 has a front surface 904 and a back surface 906, and the second positive lens 903 has a front surface 905 and a back surface 907. On the front surface 904 of the first negative lens 902, there are micro-reticle patterns 908 deposited or embedded with protective over-coating around the paracentral and/or peripheral zone of the first negative lens 902. These micro-reticles 908 are represented as hash symbols in FIG. 9A as front view of the IRODR lens combination spectacle, and as short thicker line-width segment on the left side of the first negative lens 902 in FIG. 9B as cross-sectional view of the IRODR lens combination positioned in front of a wearer's eye. On the back surface 907 of the second positive lens 903, there are corresponding micro-lenses 910 imprinted or molded or embedded there. These micro-lenses 910 are represented as thinner line-width circles in FIG. 9A and as bumps on the right side of the second positive lens 903 in FIG. 9B.

Figure 10A:
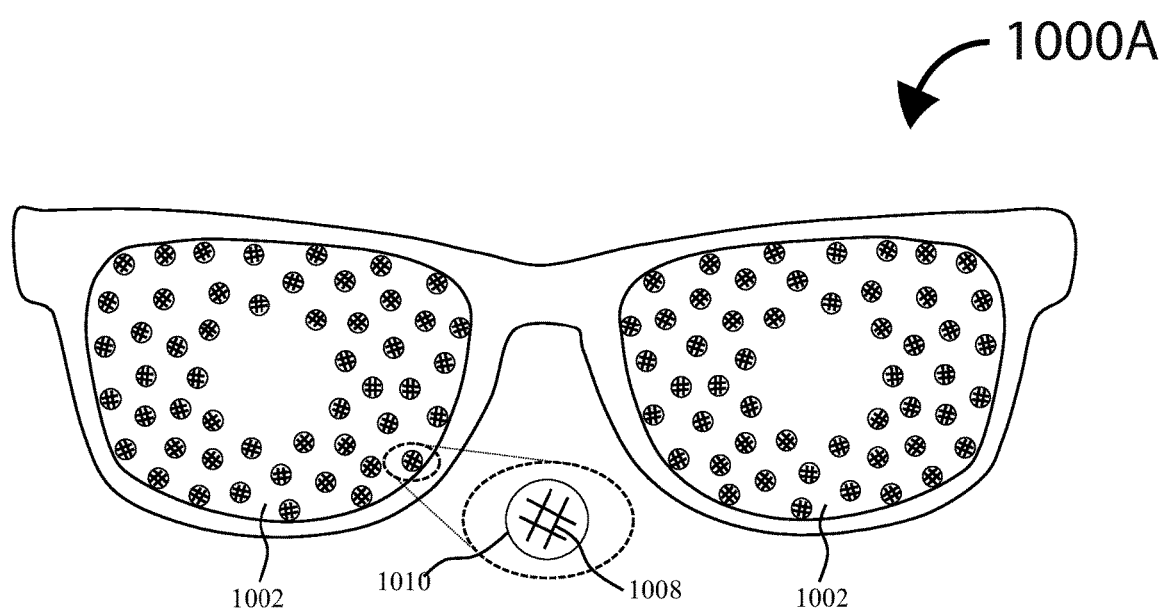
FIGS. 10A-B show an embodiment of the present invention when applied to an Increased Resolvable Object Distance Range (IRODR) spectacle lens combination with the micro-reticles made on the back surface of the first negative lens and with the micro-lenses made on the front surface of the second positive lens of the IRODR spectacle lens combination.
Figure 10B:
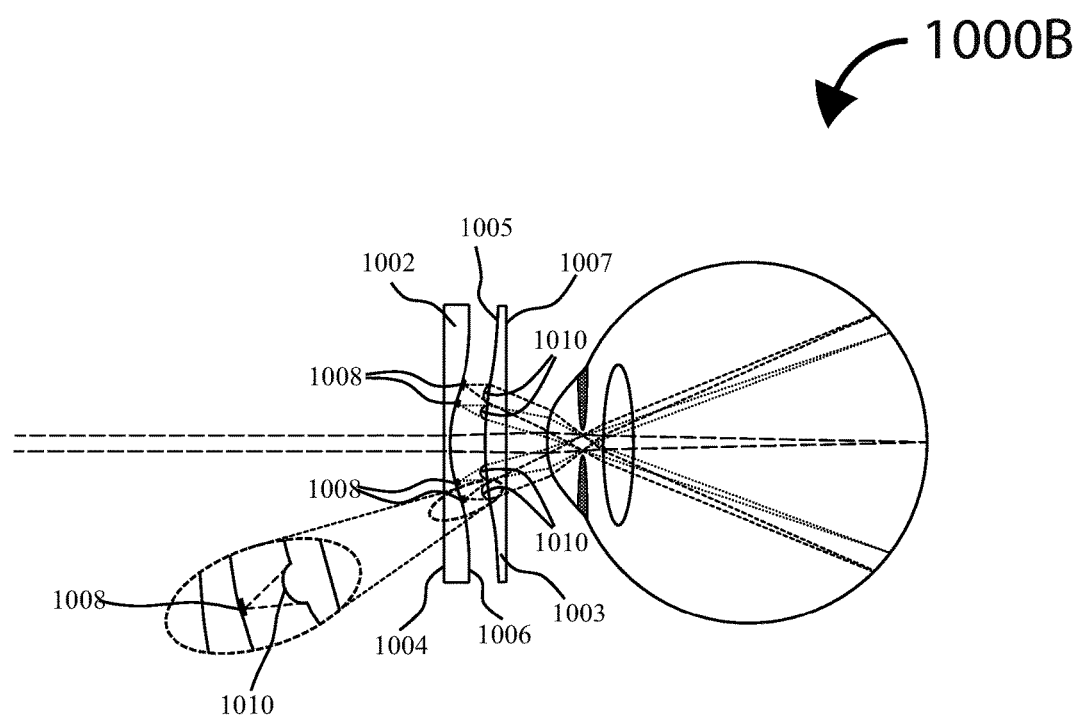

FIGS. 10A-B show an embodiment of the present invention with the micro-reticles 1008 made on the back surface 1006 of the first negative lens 1002 and with the micro-lenses 1010 made on the front surface 1005 of the second positive lens 1003 of an IRODR spectacle lens combination.

In this embodiment, the first negative lens 1002 has a front surface 1004 and a back surface 1006, and the second positive lens 1003 has a front surface 1005 and a back surface 1007. On the back surface 1006 of the first negative lens 1002, there are micro-reticle patterns 1008 deposited or embedded around the paracentral and/or peripheral zone of the first negative lens 1002. These micro-reticles are represented as hash symbols in FIG. 10A as front view of the IRODR lens combination spectacle, and as short thicker line-width segment on the right side 1006 of the first negative lens 1002 in FIG. 10B as cross-sectional view of the IRODR lens combination positioned in front of a wearer's eye. On the front surface 1005 of the second positive lens 1003, there are corresponding micro-lenses 1010 imprinted or molded or embedded there. These micro-lenses 1010 are represented as thinner line-width circles in FIG. 10A and as bumps on the left side 1005 of the second positive lens 1003 in FIG. 10B.

It should be noted that the embodiment as shown in FIGS. 10A-B has an advantage that both the micro-reticles 1008 and the micro-lenses 1010 can be sealed within the IRODR spectacle lens combination and thus can be made not accessible by the wearer to ensure that they will not be easily damaged by the wearer when the spectacle is relatively frequently cleaned.

Figure 11A:
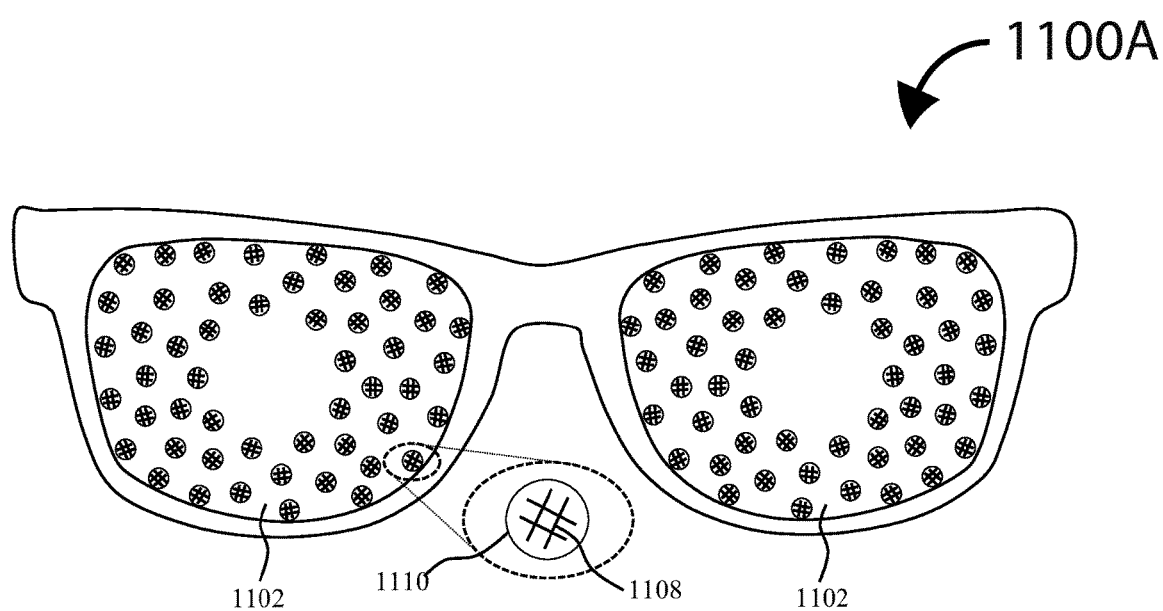
FIGS. 11A-B show an embodiment of the present invention when applied to an Increased Resolvable Object Distance Range (IRODR) spectacle lens combination with the micro-reticles made on the back surface of the first negative lens and with the micro-lenses made on the back surface of the second positive lens of the IRODR spectacle lens combination.
Figure 11B:
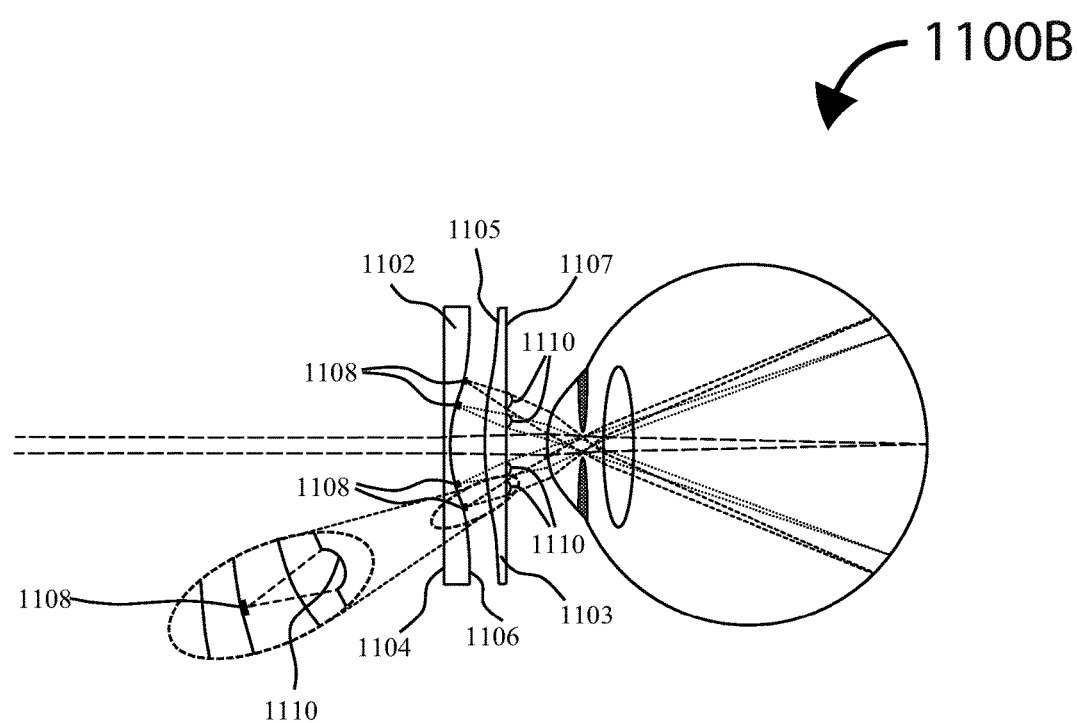

FIGS. 11A-B show an embodiment of the present invention with the micro-reticles 1108 made on the back surface 1106 of the first negative lens 1102 and with the micro-lenses 1110 made on the back surface 1107 of the second positive lens 1103 of an IRODR spectacle lens combination.

In this embodiment, the first negative lens 1102 has a front surface 1104 and a back surface 1106, and the second positive lens 1103 has a front surface 1105 and a back surface 1107. On the back surface 1106 of the first negative lens 1102, there are micro-reticle patterns 1108 deposited or embedded around the paracentral and/or peripheral zone of the first negative lens 1102. These micro-reticles 1108 are represented as hash symbols in FIG. 11A as front view of the IRODR lens combination spectacle, and as short thicker line-width segment on the right side 1106 of the first negative lens 1102 in FIG. 11B as cross-sectional view of the IRODR lens combination positioned in front of a wearer's eye. On the back surface 1107 of the second positive lens 1103, there are corresponding micro-lenses 1110 imprinted or molded or embedded there. These micro-lenses 1110 are represented as thinner line-width circles in FIG. 11A and as bumps on the right side 1107 of the second positive lens 1103 in FIG. 11B.

Figure 12A:
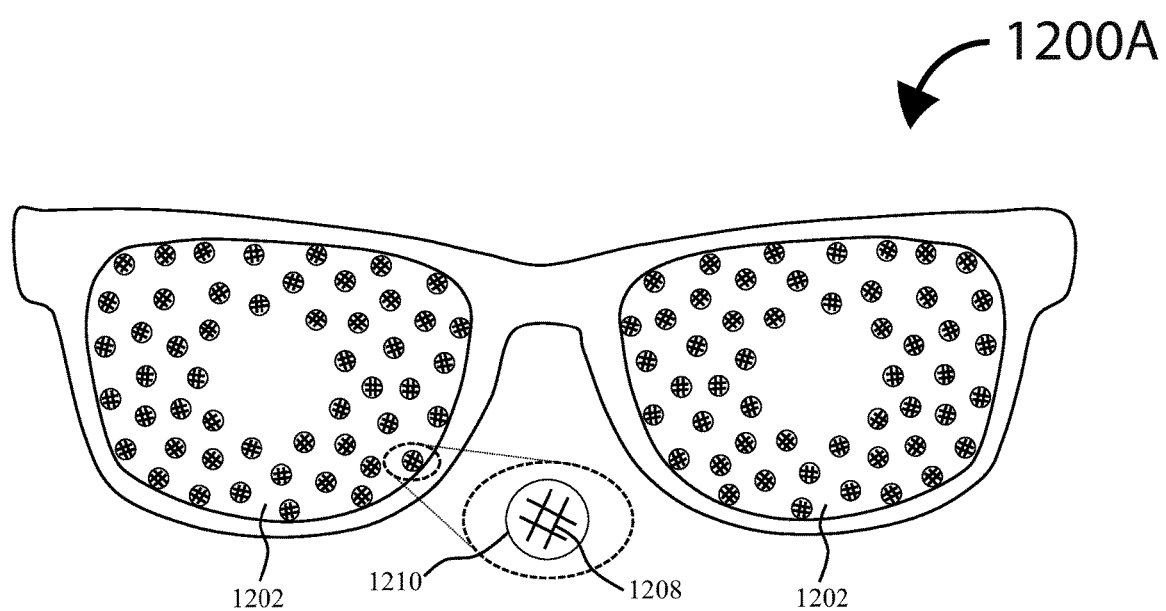
FIGS. 12A-B show an embodiment of the present invention when applied to an Increased Resolvable Object Distance Range (IRODR) spectacle lens combination with the micro-reticles made on the front surface of the second positive lens and with the micro-lenses made on the back surface of the second positive lens of the IRODR spectacle lens combination.
Figure 12B:
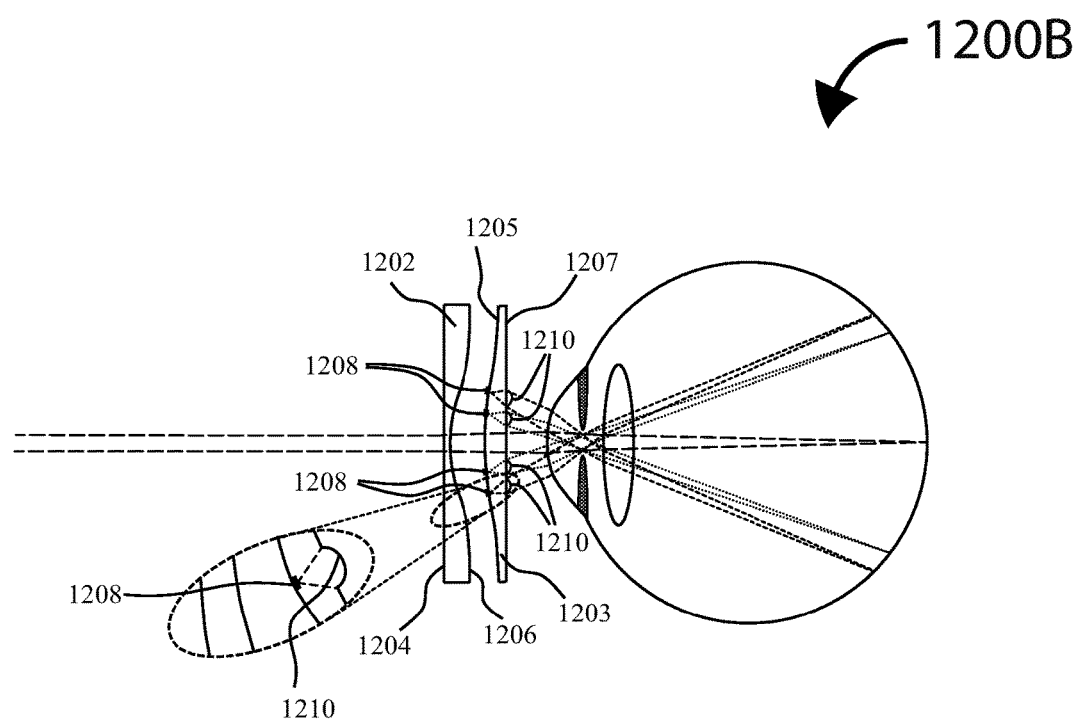

FIGS. 12A-B show an embodiment of the present invention with the micro-reticles 1208 made on the front surface 1205 of the second positive lens 1203 and with the micro-lenses 1210 made on the back surface 1207 of the second positive lens 1203 of an IRODR spectacle lens combination.

In this embodiment, the first negative lens 1202 has a front surface 1204 and a back surface 1206, and the second positive lens 1203 has a front surface 1205 and a back surface 1207. On the front surface 1205 of the second positive lens 1203, there are micro-reticle patterns 1208 deposited or embedded around the paracentral and/or peripheral zone of the second positive lens 1203. These micro-reticles are represented as hash symbols in FIG. 12A as front view of the IRODR lens combination spectacle, and as short thicker line-width segment on the left side 1205 of the second positive lens 1203 in FIG. 12B as cross-sectional view of the IRODR lens combination positioned in front of a wearer's eye. On the back surface 1207 of the second positive lens 1203, there are corresponding micro-lenses 1210 imprinted or molded or embedded there. These micro-lenses 1210 are represented as thinner line-width circles in FIG. 12A and as bumps on the right side 1207 of the second positive lens 1203 in FIG. 12B.

Figure 13A:
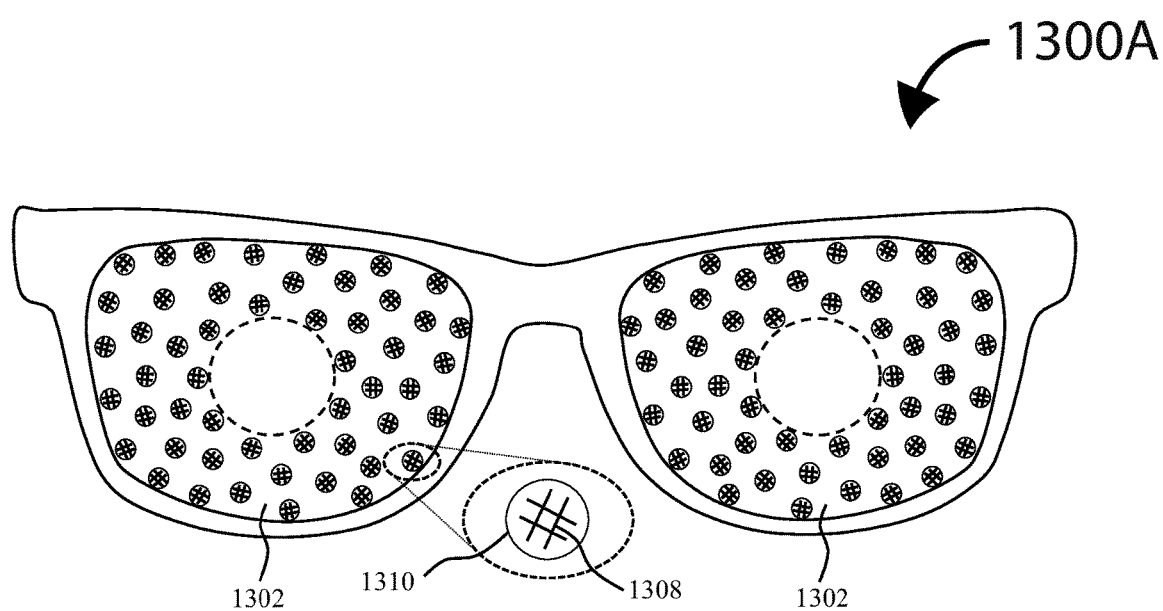
FIGS. 13A-B show an embodiment of the present invention when applied to an Increased Resolvable Object Distance Range (IRODR) spectacle lens combination with the micro-reticles made on the front surface of an added plate/layer and with the micro-lenses made on the back surface of the added plate/layer where the added plate/layer is disposed in between the first negative lens and the second positive lens of a IRODR spectacle lens combination.
Figure 13B:
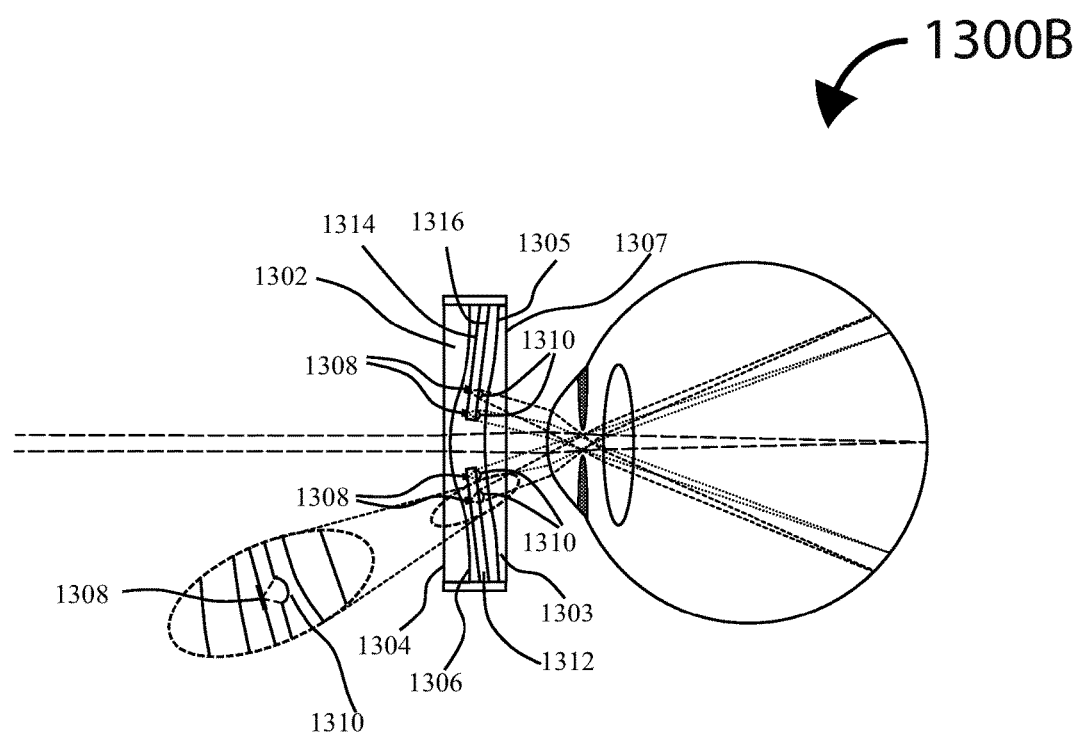

FIGS. 13A-B show an embodiment of the present invention with the micro-reticles 1308 made on the front surface 1314 of an added layer 1312 and with the micro-lenses 1310 made on the back surface 1316 of the added layer 1312 where the added layer 1312 is disposed in between the first negative lens 1302 and the second positive lens 1303 of an IRODR spectacle lens combination.

In this embodiment, the first negative lens 1302 has a front surface 1304 and a back surface 1306, and the second positive lens 1303 has a front surface 1305 and a back surface 1307. An add layer 1312 in the form of a ring or race-track like annular ring or race-track (but can be a full layer without the central hole) is disposed in between the back surface 1306 of the first negative lens 1302 and the front surface 1305 of the second positive lens 1303. The add layer 1312 has a front surface 1314 and a back surface 1316 with its central portion open in this shown case to allow optimum central vision for a wearer's eye. On the front surface 1314 of the add layer 1312, there are micro-reticle patterns 1308 deposited or embedded around the paracentral and/or peripheral zone of the add layer 1312. These micro-reticles 1308 are represented as hash symbols in FIG. 13A as front view of the IRODR lens combination spectacle (where the dashed ring or race-track represents the central open portion of the ring or race-track like annular ring or race-track), and as short thicker line-width segment on the left side 1314 of the add layer 1312 in FIG. 13B as cross-sectional view of the IRODR lens combination plus the ring or race-track like annular positioned in front of a wearer's eye. On the back surface 1316 of the add layer 1312, there are corresponding micro-lenses 1310 imprinted or molded or embedded there. These micro-lenses 1310 are represented as thinner line-width circles in FIG. 13A and as bumps on the right side 1316 of the add layer 1312 in FIG. 13B.

It should be noted that the embodiment as shown in FIGS. 13A-B has the advantage that the micro-reticles 1308 and micro-lenses 1310 are made or fabricated on a separate layer that can be added to an IRODR spectacle initially without the micro-reticles and micro-lenses, in addition to the fact that both the micro-reticles 1308 and the micro-lenses 1310 can be sealed within the IRODR spectacle lens combination and thus can be made not accessible by the wearer to ensure that they will not be easily damaged by the wearer when the spectacle is relatively frequently cleaned.

However, this should not limit the scope of the invention to having the add layer only sandwiched between the first negative lens and the second positive lens. On the contrary, the concept of adding a layer with micro-reticles and micro-lenses can be applied to both a single spectacle lens and a lens combination on or next to any optical interface. For example, the layer can be added or stacked around the paracentral and/or peripheral zone of one interface of a spectacle lens, in a similar manner as adding a sticking-on lens to the lower region on the back side of a conventional single vision correction spectacle lens to convert it into a bifocal spectacle lens.

It should also be noted that in the embodiments associated with the IRODR spectacle cases from FIGS. 7A-B to FIGS. 13A-B, there can be different designs of the first negative lens and the second positive lens as well as different designs of the micro-lenses and micro-reticles. For example, those IRODR designs can be with different cross sectional surface profiles of the first negative lens and the second position lens, especially the ones with paracentral and/or peripheral concentric Fresnel zones. As these variations have already been discussed in U.S. Provisional Patent Application No. 62/649,669, which is incorporated herein by reference in its entirety, we will therefore not repeat all the details here. Also the micro-lens can be a lens combination with a first focusing stage micro-lens on one optical interface (such as the back surface of first negative lens) and a second focusing stage micro-lens on another optical interface (such as the front surface of second positive micro-lens) or even embedded in the following optical media (such as a gradient index based micro-lens made in the second positive lens or through the overall lens structure). It should also be noted that as in the single vison correction spectacle lens case, with respect to the arrangements associated with the IRODR spectacle lens combination cases, the micro-reticles and the micro-lenses can also be buried in the corresponding portions of the spectacle lens material rather than being arranged on the surfaces to further protect them from being easily damaged.

Up to this point, we have discussed different embodiments of the present invention in terms of the arrangement or relative positions of the micro-reticles and micro-lenses with respect to different spectacle lens or spectacle lens combination designs. It should be noted that all the additional features that have been briefly discussed with respect to the FIGS. 4A-B embodiment, especially those related to the difference of the present invention with respect to that of U.S. Pat. No. 10,268,050, can all be applied to the embodiments of FIGS. 5A-B to FIGS. 13A-B.

We will now move on to discuss different embodiments in terms of the structure or three-dimensional structures/shapes or the refractive index distribution of the micro-lenses, in terms of the micro-reticle patterns, and in terms of the distribution of the micro-pattern and micro-lens pairs.

It should be noted that although in the embodiments from FIGS. 4A-B to FIGS. 13A-B, the micro-reticle pattern is shown as a hash symbol with the hash line directions along either the radial (or meridional) direction or along the circumferential direction referenced to either the center of the spectacle lens or the pupil position of a wearer's eye, there can be many variations. For example, checkerboard pattern, circular dot or concentric or race-track ring patterns or purely horizontal/vertical patterns can all be possible choices.

One reason why the isolated micro-reticle hash pattern lines are aligned along the radial (or meridional) direction and/or the circumferential direction is that the human eye has natural off-axis or oblique astigmatism, meaning that off-axis objects will be imaged to the paracentral and/or peripheral retina with two perpendicularly focused image shells, a tangential image shell and a sagittal image shell. By aligning the micro-reticle pattern lines along the radial and circumferential direction, sharply focused micro-reticle line images can be formed on the sagittal and tangential image shells, and there exist various ways to design the micro-lenses to control the positions of the micro-reticle's sagittal and tangential image shells relative to the paracentral and/or peripheral retina.

It should be noted that although the micro-lenses shown in FIGS. 4A-B to 13A-B are drawn as a circle to represent spherical micro-lenses; they can have many different design variations. They can be designed, for example, to account for the eye's accommodation changes. We will now discuss some of these micro-lens design variations.

Figure 14A:
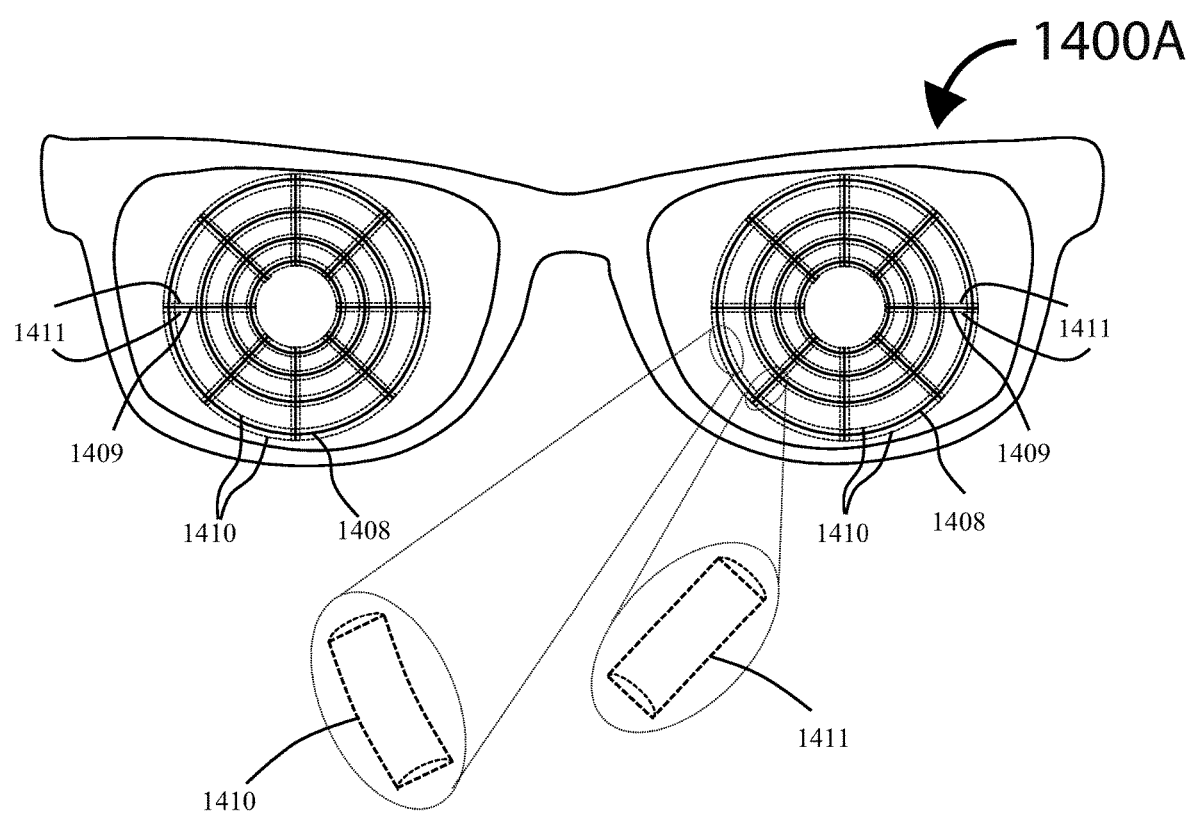
FIGS. 14A-C show embodiments of the present invention in which concentric rings and radial line segments based micro-reticle patterns are combined with concentric rings and radial line segments based cylindrical micro-lenses to respectively project tangential and sagittal line images on or in front of the paracentral and/or peripheral retina.
Figure 14B:
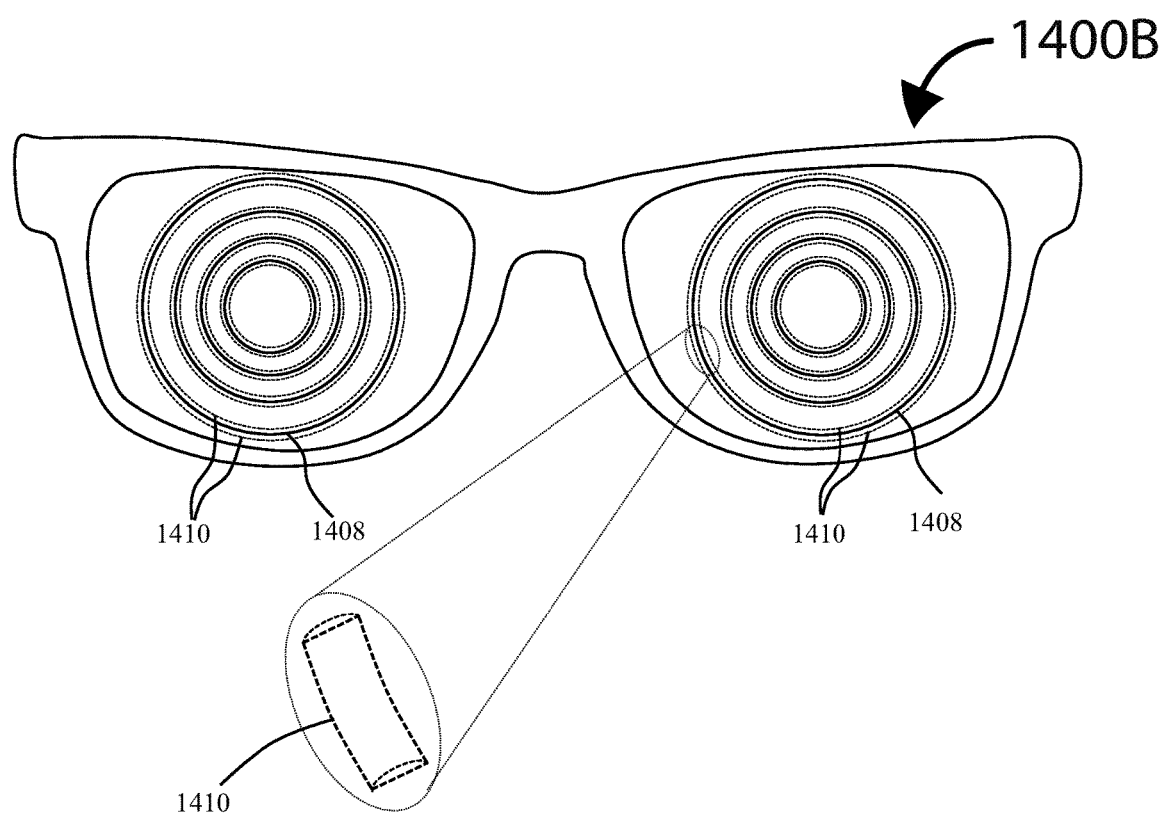
Figure 14C:
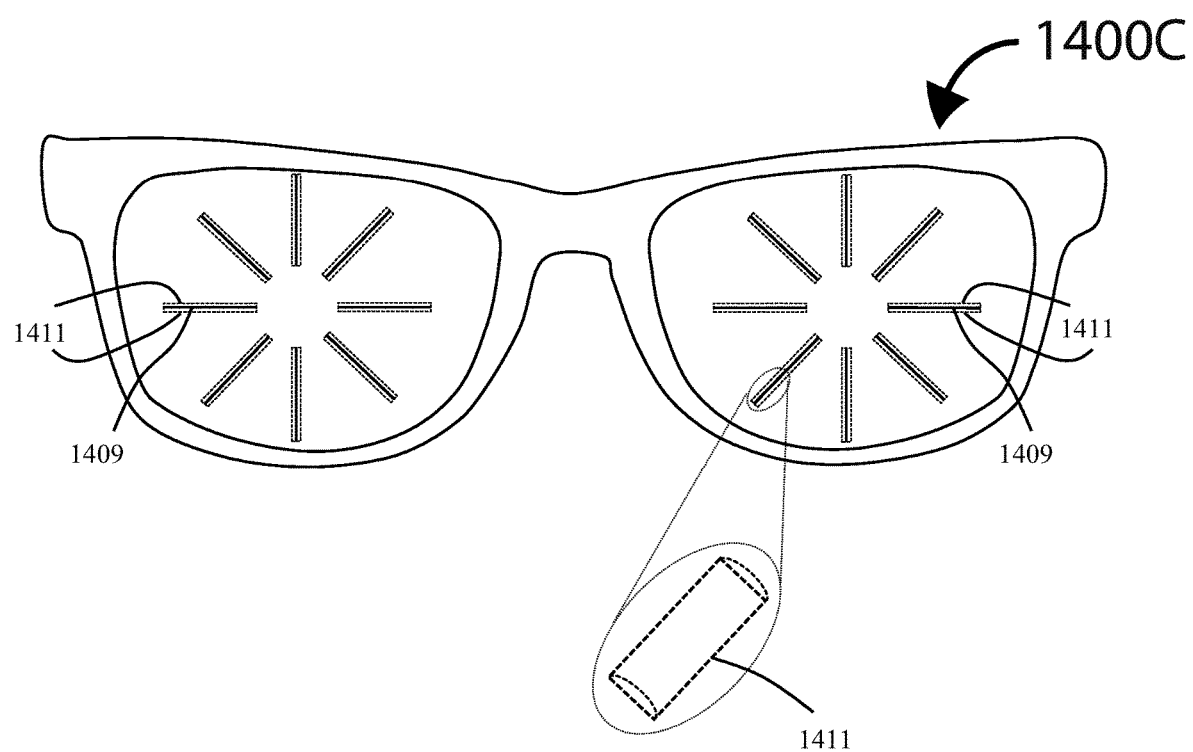

FIGS. 14A-C illustrate some embodiments of the present invention in which the integrated reticle(s) include exemplary micro-reticle patterns arranged in concentric rings and/or radial line segments are combined with micro-cylindrical-lenses in the form of concentric rings and/or relatively long radial line segments to project tangential and/or sagittal line images on or in front of the paracentral and/or peripheral retina.

FIG. 14A is a front view of a spectacle which also accomplishes the design goals of the exemplary spectacle lens or lens combination embodiments as disclosed in FIGS. 4A-B to FIGS. 13A-B, in accordance with the present invention. The solid lines 1408 and 1409 represent the integrated reticle(s), such as micro-reticle patterns, and the dashed line pairs 1410 and 1411 respectively represent the reticle focuser(s), such as micro-cylindrical lenses respectively in the form of concentric rings and in the form of relatively long radial line segments, and these micro-cylindrical lenses are arranged between the micro-reticles and the pupil of a wearer's eye as part of the spectacle lens or lens combination design. It should be noted that although in FIG. 14A, we have drawn both types of micro-cylindrical lenses in the form of concentric rings and in the form of relatively long radial line segments, the embodiment can be of one type of micro-cylindrical lenses in either the form of concentric rings or in the form of relatively long radial line segments with the corresponding micro-reticle patterns accordingly. In other words, the embodiment can have only concentric ring micro-reticles and concentric ring micro-cylinder-lenses as shown in FIG. 14B, or the embodiment can include exemplary radial line segment micro-reticles and radial line segment micro-cylinder-lenses as shown in FIG. 14C.

The expanded insets show perspective views of the two types of micro-cylindrical lenses. In the case of concentric ring micro-reticle patterns 1408 and concentric ring micro-cylindrical-lenses 1410 as shown in FIG. 14B, the axis direction of the micro-cylindrical lenses 1410 is in the circumferential direction while the focusing power is in the radial direction. The arrangement and design of these micro-reticle patterns and micro-cylindrical lenses are such that sharply focused tangential micro-reticle concentric ring images will be formed on, or in front of, or behind, the paracentral and/or peripheral retina. In the case of radial line segment micro-reticle patterns 1409 and radial line segment micro-cylindrical lenses 1411 as shown in FIG. 14C, the axis direction of the micro-cylindrical lenses is in the radial direction while the focusing power is in the circumferential direction. The arrangement and design of these micro-reticle patterns and micro-cylindrical lenses are such that sharply focused sagittal micro-reticle line mages will be formed on, or in front of, or behind, the paracentral and/or peripheral retina.

It should be noted that one design goal of the micro-cylindrical lenses is to project the corresponding micro-reticle line images on, or in front of, the paracentral and/or peripheral retina to be either perceived by the eye as within focus or perceived by the eye as somewhat myopically defocused. With respect to the micro-cylindrical-lens design details, both conventional cylinder design and more advanced acylinder designs or even multi-focal or extended depth of focus cylinder designs can be employed. Also the focusing powers of the radial and circumferential micro-cylindrical lenses can be different to project the corresponding tangential and sagittal image shells at different positions relative to each other as well as relative to the paracentral and/or peripheral retina. A potential design is to overlap the tangential and sagittal image shells and project both on the paracentral and/or peripheral retina to be either perceived by the eye as within focus or perceived by the eye as somewhat myopically defocused.

Figure 15A:
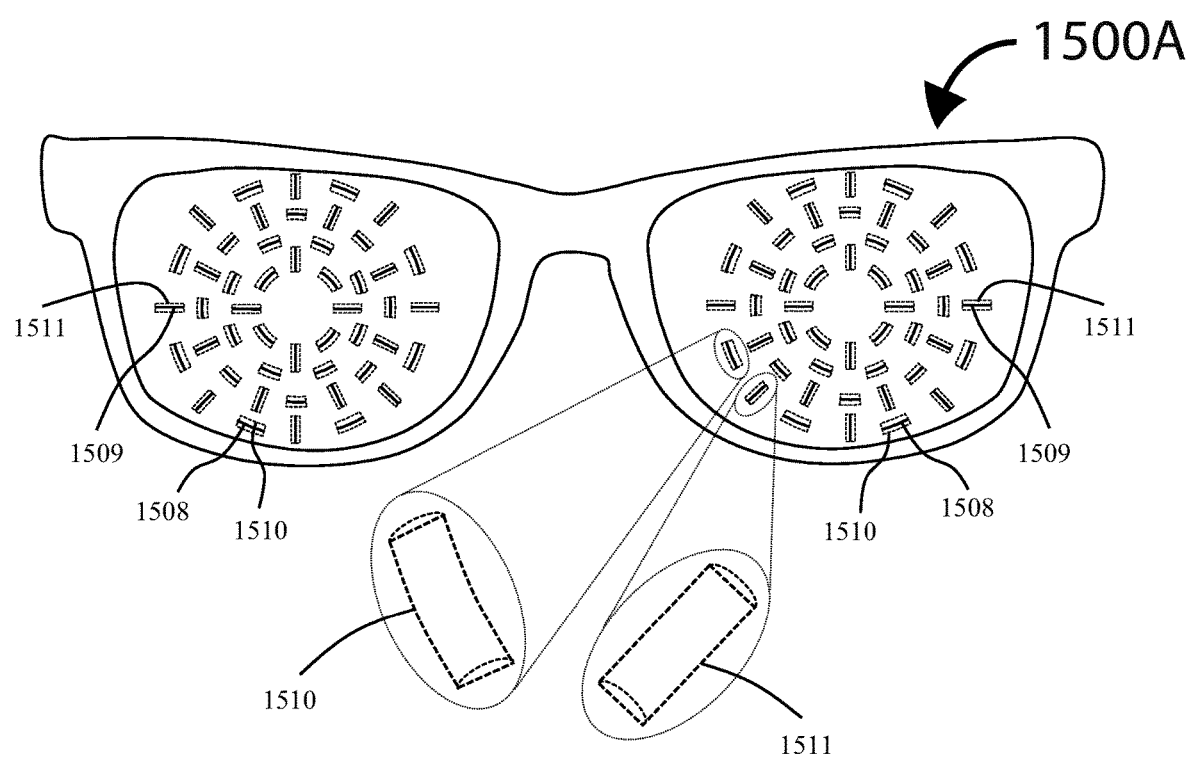
FIGS. 15A-C show embodiments of the present invention in which circumferential line segments and radial line segments based micro-reticle patterns are combined with circumferential line segment and radial line segment based micro-cylindrical lenses to respectively project tangential and sagittal line images on or in front of the paracentral and/or peripheral retina.
Figure 15B:
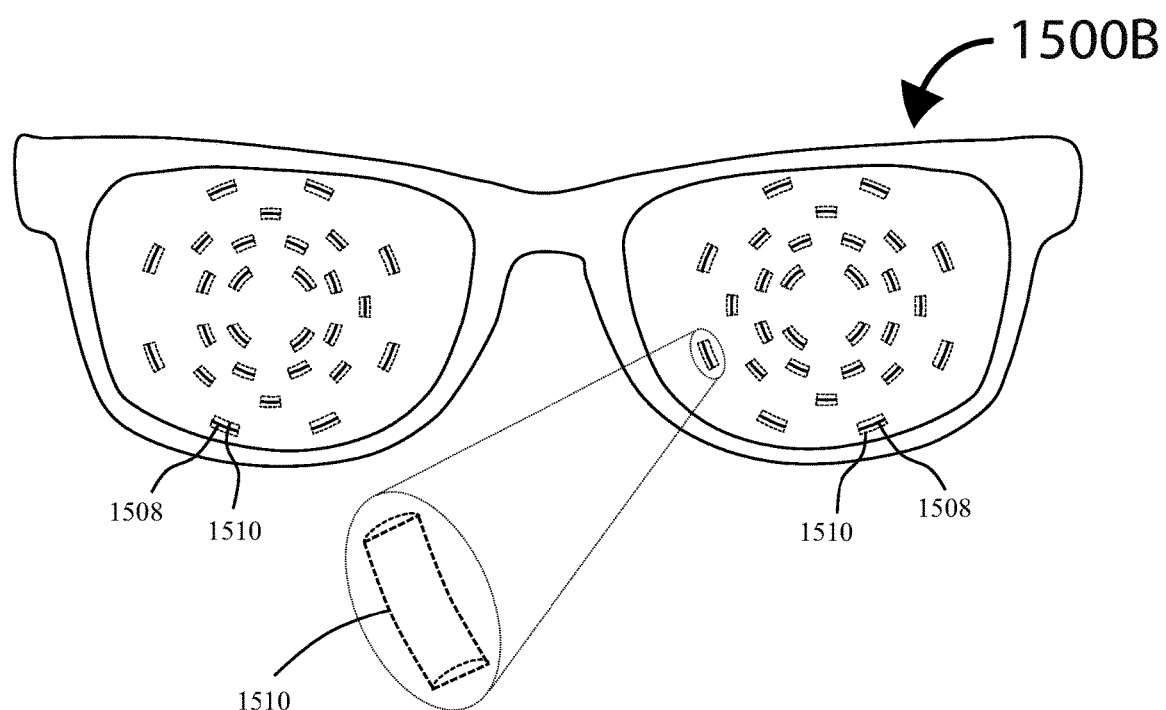
Figure 15C:
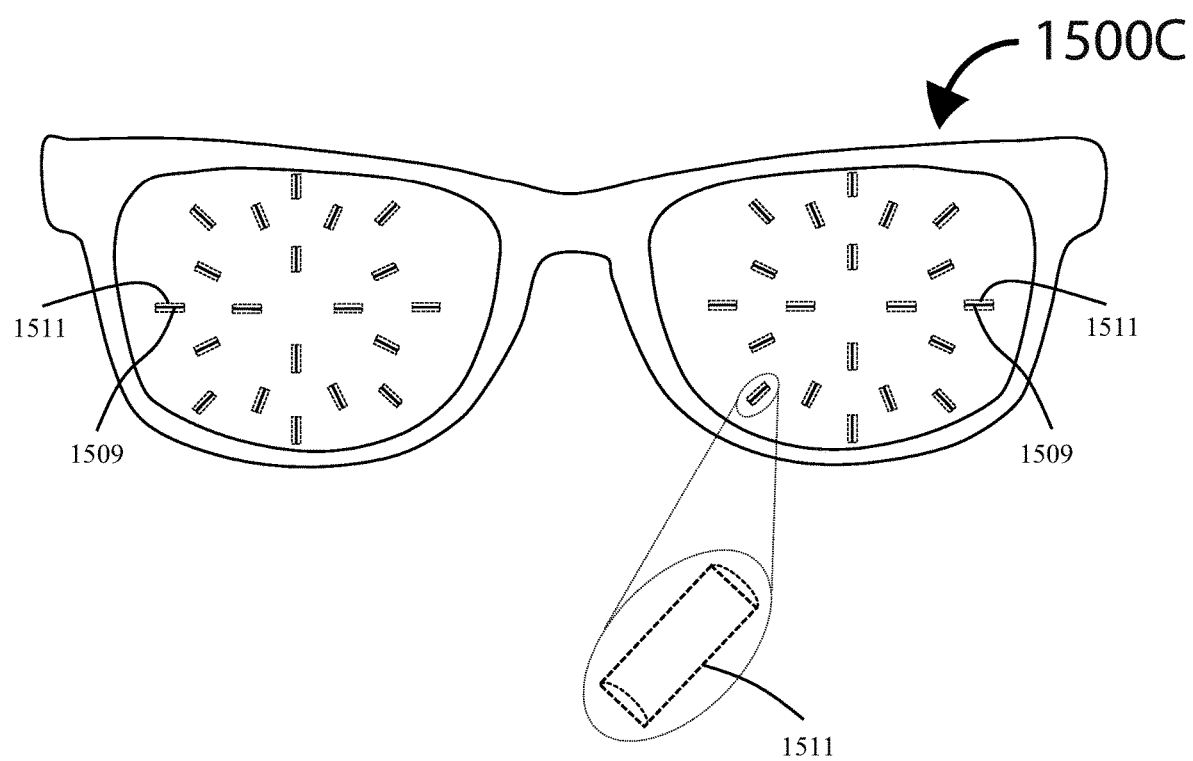

FIGS. 15A-C illustrate some embodiments of the present invention in which exemplary circumferential line segments and radial line segments based micro-reticle patterns are combined with circumferential line segment and radial line segment based micro-cylindrical lenses to respectively project tangential and sagittal line images on, or in front of, or behind, the paracentral and/or peripheral retina. In this embodiment, multiple isolated or non-connected micro-cylindrical-lenses 1510 and 1511 are scattered around the paracentral and/or peripheral zone of a spectacle lens or lens combination with a first set of isolated micro-cylindrical-lenses 1511 aligned along the radial direction having focusing power in the circumferential direction, and/or with a second set of isolated micro-cylindrical lenses 1510 aligned along the circumferential direction having focusing power in the radial direction.

FIG. 15A is a front view of another spectacle which also accomplished the design goals of the exemplary spectacle lens or lens combination embodiments as disclosed in FIGS. 4A-B to FIG. 13A-B, in accordance with the present invention. The solid lines 1508 and 1509 represent the integrated reticle(s), such as micro-reticle patterns, and the dashed rectangle-like patterns 1510 and 1511 represent the reticle focuser(s), such as micro-cylindrical-lenses in the form of circumferential bar segment and in the form of radial bar segment, and these micro-cylindrical-lenses are arranged between the micro-reticles and the pupil of a wearer's eye as part of the spectacle lens or lens combination. It should be noted that although in FIG. 15A, we have drawn both types of micro-cylindrical-lenses in the form of short circumferential line segment and in the form of short radial line segments, the embodiment can be of one type of micro-cylindrical-lenses either in the form of short circumferential line segment as shown in FIG. 15B or in the form of short radial line segments with the corresponding micro-reticle patterns accordingly as shown in FIG. 15C. In other words, the embodiment includes exemplary circumferential line segment micro-reticles and circumferential line segment micro-cylinder-lenses as shown in FIG. 15B, or the embodiment includes exemplary radial line segment micro-reticles and radial line segment micro-cylinder-lenses as shown in FIG. 15C.

The expanded insets show perspective views of the two types of micro-cylindrical-lenses. In the case of circumferential line segment micro-reticle patterns 1508 and circumferentially aligned micro-cylindrical lenses 1510, the axis direction of the micro-cylindrical lenses 1510 is in the circumferential direction while their focusing power is in the radial direction. The arrangement and design of these micro-reticle patterns and micro-cylindrical-lenses is such that sharply focused tangential micro-reticle line images will be formed on, or in front of, or behind, the paracentral and/or peripheral retina. In the case of radial line segment micro-reticle patterns 1509 and radial line segment micro-cylindrical-lenses 1511, the axis direction of the micro-cylindrical lenses 1511 is in the radial direction while their focusing power is in the circumferential direction. The arrangement and design of these micro-reticle patterns and micro-cylindrical lenses is such that sharply focused sagittal micro-reticle line segment images will be formed on, or in front of, or behind, the paracentral and/or peripheral retina.

As in the case of FIGS. 14A-C, with respect to the micro-cylindrical-lens designs, both conventional cylinder design and more advanced acylinder designs and even multifocal or extended depth of focus cylinder designs can be employed. Also the focusing powers of the radial and circumferential micro-cylindrical lenses can be different to project the corresponding tangential and sagittal image shells at different positions relative to each other and also relative to the paracentral and/or peripheral retina. A design goal is to overlap the tangential and sagittal image shells and project both on, or in front of, the paracentral and/or peripheral retina to be either perceived by the eye as within focus or perceived by the eye as somewhat myopically defocused.

Figure 16A:
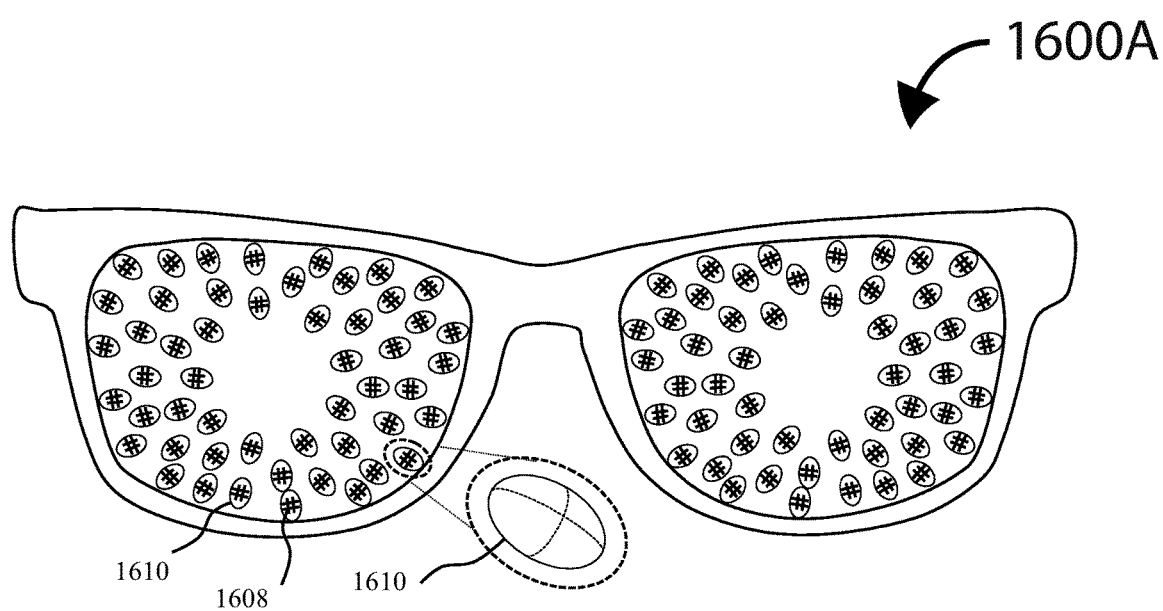
FIGS. 16A-B show an embodiment of the present invention in which micro-reticle patterns are combined with micro-toric-lenses that have additional positive cylindrical focusing power in the circumferential direction to bring the sagittal image shell closer to the tangential image shell or even to cause the sagittal image shell to overlap with the tangential image shell, and to project tangential and sagittal line images on or in front of the paracentral and/or peripheral retina.
Figure 16B:
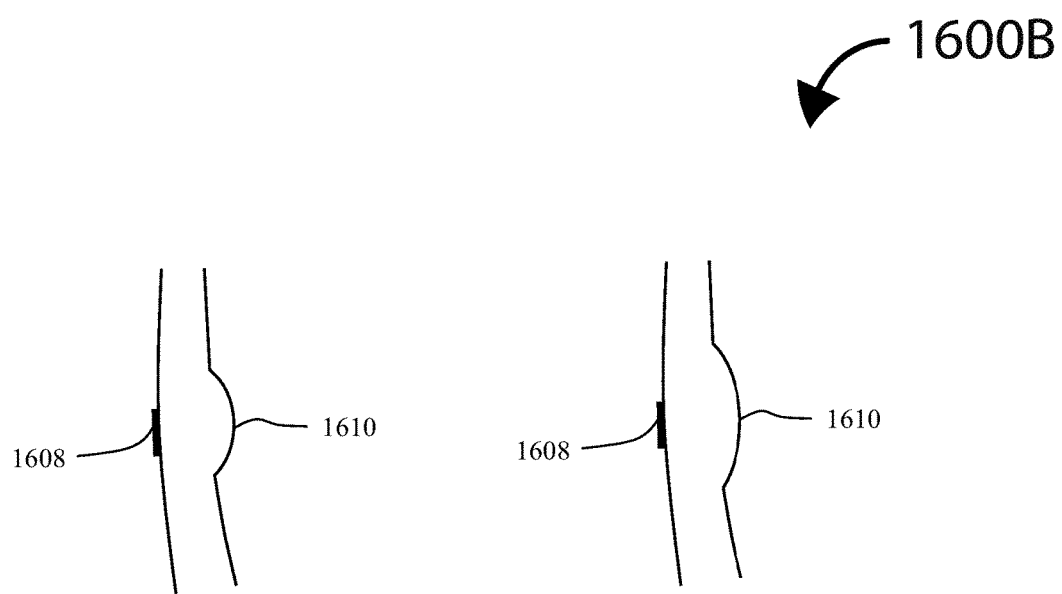

FIGS. 16A-B illustrate embodiments of the present invention in which micro-reticle patterns are combined with micro-toric-lenses that have additional positive cylindrical focusing power in the circumferential direction to bring the sagittal image shell closer to the tangential image shell or even to cause the sagittal image shell to overlap with the tangential image shell, and to project tangential and sagittal line images on, or in front of, the paracentral and/or peripheral retina.

In this embodiment, multiple micro-reticle and micro-toric-lens pairs are lined up such that light rays from a micro-reticle, after travelling through its corresponding micro-toric-lens will propagate toward the eye pupil direction. The spatial arrangement of the multiple isolated micro-reticle and micro-toric-lens pairs are such that they are scattered around the paracentral and/or peripheral zone of a spectacle lens or lens combination. Each isolated micro-toric-lens has additional positive cylindrical focusing power along the circumferential direction to bring the sagittal micro-reticle line images closer to the tangential micro-reticle line images or even to cause the sagittal micro-reticle line images to overlap with the tangential micro-reticle line images and at the same time the two perpendicularly oriented micro-reticle line images are focused either on, or in front of, the paracentral and/or peripheral retina.

FIG. 16A is a front view of a spectacle which can have different basic spectacle lens or lens combination designs as disclosed in FIGS. 4A-B to FIGS. 13A-B. FIG. 16B shows two cross sectional views of the same micro-toric-lens 1610 together with its corresponding micro-reticle 1608. The left portion of FIG. 16B shows the cross sectional view along the stronger focusing power direction and the right portion of FIG. 16B shows the cross sectional view along the less strong focusing power direction. The thicker solid hash patterns 1608 in FIG. 16A represent micro-reticles with the hash pattern lines along the radial (or meridional) and the circumferential directions, and the thinner ellipses 1610 represent the micro-toric-lenses which are arranged between the micro-reticles and the wearer's eye pupil as part of the spectacle lens or lens combination.

The expanded inset shows perspective view of a micro-toric-lens 1610. The micro-toric-lenses 1610 have an additional cylindrical focusing power along the circumferential direction in addition to a base spherical focusing power along all transverse directions. Since the natural off-axis or oblique astigmatism of a human eye will generally cause the sagittal image shell to land behind the tangential image shell, by making the micro-toric-lenses having a stronger light focusing power in the circumferential direction, the sagittal micro-reticle line images can thus be brought closer to the tangential micro-reticle line images. The arrangement and design of these micro-reticle patterns and micro-toric-lenses are such that sharply focused sagittal and tangential micro-reticle line images will be brought closer to each other or to overlap with each other, and at the same time form sharply focused micro-reticle mutually perpendicular line images on, or in front of, the paracentral and/or peripheral retina.

Figure 17A:
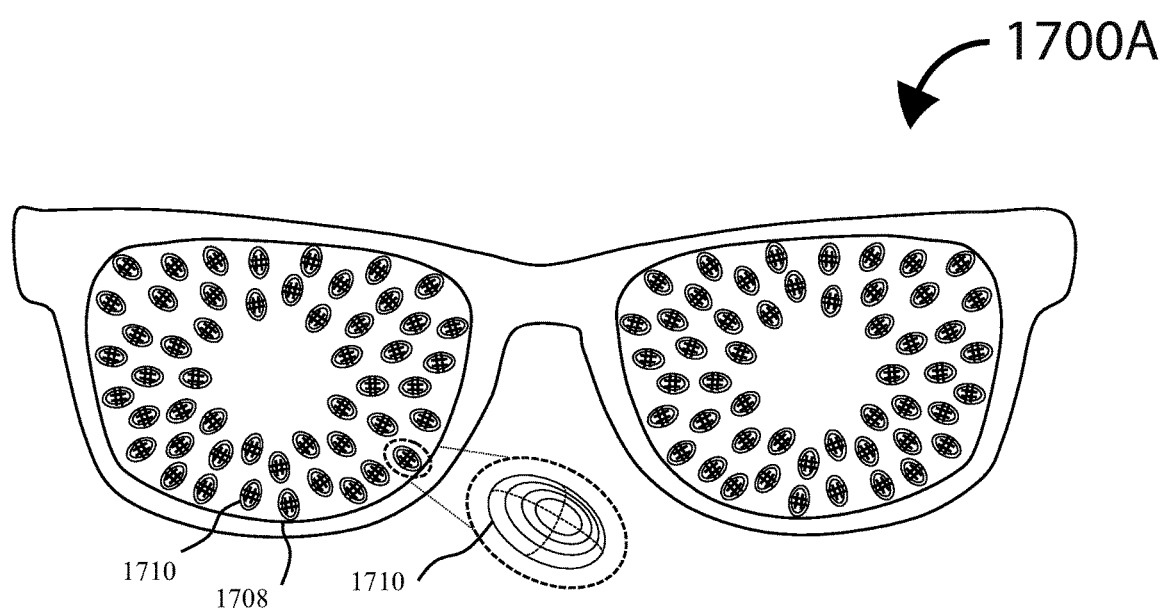
FIGS. 17A-B show an embodiment of the present invention in which micro-reticle patterns are combined with micro-multifocal-lenses to project micro-reticle images on or in front of the paracentral and/or peripheral retina. The micro-reticle and micro-multifocal-lens pairs are designed with each micro-multifocal-lens having multiple focusing powers to extend the depth of focus such that the micro-reticle images will be perceived by a wearer's eye as within focus, or as within desired myopic defocus range in the paracentral and/or peripheral retina regardless of the accommodation state of the wearer's eye.
Figure 17B:
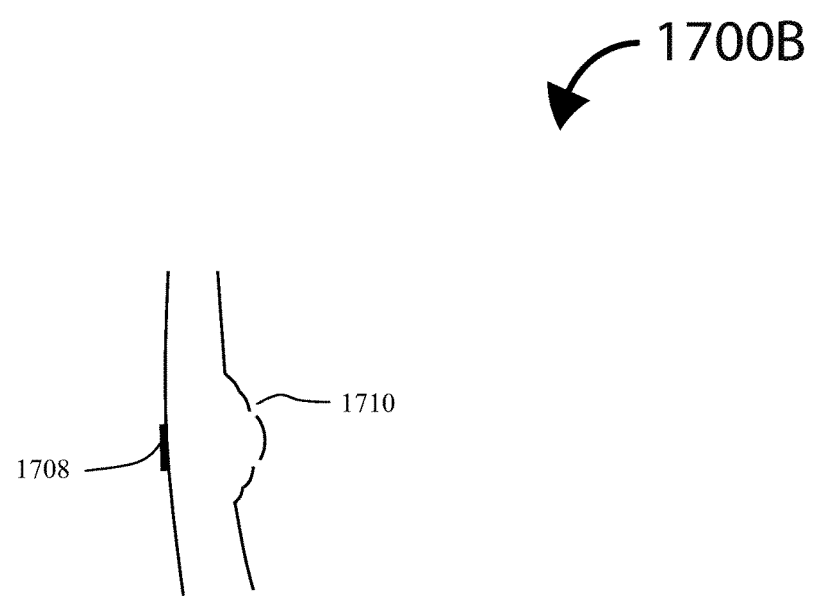

FIGS. 17A-B show an embodiment of the present invention in which micro-reticle patterns are combined with micro-multifocal-lenses to project micro-reticle images on, or in front of, the paracentral and/or peripheral retina. The micro-reticle and micro-multifocal-lens pairs are lined up such that light rays from a micro-reticle, after travelling through its corresponding micro-multifocal-lens will propagate toward the eye pupil direction. The spatial arrangement of the micro-reticle and micro-multifocal-lens pairs is such that they are scattered around the paracentral and/or peripheral zone of a spectacle lens or lens combination. Each micro-multifocal-lens has multiple focusing powers to extend the depth of focus such that micro-reticle images will be perceived by a wearer's eye as within focus, or in desired myopic defocus range, in the paracentral and/or peripheral retina regardless of the accommodation state of the wearer's eye.

It should be noted that the reason for extending the depth of focus of the micro-reticle images on, or in front of, the paracentral and/or peripheral retina is that the eye can focus far or near with its accommodation mechanism. As a result, a non-extended depth of focus design of the micro-lenses may not always project the micro-reticle on, or in front of, the paracentral and/or peripheral retina to be perceived by the eye as within focused or within a desired myopic defocus range because of the accommodation change.

FIG. 17A is a front view of a spectacle which can have different basic spectacle lens or lens combination designs as disclosed in FIGS. 4A-B to FIGS. 13A-B. The lower portion is a side or cross sectional view of the micro-multifocal-lens 1710 and its corresponding micro-reticle 1708. The thicker solid hash patterns 1708 in FIG. 17A represent micro-reticles with the hash pattern lines aligned along the radial (or meridional) and the circumferential directions, and the thinner concentric double-line (or multiple-line as shown in the expanded inset) ellipses 1710 in FIG. 17A represent micro-multifocal-toric-lenses 1710 which are arranged between the micro-reticles and the eye pupil as part of the spectacle lens or lens combination. It should be noted that the micro-multifocal-lens can be toric or non-toric although a toric multifocal micro-lens is shown in FIGS. 17A-B.

The micro-multifocal-toric-lenses 1710 have some base multifocal spherical focusing powers along all transverse directions and some additional multi-focal cylindrical focusing powers along the circumferential direction. The design of multifocal powers can be those of the multiple concentric Fresnel zone ones or multiple concentric diffractive ring (or race-track) ones or birefringent ones or even an axicon lens ones. Note that the term multifocal here can refer to all types of designs that can extend the depth of focus, including bifocal, trifocal, continuous or stepped add-power, positive or negative spherical aberration designs.

Since the oblique or off axis astigmatism of a human eye will generally cause the sagittal image shell to be behind the tangential image shell, by making the micro-multifocal-toric-lenses having stronger multiple light focusing powers in the circumferential direction, the extended depth of focus sagittal micro-reticle image lines can thus be brought closer to the extended depth of focus tangential micro-reticle image lines. The arrangement and design of these micro-reticle patterns and micro-multifocal-toric-lenses is such that extended-depth-of-focus sagittal and tangential micro-reticle line images can be brought closer to each other or to overlap with each other and at the same time form micro-reticle line images with extended-depth-of-focus on, or in front of, the paracentral and/or peripheral retina.

It should be noted that although micro-multifocal-toric-lenses are shown in FIGS. 17A-B, they can be replaced with all other types of micro-lens designs.

Figure 18A:
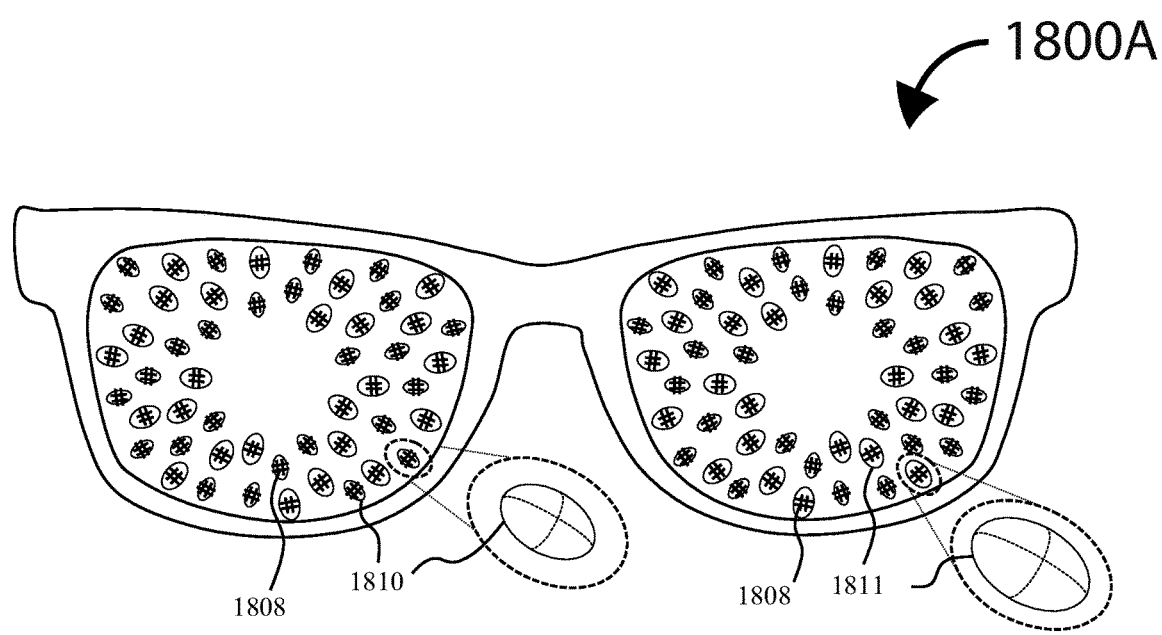
FIGS. 18A-B show an embodiment of the present invention in which two sets of micro-reticle and micro-lens pairs are arranged around the paracentral and/or peripheral region of a spectacle lens or lens combination such that two sets of micro-reticle images will be formed on or in front of the paracentral and/or peripheral retina with one set's micro-reticle images designed for the unaccommodated or relaxed state of a wearer's eye, and the other designed for the accommodated state of the wearer's eye.
Figure 18B:
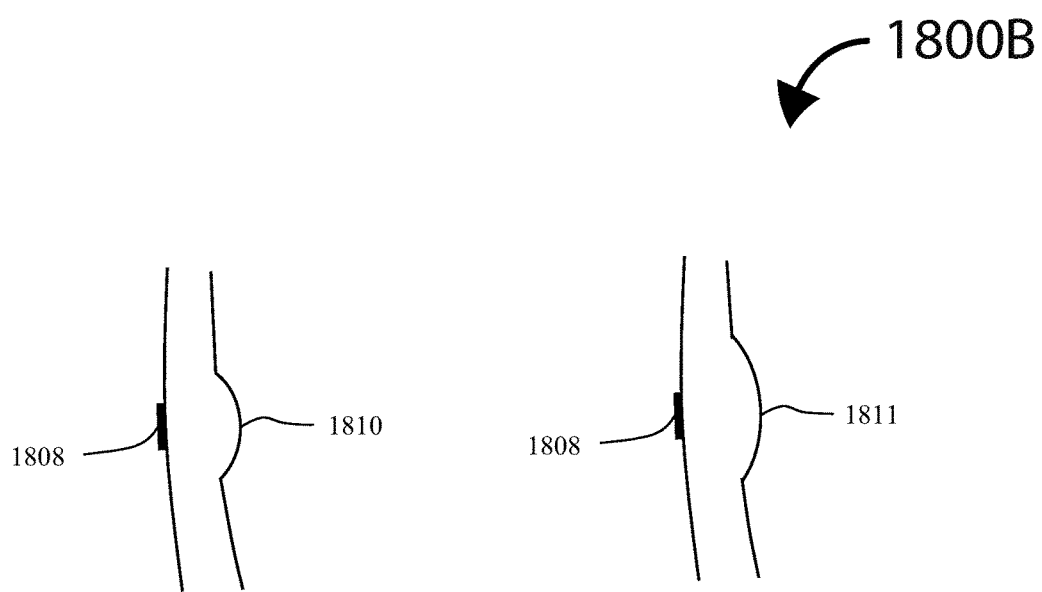

FIGS. 18A-B show an embodiment of the present invention in which two sets of micro-reticle and micro-lens pairs are lined up such that light rays from a micro-reticle, after travelling through its corresponding micro-lens will propagate toward the eye pupil direction. The spatial arrangement of the two sets of micro-reticle and micro-lens pairs is such that they are approximately evenly scattered around the paracentral and/or peripheral zone of a spectacle lens or lens combination. The design of the two sets of micro-lenses is such that two sets of micro-reticle images will be formed on, or in front of, the paracentral and/or peripheral retina with one set's micro-reticle images designed for the unaccommodated or relaxed state of the wearer's eye, and with the other set's micro-reticle images designed for the accommodated state of the wearer's eye.

It should be noted that the reason for forming two sets of micro-reticle images in the paracentral and/or peripheral retina is that the eye can focus far or near with its accommodation mechanism. By dividing the micro-lenses into two sets, we can have one set account for the case of far vision with relaxed eye accommodation and the other set account for typical near vision with strong eye accommodation. With such a design, for both far and near viewing conditions, at least one set of micro-reticle images will have enough contrast on, or in front of, the paracentral and/or peripheral retina to generate dominating neurophysiological signals to increase the myopia suppression stimuli.

FIG. 18A is a front view of a spectacle which can have different basic spectacle lens or lens combination designs as disclosed in FIGS. 4A-B to FIGS. 13A-B. FIG. 18B is a side or cross sectional view of the two different focusing power sets of micro-lenses with their corresponding micro-reticles. The thicker solid hash patterns 1808 shown in FIG. 18A represent micro-reticles with the hash pattern lines aligned along the radial (or meridional) and the circumferential directions. There are two sets of thinner line ellipses 1810 and 1811, with each set representing a different group of micro-lenses, which are arranged between the micro-reticles and the eye pupil as part of the spectacle lens or lens combination design. The first set of micro-lenses 1810 is represented by a smaller ellipse and has a stronger focusing power than the second set of micro-lenses 1811 which is represented by a larger ellipse. The design of the two sets of micro-lenses is such that when the eye is relaxed in the unaccommodated status for far vision, the first set of micro-lenses will project their corresponding micro-reticles to form corresponding micro-reticle images on, or in front of, the paracentral and/or peripheral retina (i.e. within focus as perceived by a wearer's eye or myopically defocused within a desired range as perceived by a wearer's eye), while when the eye is not relaxed but in the accommodated status for typical near vision, the second set of micro-lenses will project their corresponding micro-reticles to form corresponding micro-reticle images on, or in front of, the paracentral and/or peripheral retina (i.e. within focus as perceived by a wearer's eye or myopically defocused within a desired range as perceived by a wearer's eye).

It should be noted that although we have used the term micro-lenses to refer to the embodiment of FIGS. 18A-B and have drawn the micro-lenses as ellipses, they should include all types of micro-lens designs, especially the micro-toric-lens design and the micro-multifocal-lens design.

Furthermore, although we have only illustrated and discussed two sets of micro-lenses with different focusing powers, it should be noted that the same concept can be extended to more than two sets. For example, it can be extended to three sets with a first set accounting for the accommodated state when the eye is viewing a far object, a second set accounting for the accommodation state when the eye is viewing an intermediate distance object, and a third set accounting for the strong accommodation state when the eye is viewing a near object.

Figure 19A:
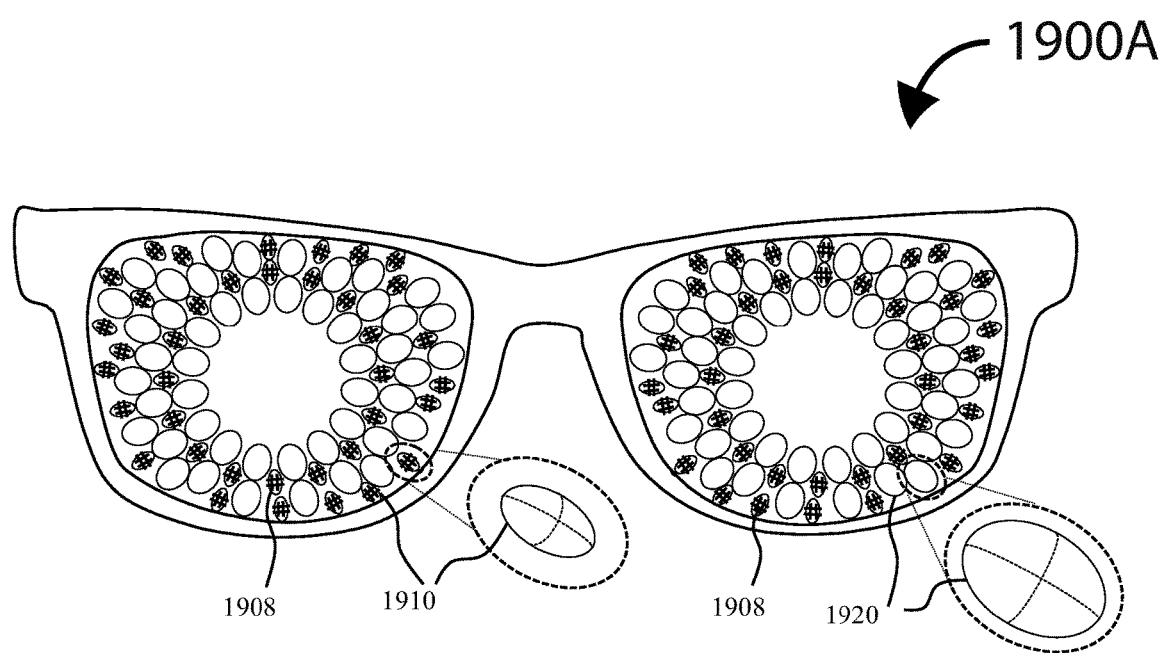
FIGS. 19A-B show an embodiment of the present invention in which one set of micro-lenses have corresponding micro-reticles and are designed to project micro-reticle images on or in front of the paracentral and/or peripheral retina, and another set of mini-lenses larger in size than that of the micro-lenses are configured to project images of paracentral and/or peripheral objects from surrounding optical environment on or in front of the paracentral and/or peripheral retina.
Figure 19B:
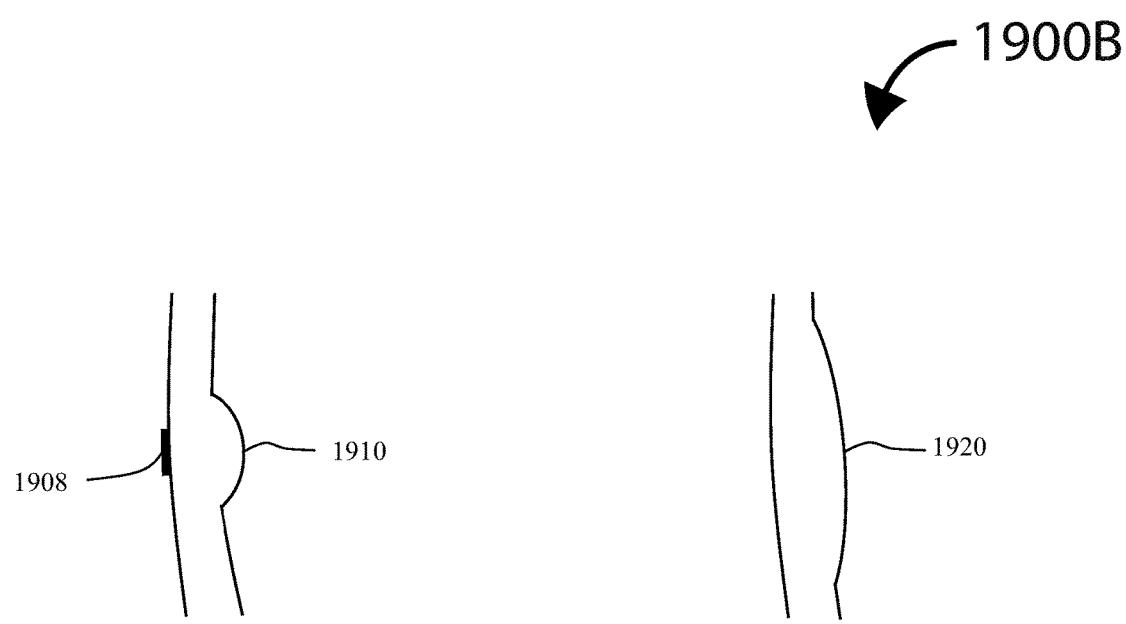

FIGS. 19A-B show an embodiment of the present invention in which one set of micro-lenses have corresponding micro-reticles and are configured to project micro-reticle images on, or in front of, the paracentral and/or peripheral retina, and another set of mini-lenses larger in size (of the order of millimeters than that of the micro-lenses (of the order of hundreds of micrometers) are configured to project images of paracentral and/or peripheral objects from surrounding optical environment to be in front of the paracentral and/or peripheral retina.

As in the other embodiments, the micro-reticle and micro-lens pairs are lined up such that light rays from a micro-reticle, after travelling through its corresponding micro-lens will propagate toward the eye pupil direction.

The spatial arrangement of the mini-lenses meant to project images of paracentral and/or peripheral objects from surrounding optical environment to be in front of the paracentral and/or peripheral retina can be similar to that as disclosed in U.S. Pat. No. 10,268,050. While in FIGS. 19A-B, these mini-lenses are drawn on the back surface of the spectacle lens, they can also be made on the front surface of the spectacle lens. The micro-lenses meant to project micro-reticle images on, or in front of, the paracentral and/or peripheral retina are transversely arranged in between the spaces among the mini-lenses.

FIG. 19A is a front view of a spectacle which can have different basic spectacle lens or lens combination designs as disclosed in FIGS. 4A-B to FIGS. 13A-B. FIG. 19B is a cross sectional view of the micro-lenses and the mini-lenses made on the back surface of the base spectacle lens. The thicker solid hash patterns 1908 shown in FIG. 19A—represent micro-reticles with the hash pattern lines aligned along the radial (or meridional) and the circumferential directions. There is a first set of corresponding micro-lenses 1910 represented by those thinner line smaller ellipses that are arranged between the micro-reticles and the wearer's eye pupil as part of the spectacle lens or lens combination. These micro-lenses 1910 have much stronger focusing powers than the mini-lenses 1920 because the micro-lenses 1910 are designed to optically project corresponding micro-reticles on, or in front of, the paracentral and/or peripheral retina. There is also a second set of mini-lenses represented by those thinner line larger ellipses 1920 that do not have corresponding reticles. These mini-lenses 1920 have much less focusing powers than the micro-lenses 1910 because the mini-lenses are designed to optically project paracentral and/or peripheral objects from surrounding optical environment to form corresponding images in front of the paracentral and/or peripheral retina.

As in the case of FIGS. 18A-B, it should be noted that although we have drawn both the micro-lenses and the mini-lenses as ellipses, they should represent all types of lens designs, especially the toric-lens design and the multi-focal-lens design.

Figure 20A:
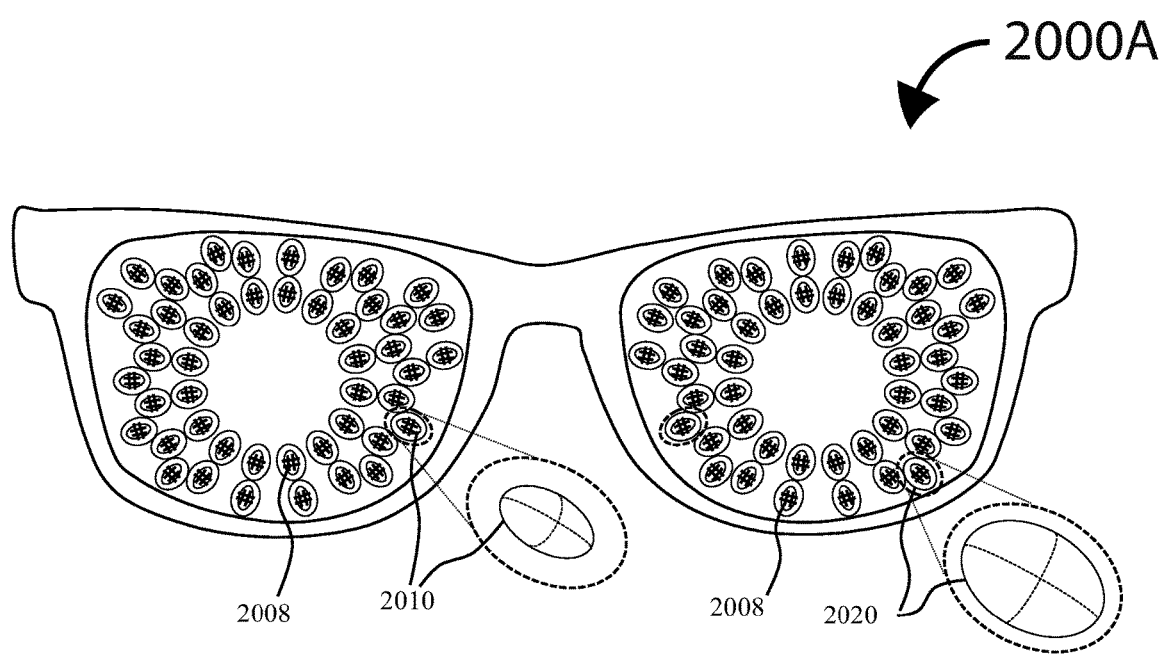
FIGS. 20A-B show an embodiment of the present invention in which micro-lenses having corresponding micro-reticles are either made on top of corresponding mini-lenses which are made on the back side of the spectacle lens, or are made on the back surface of the spectacle lens while the micro-reticles are made on the mini-lenses which are made on the front side of the spectacle lens.
Figure 20B:
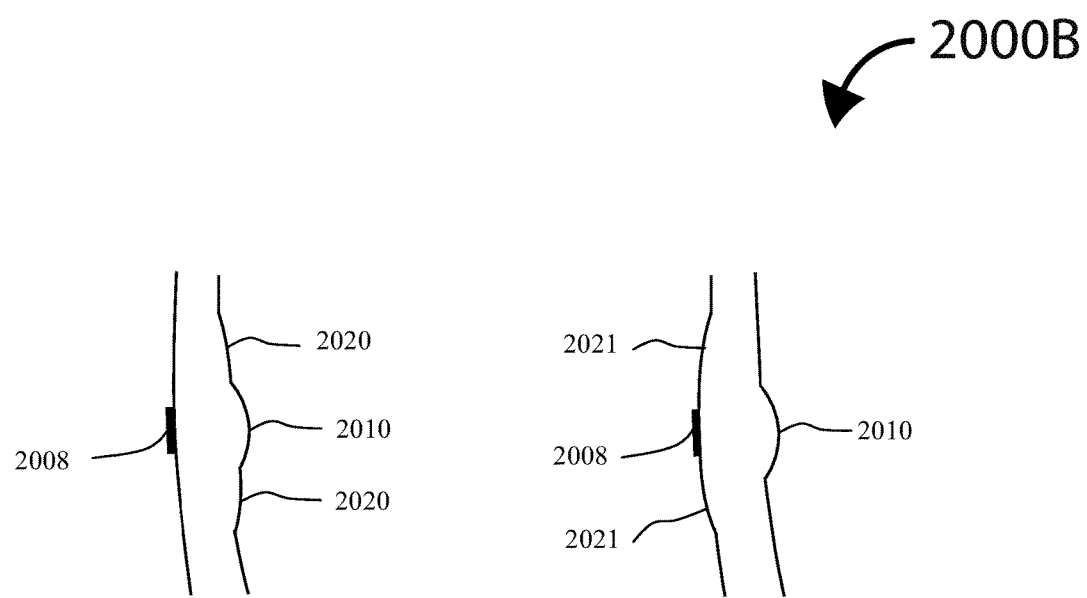

FIGS. 20A-B show an embodiment of the present invention in which either the micro-lenses are made on top of the mini-lenses which are made on the back side of the spectacle lens or the micro-lenses are made on the back surface while the micro-reticles are made on the mini-lenses which are made on the front surface of the spectacle lens. Again, the micro-lenses and corresponding micro-reticles are configured to project micro-reticle images on, or in front of, the paracentral and/or peripheral retina. The mini-lenses are of the order of millimeter in diameter and the micro-lenses are of the order of hundreds of micrometers in diameter. The portions of each mini-lens outside its corresponding micro-lens area are configured to project images of paracentral and/or peripheral objects from surrounding optical environment to be in front of the paracentral and/or peripheral retina.

As in the other embodiments, the micro-reticle and micro-lens pairs are lined up such that light rays from a micro-reticle, after travelling through its corresponding micro-lens will propagate toward the eye pupil direction.

The spatial arrangement of the mini-lenses meant to project images of paracentral and/or peripheral objects from surrounding optical environment to be in front of the paracentral and/or peripheral retina can be similar to that as disclosed in U.S. Pat. No. 10,268,050. The micro-lenses meant to project micro-reticle images on, or in front of, the paracentral and/or peripheral retina are arranged at the center of the mini-lenses.

FIG. 20A is a front view of a spectacle which can have different basic spectacle lens or lens combination designs as disclosed in FIGS. 4A-B to FIGS. 13A-B. FIG. 20B is a side or cross sectional view of the reticle 2008 (on the left side) and its corresponding stronger focusing power micro-lens

2010, made (on the right side) on top of the less strong focusing power mini-lens (also on the right side). The right portion of FIG. 20B is a side or cross sectional view showing the reticle 2008 (on the left side) made on the mini-lens 2021 (also on the left side) and the corresponding stronger focusing power micro-lens 2010 made (on the right side) on the back surface of the spectacle lens.

The thicker solid hash patterns 2008 shown in FIG. 20A represent micro-reticles with the hash pattern lines aligned along the radial (or meridional) and the circumferential directions. The thinner line smaller ellipses represent micro-lenses 2010 which are configured to project the micro-reticle images on, or in front of, the paracentral and/or peripheral retina. The thinner line larger ellipses 2020 represent mini-lenses which are designed to optically project paracentral and/or peripheral objects from surrounding optical environment to form corresponding images in front of the paracentral and/or peripheral retina. The mini-lenses have much less focusing powers than the micro-lenses. The micro-lenses 2010 are made on top of the mini-lenses 2020 and there can be a gradual transition of surface profile from each micro-lens to its underneath mini-lens.

Again, it should be noted that although we have drawn both the micro-lenses and the mini-lenses as ellipses, they should represent all types of lens designs, especially the toric-lens design and the multifocal-lens design.

Figure 21:
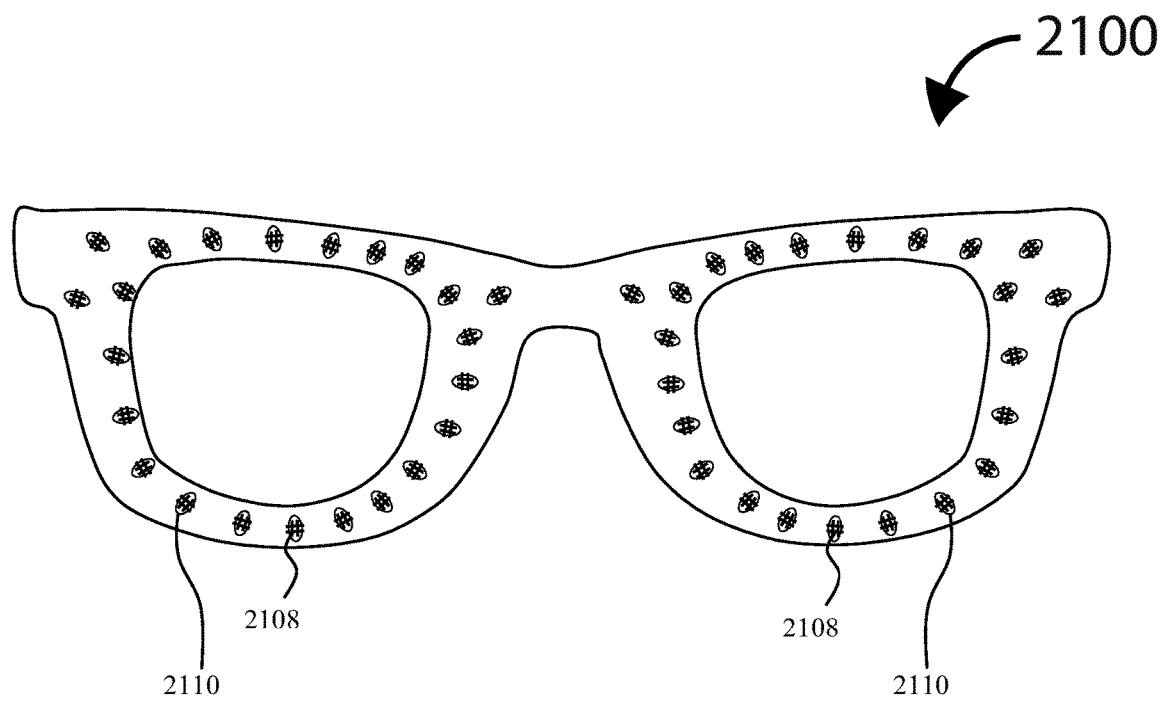
FIG. 21 shows an embodiment of the present invention in which micro-lenses and corresponding micro-reticles are made on the transparent eye wire/rim of a spectacle with the micro-lenses designed to project micro-reticle images on or in front of the paracentral and/or peripheral retina, while the spectacle lens portion is the same as a conventional spectacle lens.

FIG. 21 shows an embodiment of the present invention in which micro-lenses and corresponding micro-reticles are made only on the transparent eye wire/rim of a spectacle frame and the spectacle lens is the same as a conventional spectacle lens of different vision correction properties. The micro-lenses are configured to project micro-reticle images on, or in front of, the paracentral and/or peripheral retina while the spectacle lens does vision correction. As in the other embodiments, the micro-reticle and micro-lens pairs are lined up such that light rays from a micro-reticle, after travelling through its corresponding micro-lens will propagate toward the eye pupil direction. The eye wire/rim of the spectacle frame in this case can be made from a transparent material and is made wider than conventional ones to allow more micro-reticle and micro-lens pairs to be arranged there.

In this embodiment of FIG. 21, the spectacle lens can have different basic spectacle lens or lens combination designs, especially the single vision correction lens design and the IRODR lens combination design. In such a case, the spectacle lens does not have micro-reticles and micro-lenses on the spectacle lens or lens combination. In FIG. 21, the thicker solid hash patterns 2108 represent micro-reticles with the hash pattern lines aligned along the radial (or meridional) and the circumferential directions. The corresponding thinner line ellipses 2110 represent micro-lenses and are arranged between the micro-reticles and the eye pupil as part of the spectacle frame design.

It should be noted again that although we have used the term micro-lenses in the embodiment of FIG. 21, it should be re-emphasized that the micro-lens design can be of any forms including all types of micro-lens designs, especially the micro-toric-lens design, the simple spherical or aspherical lens design, and the micro-multifocal-lens design.

One benefit of making the micro-reticles and micro-lenses only on the eye wire/rim of the spectacle frame is that from a cosmetic point of view, the embodiment will look more like a conventional single vision correction spectacle lens so it might be more acceptable, especially among somewhat older children.

It might be possible that one cause of myopia progression associated with a single vision correction or even a bifocal or progression addition lens based spectacle is that the spectacle frame will always cast a strongly hyperopically defocused eye wire/rim image on the peripheral retina regardless of the accommodation status of the wearer. This is because the conventional eye wire/rim of the spectacle frame is mostly not transparent, is so close to the eye (much closer than any other objects of surrounding optical environment), and is also generally within the field of view of the wearer's eye.

Figure 22:
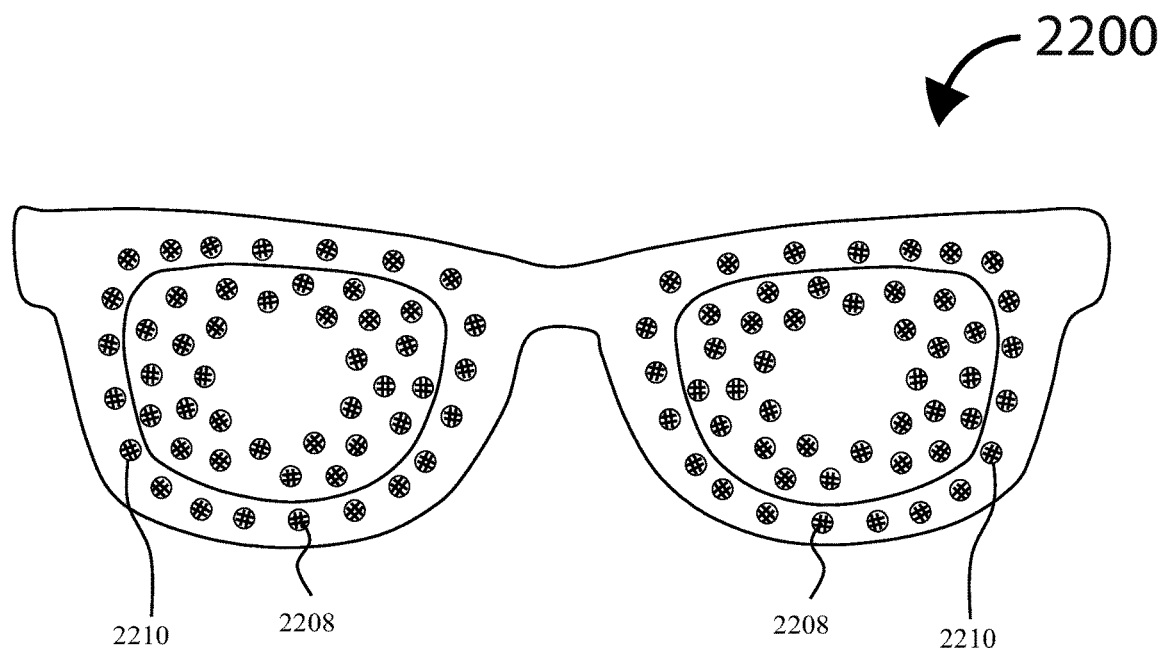
FIG. 22 shows an embodiment of the present invention in which micro-lenses and corresponding micro-reticles are made on both the transparent eye wire/rim of the spectacle frame and the paracentral and/or peripheral zone of the spectacle lens, with the micro-lenses designed to project micro-reticle images on or in front of the paracentral and/or peripheral retina.

FIG. 22 shows an embodiment of the present invention in which micro-lenses and corresponding micro-reticles are made on both the transparent eye wire/rim of the spectacle frame and also on the paracentral and/or peripheral zone of the spectacle lens, with the micro-lenses configured to project micro-reticle images on, or in front of, the paracentral and/or peripheral retina.

As in the other embodiments, the micro-reticle and micro-lens pairs are lined up such that light rays from a micro-reticle, after travelling through its corresponding micro-lens will propagate toward the eye pupil direction. The eye wire/rim of the spectacle frame in this case is made wider than conventional ones and is made from a transparent material.

FIG. 22 is a front view of a spectacle which can have different basic spectacle lens or lens combination designs as disclosed in FIGS. 4A-B to FIGS. 13A-B. The thicker solid hash patterns 2208 represent micro-reticles with the hash pattern lines aligned along the radial (or meridional) and the circumferential directions. The corresponding thinner line circles 2210 represent micro-lenses and are arranged between the micro-reticles and the wearer's eye pupil as part of the spectacle design.

It should be noted again that although we have used the term micro-lenses in the embodiment of FIG. 22, it should be re-emphasized that the micro-lens design can be of any forms including all types of micro-lens designs, especially the micro-toric-lens design, the simple spherical or aspherical lens design, and the micro-multifocal-lens design.

Figure 23A:
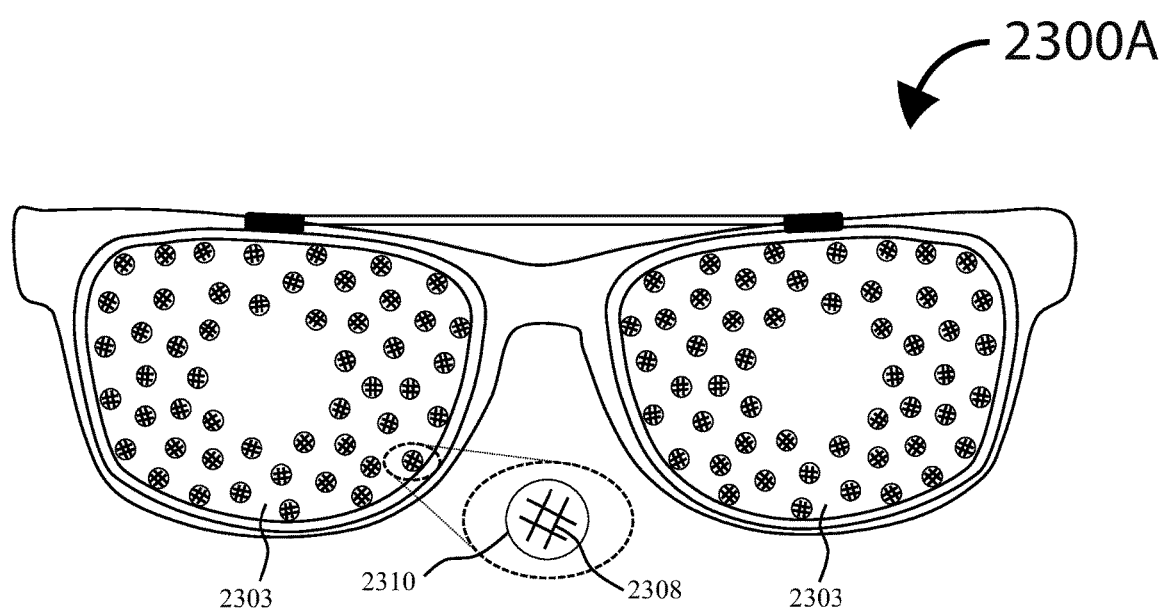
FIGS. 23A-B show an embodiment of the present invention in which the micro-lenses and corresponding micro-reticles are made on a clip-on layer in its paracentral and/or peripheral zone to add to a spectacle lens in a similar way as a clip-on sun glass does, with the micro-lenses designed to project micro-reticle images on or in front of the paracentral and/or peripheral retina.
Figure 23B:
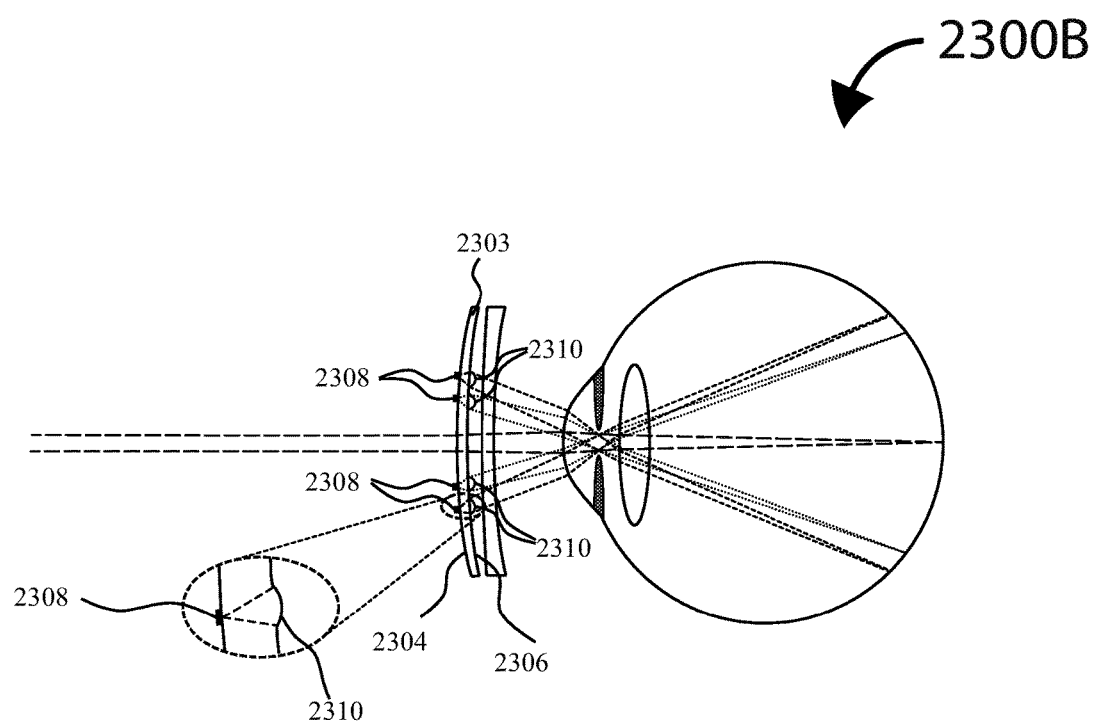

FIGS. 23A-B show an embodiment of the present invention in which the micro-lenses and corresponding micro-reticles are made on a clip-on or add-on glass/layer in its paracentral and/or peripheral zone with the clip-on or add-on glass/layer to be added to a spectacle lens in a similar way as a clip-on sun glass does. The clip-on or add-on design can be of a removable or flip-up/down or permanent attachment type. The clip-on or add-on glass/layer can be a simple plastic or glass layer without any base focusing power, but it can also have a base add-on power to provide additional functions such as reading or executive bi-focal type of reading function to enable near distance reading in addition to adding the function of the micro-reticles and micro-lenses.

As in the other embodiments, the micro-lenses are configured to project corresponding micro-reticle images on, or in front of, the paracentral and/or peripheral retina. The micro-reticle and micro-lens pairs are lined up such that light rays from a micro-reticle, after travelling through its corresponding micro-lens, will propagate toward the eye pupil direction.

FIG. 23A is a front view of a clip-on or add-on layer 2303 added to a spectacle which can have different basic spectacle lens or lens combination designs as disclosed in FIGS. 4A-B to FIGS. 13A-B. FIG. 23B is a side or cross-sectional view of the clip-on or add-on layer 2303 added to a spectacle positioned in front of a wearer's eye. The micro-reticles 2308 and micro-lenses 2310 are respectively made on the front surface 2304 and the back surface 2306 of the clip-on or add-on layer 2303 in its paracentral and/or peripheral zone. The thicker solid hash patterns 2308 shown FIG. 23A represent the micro-reticles with the hash pattern lines aligned along the radial (or meridional) and the circumferential directions. There are also corresponding thinner line circles 2310 that represent micro-lenses and are arranged between the micro-reticles and the eye pupil as part of the clip-on or add-on layer design to be clipped onto a spectacle frame or stacked onto a spectacle lens.

It should be noted again that although we have used the term micro-lenses in the embodiment of FIGS. 23A-B, with the micro-lenses drawn as circles, they should include all types of micro-lens designs, especially the micro-toric-lens design and the micro-multifocal-lens design.

In addition, it should also be noted that the focusing effect of all the micro-lenses can also be achieved through a change in the refractive index distribution as well as a combination of surface profile and refractive index distribution. So these variations should also be considered as within the scope of the present invention.

Furthermore, it should also be noted that the design of the micro-lenses can be personalized in the sense that anatomical and/or visual and/or optical refraction measurements can be made first to characterize the optical image formation or refraction properties of the eye. These measurements include optical biometry and/or optical refraction/wavefront and/or visual acuity and/or visual contrast sensitivity in the central, as well as paracentral and/or peripheral retina. The measurement results can be factored in to guide the design of the micro-lenses to correct not only lower order aberrations including off-axis or oblique astigmatism associated with an eye but also higher order aberrations such that fully corrected micro-reticle images can be created on, or in front of, the paracentral and/or peripheral retina.

We will now take a look at the size of the micro-reticles and the micro-lenses, their spatial density or distribution to further illustrate with more technical details the practicality of the present invention. For imaging analysis convenience in terms of illustrating the basics, we will use the simple thin lens formula to first figure out the approximate optical magnification when a micro-reticle is imaged to the retina of a typical human eye.

Assuming that light rays travel from left to right toward a thin lens, the thin lens equation is $$\frac{1}{p} + \frac{1}{q} = \frac{1}{f}$$

where
p is the object distance (from object to thin lens), is positive for a real object located to the left of the lens, and is negative for a virtual object located to the right of the thin lens,
q is the image distance (from image to thin lens), is positive for a real image formed to the right of the lens, and is negative for a virtual image formed to the left of the thin lens,
f is the focal length (from either front or back focal point to thin lens), is positive for a converging lens and negative for a diverging lens.

The optical magnification m produced by a thin lens is given by $$m = -\frac{q}{p}$$

If the magnification is negative then the image will be upside-down compared to the object. If the magnification is positive then the image will have the same orientation as the object.

In the case of a micro-reticle arranged in front of a micro-lens, typical object distance is limited to the thickness of the base spectacle lens and (or the gap in a) lens combination or the inserted or clipped-on layer. Practically speaking, this thickness is of the order of 1 mm to 10 mm. To get an order of magnitude estimation, we can assume that the object distance is p=1 mm to 10 mm. When an eye is found to be slightly near sighted, the dioptric value is generally about −1D which means that an object at distance of about 1 meter or 1000 mm will be sharply focused by this slightly near sighted eye to land on the retina without accommodation. To the micro-lens, this means that the micro-reticle image formed only by the micro-lens needs to be a non-inverted virtual image at a distance of about 1000 mm relative to the micro-lens in the object space rather than in the image space, so q=−1000 mm. As a result, the focal length of the micro-lens is also about 1 mm to 10 mm because the magnitude of 1/q is much less than that of 1/p which mean p≈f=1 mm to 10 mm. Meanwhile, the optical magnification of the micro-lens is of the order of m=−q/p=1000/10 to 1000/1=100 to 1000. This virtual image formed by only the micro-lens can be treated as a real object for the human eye. So if we use a prime sign to indicate parameters related to a simplified thin lens system of a human eye, the object distance is approximately p'=1000 mm, the focal length of such a human eye when treated as a thin lens is approximately f'=17 mm, so using the thin lens formula, the image distance is $$q' = -\frac{1}{\left(\frac{1}{f'} - \frac{1}{p'}\right)} = -\frac{p' * f'}{(p' - f')} = \frac{1000 * 17}{1000 - 17} \approx 17 \text{ mm}$$

Therefore, the optical magnification of the second human eye thin lens system is $$m' = -\frac{q'}{p'} = -\frac{17}{1000} = -0.017$$

Therefore, the overall optical magnification is approximately equal to $$M = m * m' = \left(-\frac{q}{p}\right)\left(-\frac{q'}{p'}\right) = (100 \text{ to } 1000) * (-0.017) \approx -1.7 \text{ to } -17$$

This means that a micro-reticle when finally imaged to the retina will be inverted, real, and approximately magnified on the retina to be about 1.7 to 17 times of its actual size. In other words, if we want to create micro-reticle image of the same size on the retina, depending on the focal length of the micro-lens, the original micro-reticle size can be 1.7 to 17 times smaller than that on the retina.

The next question is what the minimum line width of the reticle image on the paracentral and/or peripheral retina should be, such that it can still be detected and/or resolved by the human eye's paracentral and/or peripheral retina to produce neurophysiological signals. This question can be answered from clinical studies related to peripheral retinal detection and resolution acuity. As only cones function in photopic (i.e. outdoor day lighting or indoor room lighting) conditions, the detection of the presence of a bright (or dark) line on a dark (or bright) background needs at least one row of stimulated (or unstimulated) cones to lie between rows of unstimulated (or stimulated) cones. The size of a cone cell in the paracentral and/or peripheral retina is about 50 μm. Recall that the overall optical magnification from a micro-reticle to the retina is from 1.7 to 17, so the actual micro-reticle pattern line width should be at least 50 μm/(from 1.7 to 17)≈3 μm (for f=1 mm) to 30 μm (for f=10 mm) for it to be detectable by peripheral retinal cone cells. Micro-reticle line width of this size or bigger size can obviously be practically made using various modern lithography or laser writing or printing technologies.

Meanwhile, in the peripheral retina, a single retinal ganglion cell will receive information from thousands of photoreceptors (including both cones and rods), and it is the peripheral retinal ganglion cell density or spatial distribution that determines peripheral visual resolving power or resolution acuity. In other words, for the signal received by a cone cell to become a resolvable neurophysiological signal different from another nearby signal, a different retinal ganglion cell is needed. Given the fact that in the peripheral retina, the size of the retinal ganglion cell receptive field is about 500 μm, so for the direction of a micro-reticle pattern line or for two different reticle patterns to be resolved or sensed as spatially resolvable signals, the micro-reticle pattern line image length or the separation distance between two micro-reticle patterns needs to be at least 500 μm on the peripheral retina.

For each micro-reticle and micro-lens pair, a line can be drawn from the center of the reticle through the center of the micro-lens, then through the center of the eye pupil to the peripheral retina, the distance from the spectacle lens to the eye pupil is typically about 12 mm, the focal length of the eye is about 17 mm, so a separation of 500 μm on the peripheral retina will be translated to a separation of about 500 μm×(12/17)≈350 μm on the actual micro-reticle lying surface. This means that the separation distance between centers of two neighboring micro-reticles on the micro-reticle surface needs to be at least 350 μm for the two neighboring reticles to be resolved as two different neurophysiological signals.

If we want to make sure that the reticle pattern line orientation direction is to be resolved by the paracentral and/or peripheral retina, we need to consider the micro-lens induced optical magnification of 1.7 to 17 times, so the micro-reticle pattern line length needs to be from at least 500 μm/17=30 μm if the micro-length focal length is about f=1 mm, to at least 500 μm/1.7=300 μm if the micro-lens focal length is f=10 mm.

In some embodiments, enough spacing is left between two neighboring micro-lenses so paracentral and/or peripheral objects from surrounding optical environment can be sensed by the eye as well but with less contrast so the overall signals from the micro-reticles will dominate over those from paracentral and/or peripheral objects of surrounding optical environment. A possible scenario is to evenly distribute the micro-reticle and micro-lens pairs in the paracentral and/or peripheral zone of the spectacle lens or on the eye wire/rim of a spectacle frame. We can divide the paracentral and/or peripheral zone into multiple inter-connecting regular hexagons or honeycombs. That way, each regular hexagon or honeycomb corresponding to a micro-lens can be surrounded by 6 neighboring blank regular hexagons or honeycombs that do not have the micro-lens. Thus, each regular hexagon or honeycomb needs to have a size of at least 350 μm per the requirement of the micro-lens transverse diameter.

It should be noted that for a micro-lens with a focal length f from 1 mm to 10 mm, its optical focusing power is of the order of 1000 Diopter to 100 Diopter. As for the radius of curvature of a corresponding convex light focusing interface, assuming that there is only one convex optical interface formed between a high refractive index material (n2=1.5) and air (n1=1.0), the radius of curvature R of this convex optical interface is, as is well known to those in the art, is R=f(n2−n1)/n2=(1 mm to 10 mm) (1.5−1)/1.5≈0.3 mm to 3 mm, which are very practically achievable values as such micro-lenses can be made through imprinting, embossing, molding, 3D printing and even lithography based chemical etching and such lenses are already commercially available.

To determine a practical value of the transverse diameter D of each micro-lens, there are a couple of parameters that should be considered. The first one is that the diameter D cannot be more than twice the radius of curvature (R) of the convex focusing interface. So this will limit the diameter D to within the range of 2R, or from 0.6 mm to 6 mm.

The second parameter is related to the general rule governing paraxial ray tracing or simple thin lens formula, which states that the sine or tangent of an angle in radian needs to be approximately equal to the angle itself in radian. Therefore, the numerical aperture or the half light-collection-cone-angle should be less than 0.25 radians. Given that each micro-reticle is about 1 mm to 10 mm away from its corresponding micro-lens, the micro-lens diameter D therefore should be less than the range of 0.5×(1 mm to 10 mm)=from 500 μm to 5000 μm (corresponding to the focal length of the micro-lens from 1 mm to 10 mm).

Combining this limitation (micro-lens transverse diameter D needs to be less than 500 μm (for f=1 mm) to less than 5000 μm (for f=10 mm)) with the limitation that the separation distance between two neighboring micro-lenses needs to be greater than 350 μm, and the need for the micro-reticle pattern line length to be greater than 30 μm (for f=1 mm) to 300 μm (for f=10 mm), we can select the transverse diameter of each micro-lens to be about 500 μm. Such a micro-lens transverse diameter will cast a micro-lens shadow of 500 μm×(17/12)≈700 μm on the paracentral and/or peripheral retina. Correspondingly, the micro-reticle pattern line length, when projected (with associated optical magnification) to the paracentral and/or peripheral retina needs to have a size of about 700 μm, in order to ensure that there is no area overlap on the paracentral and/or peripheral retina in terms of areas meant for sensing micro-reticle patterns versus areas meant to be used for sensing paracentral and/or peripheral objects from surrounding optical environment. To achieve this, the corresponding micro-reticle line length should be 700 μm/17≈40 μm (for f=1 mm) to 700 μm/1.7≈400 μm. These parameters are again very practical in terms of the micro-fabrication and spatial distribution because micro-lens arrays with each micro-lens having a diameter of a few hundred microns and a focal length of a few millimeters are already commercially available. The difference is in the distribution as most commercially available micro-lens arrays are closely packed and for the present application, they need to be more sparsely distributed. Materials that can be used for making such micro-lenses as well as the base spectacle lens or lens combination can be different glasses and plastics or polymers, especially those with high refractive index that can be shaped through thermal setting, imprinting, embossing, molding, 3D printing and even lithography based chemical etching.

It should be noted that although we only discussed in detail the regular hexagon or honeycomb pattern distribution as an embodiment with each micro-reticle and micro-lens pair surrounded by 6 neighboring approximately equal areas, there can be many different spatial distribution possibilities which should all be within the scope of this invention. If the transverse diameter D of the micro-lens is equal to the long diagonal or maximal diameter of the hexagon or honeycomb, then on average, the area occupied by each micro-lens is one third of the un-occupied area because the 6 surrounding hexagons or honeycombs are shared on average by two micro-lenses. So with the example spatial distribution design, 25% of the paracentral and/or peripheral zone will be occupied by the micro-lenses and 75% of the paracentral and/or peripheral retina will be available for sensing objects from surrounding optical environment. This ratio can obviously be changed by changing either the transvers diameter D of the micro-lens relative to the long diagonal or maximal diameter of the hexagon or honeycomb, or the other way, and the line length of the micro-reticle pattern can also be of different values as long as it is greater than 500 μm on the paracentral and/or peripheral retina (after the overall optical magnification) for the micro-reticle line orientation direction to be resolved by the paracentral and/or peripheral retina.

It should be noted at this point that the present invention associated with a spectacle has an advantage that a contact lens does not have, and that is the relative eye movement with respect to the spectacle lens. This relative movement means that different paracentral and/or peripheral retinal cone cells and/or ganglion cells will be triggered by the micro-reticle images to produce neurophysiological signals that can influence the localized retinal growth. If there is no such relative eye movement, there might be the possibility that only some of the cone or ganglion cells will always receive the micro-reticle image induced neurophysiological signals and as a result, only those localized paracentral and/or peripheral retinal areas will not grow or grow more slowly than other areas, which may cause the retinal surface to be no longer smooth but with peaks or troughs.

We will now move on to discuss the contrast of the micro-reticle images in terms of controlling the transparency or opaqueness of the micro-reticle pattern or its local surrounding area as well as color filtering. As one feature of the present invention, the micro-reticles can be either completely opaque or semi-transparent. The semi-transparency can be reflective or absorptive or colored with different transparency percentages. The opaqueness or semi-transparency of the micro-reticle pattern can be achieved through coating or evaporating or printing different materials with different layer thickness or doping of colored dyes. For example, the pattern can be made from a thin layer of black paint or a thin layer of light absorbing or reflecting metal.

The opaqueness or transparency of the micro-reticles can be designed such that under normal indoor and/or outdoor lighting conditions, the micro-reticle images casted on the paracentral and/or peripheral retina always have high enough contrast per the design of the micro-lens (which may be multi-focal or extended-depth-of-focus ones) such that these micro-reticle images are always within focus or somewhat myopically defocused as perceived by the eye with or without accommodation, thus always producing dominating neurophysiological signals over those produced by paracentral and/or peripheral objects from the surrounding optical environment or from the eye wire/rim of a conventional spectacle frame.

In one embodiment, two sets of micro-lens focusing powers or micro-lens-to-micro-reticle distances and/or two sets of semi-transparencies of the micro-reticles are designed such that under normal outdoor and/or indoor lighting conditions, when the eye's accommodation is relaxed to view far distance object, a first set of micro-reticle images will have enough contrast to produce dominating perceived-within-focus or somewhat myopically defocused neurophysiological signals on the paracentral and/or peripheral retina, while a second set of micro-reticle images not focused on the paracentral and/or peripheral retina (thus is blurred to some extent) do not have enough contrast to produce perceivable neurophysiological signals for the paracentral and/or peripheral retina; whereas when the eye's accommodation is changed to view near distance object, the second set of micro-reticle images that are now substantially focused on the paracentral and/or peripheral retina will have enough contrast to produce dominating perceived-within-focus or somewhat myopically defocused neurophysiological signals for the retina, while the first set of micro-reticle images that are not focused on the paracentral and/or peripheral retina do not have enough contrast to produce perceivable signals on the paracentral and/or peripheral retina.

In another embodiment, the micro-reticles and/or its local surrounding areas and/or the paracentral and/or peripheral zone of the spectacle lens are colored to explore the most efficient color band or color contrast that will produce the strongest neurophysiological signals to slow down or stop eye elongation. The color filtering can be achieved through multiple layer dielectric coating as is done for standard optical bandpass or long pass or short pass filters or directly derived from the optical material like in the case of color glasses. The coloring can be the same or different among different micro-reticle images. Since there is more than one optical surfaces associated with a spectacle lens or lens combination, any of the surfaces can be used for coloring/filtering, including the surface(s) of the micro-lens as well as the surfaces of the spectacle lens(es).

The color filtering of the micro-reticle patterns and/or its local surrounding areas and/or the paracentral and/or peripheral zone of the spectacle lens can be designed such that under normal indoor and/or outdoor lighting conditions, the colored micro-reticle images casted on the paracentral and/or peripheral retina always have high enough colored contrast such that these colored reticle images are dominating in terms of producing neurophysiological signals to slow down or stop eye elongation over real paracentral and/or peripheral object images produced by the surrounding optical environment that the wearer's eye actually sees regardless of whether the eye is accommodated for near vision or not accommodated (i.e. relaxed) for far vision.

So far, we have discussed only those embodiments of the present invention that are passive in the sense that there are no active elements involved such as solar cells, batteries or movable parts, or shapeable or material-property-changeable components, or materials that can detect light and/or light up itself. However, this does not mean that this invention has excluded these possibilities; instead, these possibilities should be considered as different embodiments as have been discussed in co-assigned U.S. Provisional Patent Application No. 62/649,669.

Figure 24A:
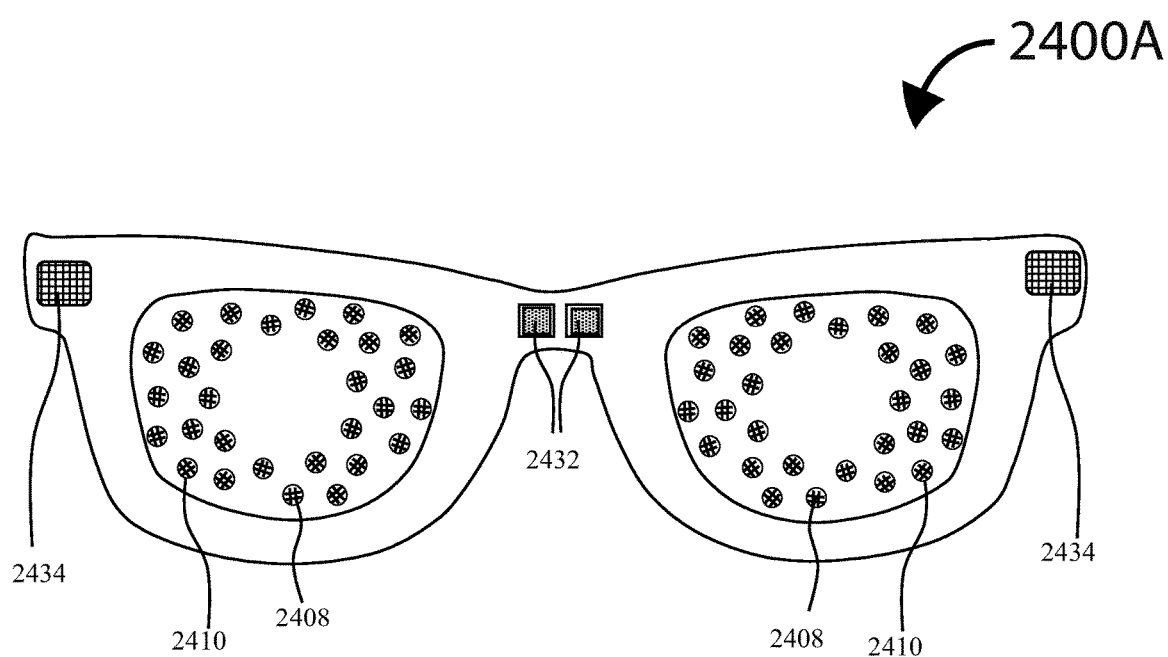
FIGS. 24A-C show an embodiment in which solar cells or batteries (together with micro-electronic circuits) and light sensors are embedded in the spectacle frame or the eye wire/rim of the spectacle frame to enable sensing and/or activation of certain active functions, like the lighting up of the micro-reticle pattern. At the same time, on the eye wire/rim and/or the paracentral and/or peripheral zone of the spectacle lens (or lens combination), there are micro-reticles and micro-lenses made there with the micro-lenses designed to project micro-reticle images on or in front of the paracentral and/or peripheral retina.
Figure 24B:
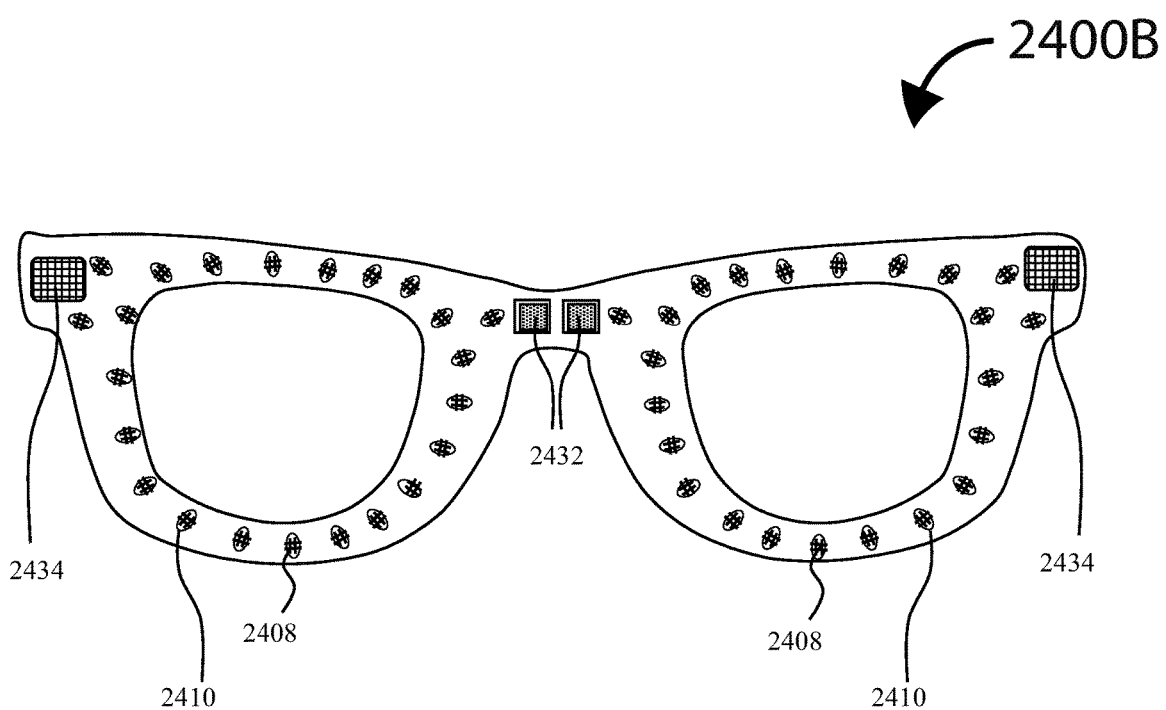
Figure 24C:
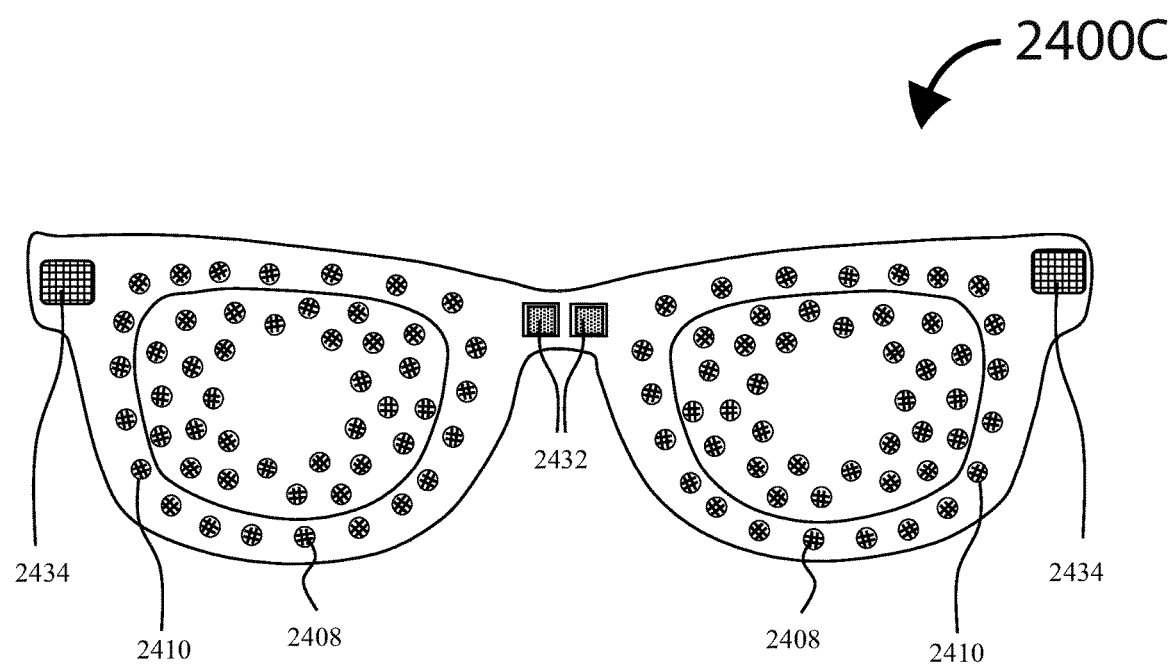

FIGS. 24A-C show such an embodiment in which solar cells and/or batteries (together with micro-electronic circuits if needed) 2434 and light sensors 2432 are embedded in the spectacle frame or the eye wires/rims of the spectacle frame to enable sensing and/or activation of certain functions. At the same time, on the eye wire/rim and/or the spectacle lens (or lens combination), there are micro-reticles and micro-lenses made there. In FIGS. 24A-C, the thicker solid hash patterns 2408 represent micro-reticles with the hash pattern lines aligned along the radial (or meridional) and the circumferential directions. The corresponding thinner line circles 2410 represent micro-lenses and are arranged between the micro-reticles and the eye pupil as part of the spectacle design.

It should be noted again that although we have used the term micro-lenses in the embodiment of FIGS. 24A-C, the micro-lens design can be of any forms including all types of micro-lens designs, especially the micro-toric-lens design, the simple spherical or aspherical lens design, and the micro-multifocal-lens design. In fact, FIG. 24A, a spectacle with only the spectacle lens having micro-reticles and micro-lenses similar to what has been discussed in FIGS. 4A-B are shown and the micro-lenses are drawn as circles surrounding corresponding micro-reticles; in FIG. 24B, a spectacle with only the eye wires/rims having micro-reticles and micro-lenses similar to what has been discussed in FIG. 21 are shown and the micro-lenses are drawn as ellipses surrounding corresponding micro-reticles; and FIG. 24C, a spectacle with both the spectacle lens and also the eye wire/rim having micro-reticles and micro-lenses similar to what has been discussed in FIG. 22 are shown and the micro-lenses are drawn as circles surrounding corresponding micro-reticles.

In this embodiment, in addition to embedding light sensors and solar cells and/or batteries in the frame and/or eye wire/rim of the spectacle to provide powering capabilities, one particular active function of the spectacle in FIGS. 24A-C is to slightly light up the micro-reticles when lighting from surrounding optical environment is below a certain threshold and hence not as favorable as needed to produce dominating micro-reticle images on the paracentral and/or peripheral retina. To achieve this, optically transparent electrodes made from, for example, indium tin oxide, can be deposited on the eye wire/rim and/or on the spectacle lens to link the solar cells and/or batteries (together with microelectronics if needed) to the micro-reticles and/or its local surrounding areas. The micro-reticle pattern lines or the material around the micro-reticle pattern lines can be made from semi-transparent or organic light-emitting-diode-like-materials with either narrow spectral bandwidth single color band or broad spectral bandwidth multiple color band light emitting capabilities.

It should be noted that a key feature of the present invention is the arrangement of each micro-reticle and micro-lens pair to project micro-reticle images through the pupil of a wearer's eye to form a micro-reticle image on, or in front of, the paracentral and/or peripheral retina of an eye in such a way that the micro-reticle images, when perceived by the eye, are within focus or myopically defocused. The phrase perceived by the eye as within focus can be interpreted as that the spherical equivalent image shell of the sagittal and tangential image shells is approximately on or close (i.e. within the depth of focus of the eye) to the paracentral and/or peripheral retina. The phrase perceived by the eye as myopically defocused can be interpreted as that the spherical equivalent image shell of the sagittal and tangential image shells is somewhat in the front (i.e. anterior and outside the depth of focus of the eye) of the paracentral and/or peripheral retina but can still be sensed by the eye to induce neurophysiological signal to halt eye elongation. This feature should be applicable to all the above discussed embodiments.

Figure 25:
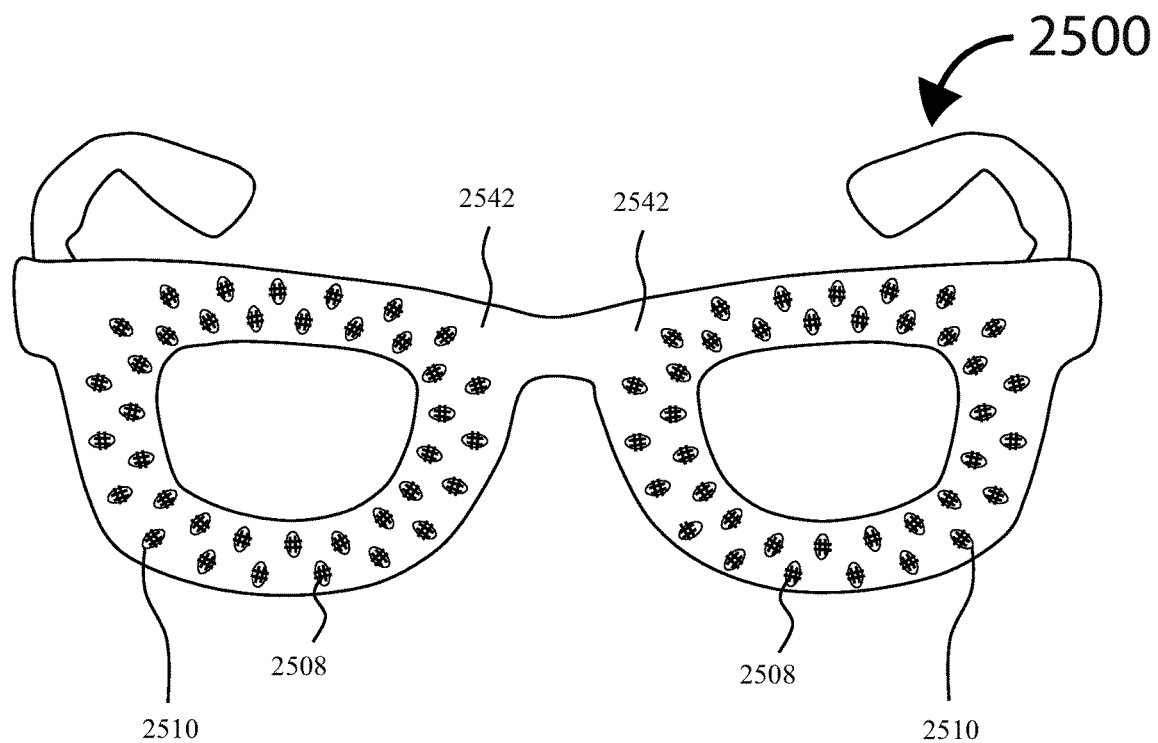
FIG. 25 shows an embodiment in which only a spectacle frame without a spectacle lens (or a spectacle with a zero diopter spectacle lens) is used as anti-myopia means to treat myopia progression, with micro-reticles and micro-lenses made on the spectacle frame only and with the micro-lenses designed to project micro-reticle images on, or in front, of the paracentral and/or peripheral retina.

FIG. 25 shows an embodiment in which only a spectacle frame without a spectacle lens or with a zero diopter spectacle lens is used as anti-myopia means to prevent the onset of myopia. FIG. 25 is a front view of a spectacle frame. On the frame there is a pair of transparent eye wires/rims 2542 on which micro-reticles 2508 and micro-lenses 2510 are made. The thicker solid hash patterns 2508 shown in FIG. 25 represent the micro-reticles with the hash pattern lines aligned along the radial (or meridional) and the circumferential directions. There are also corresponding thinner line ellipses 2510 that represent micro-lenses and are arranged between the micro-reticles and the eye pupil as part of the eye wire/rim design of the spectacle frame.

The width of the eye wire/rim is wider than that of a conventional one such that at least one or more rows of micro-reticle and micro-lens pairs can be arranged within the width around the eye wire/rim. Note that if the fact that there is no spectacle lens makes the device less acceptable, a zero Diopter spectacle lens can be attached to the frame to make it look cosmetically more like a real spectacle, a sunglass like spectacle lens with zero Diopter refraction power can, for example, be mounted to the frame to make it into a myopia prevention sunglass.

As in the cases of other embodiments, all those variations or possible properties associated with the micro-reticle, and the micro-lens, the eye wire/rim, and the frame, as already discussed, can all be applied to this embodiment, especially those related to the micro-reticle and micro-lens designs as well as the addition of active elements like solar cell(s), light sensor(s) and transparent light emitting sub-areas or patterns to light up the micro-reticle patterns to increase the contrast of the micro-reticle images on the paracentral and/or peripheral retina when the background lighting is dim.

What might be unique about this embodiment is that it is well suited for a relatively young child like a 4-year-old before the onset of myopia, especially if the child's one parent is or both parents are myopia or if there is a family history of myopia. So the embodiment is more for preventing myopia than for controlling the progression of myopia.

Figure 26:
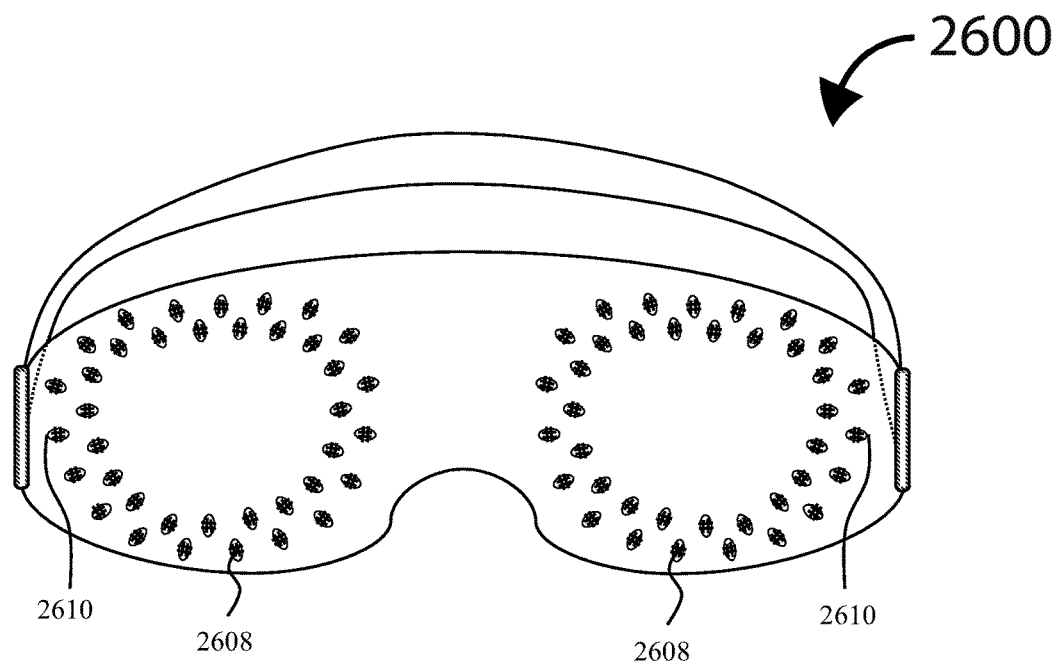
FIG. 26 shows an embodiment in which a curved panoramic goggle glass/layer is designed with micro-reticle and micro-lens pairs made in its paracentral and/or peripheral zone(s), with the micro-lenses designed to project micro-reticle images on or in front of the paracentral and/or peripheral retina.

The same concept can also be extended to a zero Diopter panoramic goggle that does not have a frame but instead only has an elastic band to tie the goggle around the head of a wearer. FIG. 26 shows an embodiment in which the curved panoramic goggle layer is designed with micro-reticle and micro-lens pairs made on its paracentral and/or peripheral zone(s).

FIG. 26 is a front view of a panoramic goggle with a pair of lenses on which micro-reticles 2608 and micro-lenses 2610 are made around the paracentral and/or peripheral zone. The thicker solid hash patterns 2608 shown in FIG. 26 represent the micro-reticles with the hash pattern lines aligned along the radial (or meridional) and the circumferential directions. There are also corresponding thinner line ellipses 2610 that represent micro-lenses and are arranged between the micro-reticles and the eye pupil as part of the panoramic goggle design.

Like the embodiment of FIG. 25, all those variations or possible properties associated with the spectacle lens, the micro-reticle, and the micro-lens, as already discussed, can all be applied to this embodiment, especially those related to the micro-reticle and micro-lens designs as well as the addition of active elements like solar cell(s), light sensor(s) and transparent light emitting sub-areas or patterns to light up the micro-reticle patterns to increase the contrast of the micro-reticle images on the paracentral and/or peripheral retina when the background lighting is dim. Also like the embodiment of FIG. 25, this embodiment can be used for a relatively young child like a 4-year-old before the onset of myopia, especially if the child's one parent is or both parents are myopia or if there is a family history of myopia.

With all the above discussions, we can also envision a combo design embodiment which takes full advantage of the various favorable features of the invention. In terms of the basic spectacle lens design, it can take advantage of the Increased Resolvable Object Distance Range (IRODR) spectacle lens combination design because such a basic design will address the first key potential root cause of myopia progression, i.e. the accommodative demand or lag(insufficient accommodation range or amplitude). The IRODR design can have its basic central portion design accounting for neutralizing the spherical and cylindrical refractive errors of a wearer's eye. The IRODR design can be personalized such that its depth of field (or focus) is effectively increased to just sufficiently compensate the accommodation need or lag to ensure that at least the central fovea can always see sharply focused images of far and near objects from the optical environment. The fact that there are four optical interfaces gives huge spectacle lens design flexibility so even more personalized and/or optimized IRODR design can be achieved.

In terms of the paracentral and/or peripheral zone design of the basic spectacle lens combination, the first negative lens and/or the second positive lens can have a Fresnel paracentral and/or peripheral zone on the inner side or both inner sides between the two lenses so while the overall thickness of the IRODR spectacle lens combination can be made relatively thin (for example less than 6 mm), the Fresnel steps are also contained inside the spectacle lens combination and hence not easily damaged by the user. In addition, the Fresnel paracentral and/or peripheral zone design can also be such that there is an overall add power in the paracentral and/or peripheral zone to render paracentral and/or peripheral far distance object images from the surrounding optical environment to be somewhat in front of the paracentral and/or peripheral retina (i.e. somewhat myopically defocused) regardless of whether the eye is accommodated for near vision or not accommodated for far vision. The Fresnel paracentral and/or peripheral zone design can also be bifocal to account for relaxed vs accommodated state of the eye. Such a paracentral and/or peripheral zone design will address the second key potential root cause of myopia progression, i.e. dominating paracentral and/or peripheral hyperopic defocus of the images formed of paracentral and/or peripheral objects from surrounding optical environment.

In terms of the micro-reticle and micro-lens pairs to be made in the paracentral and/or peripheral zone, they can be designed such that the final micro-reticle images on the paracentral and/or peripheral retina closely resemble those that are formed of far distance paracentral and/or peripheral objects from surrounding optical environment on the paracentral and/or peripheral retina of an emmetropic eye. They can also be personalized to always project micro-reticle images on or somewhat in front of the paracentral and/or peripheral retina with not only lower order aberrations corrected but also higher order aberrations corrected. The micro-lens design can also be that of multi-focal or extended-depth-of-focus types. As a result, the micro reticle images will always be within focus or be somewhat myopically defocused as perceived by the wearer's eye regardless of whether the eye is accommodated for near vision or unaccommodated (relaxed) for far vision. To protect the micro-reticle and micro-lens pairs from being easily damaged, they can be made inside the IRODR spectacle lens combination with the micro-reticles made on the Fresnel back surface of the first negative lens and with the micro-lenses made on the Fresnel front surface of the second positive lens. The spatial distribution of the micro-reticle and micro-lens pairs can be such that enough paracentral and/or peripheral areas are reserved for sensing paracentral and/or peripheral objects of the surrounding optical environment, and the opaqueness or semi-transparency of the micro-reticle patterns can be such that under typical outdoor and indoor lighting conditions, the micro-reticle images on the paracentral and/or peripheral retina will always produce dominating neurophysiological signals to overcome those possible hyperopically defocused signals on the paracentral and/or peripheral retina that can be generated by the surrounding optical environment. Such a design will therefore address the third potential root cause of myopia progression, i.e. the uncontrollability of paracentral and/or peripheral objects from surrounding optical environment and the accommodation of the eye to cause the image shell of paracentral and/or peripheral objects from surrounding optical environment to land behind the paracentral and/or peripheral retina.

In addition, the combo design can also be done with the spectacle frame or at least the eye wire/rim portion of the frame made transparent and at the same time to have micro-reticle and micro-lens pairs made on the eye wire/rim to fully remove or at least substantially reduce the effect of eye wire/rim images that are always strongly hyperopically defocused on the peripheral retina. Such a design will therefore address the fourth potential root cause of myopia progression, i.e. spectacle frame or eye wire/rim induced strongly hyperopic eye wire/rim images on the peripheral retina.

It should also be noted that the same concept can be applied to treat far sightedness in the sense that the micro-reticle images can be designed to always land somewhat behind the paracentral and/or peripheral retina to produce dominating neurophysiological signals to stimulate the eye to grow.

Although various embodiments that incorporate the teachings of the present invention have been shown and described in detail herein, those skilled in the art can readily devise many other varied embodiments that still incorporate these teachings.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

What is claimed is:

1. An auxiliary optical system for myopia progression control and configured to be coupled to a spectacle in front of an eye, the auxiliary optical system comprising:
   a central zone; and
   at least one of a paracentral zone and a peripheral zone, wherein at least one of the paracentral zone and the peripheral zone includes an integrated reticle and a reticle focuser, wherein the reticle focuser is arranged between the integrated reticle and a pupil of the eye, and thereby projecting an image of the integrated reticle onto at least one of a paracentral region and a peripheral region of a retina of the eye, to be perceived by the eye as within focus at the retina.

2. An auxiliary optical system for myopia progression control and configured to be coupled to a spectacle in front of an eye, the auxiliary optical system comprising:
a central zone; and
at least one of a paracentral zone and a peripheral zone, wherein at least one of the paracentral zone and the peripheral zone includes an integrated reticle and a reticle focuser, wherein the reticle focuser is arranged between the integrated reticle and a pupil of the eye, and thereby projecting an image of the integrated reticle onto at least one of a paracentral region and a peripheral region of a retina of the eye, to be perceived by the eye as myopically defocused at the retina.

3. The auxiliary optical system of claim 2 further comprises a base layer on which the reticle and the reticle focuser are integrated, and wherein the auxiliary optical system is configured to be clipped-on to or added-on to the spectacle.

4. The auxiliary optical system of claim 3 wherein the base layer has no focusing power.

5. The auxiliary optical system of claim 3 wherein the base layer has a focusing power.

6. The auxiliary optical system of claim 5 wherein the base layer is configured to assist with near distance reading.

7. The auxiliary optical system of claim 5 wherein a first portion of the base layer is configured to assist with near distance reading, and wherein a second portion of the base layer is configured to assist in far distance reading.

8. The auxiliary optical system of claim 2 wherein the auxiliary optical system is configured to be removable with respect to the spectacle.

9. The auxiliary optical system of claim 2 wherein the auxiliary optical system is configured to be flipped up and down with respect to the spectacle.

10. The auxiliary optical system of claim 2 wherein the auxiliary optical system is configured to be permanently attached to the spectacle.

* * * * *